(12) United States Patent
Desmond et al.

(10) Patent No.: US 10,936,178 B2
(45) Date of Patent: Mar. 2, 2021

(54) SYSTEMS AND METHODS FOR ANALYZING AND ORGANIZING DIGITAL PHOTOS AND VIDEOS

(71) Applicant: MemoryWeb, LLC, Glen Ellyn, IL (US)

(72) Inventors: Christopher J. Desmond, Glen Ellyn, IL (US); Nancy L. Desmond, Glen Ellyn, IL (US); L. Micahel Taylor, Chicago, IL (US)

(73) Assignee: MemoryWeb, LLC, Glen Ellyn, IL (US)

( * ) Notice: Subject to any disclaimer, the term of this patent is extended or adjusted under 35 U.S.C. 154(b) by 0 days.

(21) Appl. No.: 16/719,798

(22) Filed: Dec. 18, 2019

(65) Prior Publication Data
US 2020/0218435 A1    Jul. 9, 2020

Related U.S. Application Data

(60) Provisional application No. 62/789,288, filed on Jan. 7, 2019.

(51) Int. Cl.
| | | |
|---|---|---|
| *G06F 3/0484* | (2013.01) | |
| *G06K 9/00* | (2006.01) | |
| *G06F 16/54* | (2019.01) | |
| *G06F 3/0482* | (2013.01) | |

(Continued)

(52) U.S. Cl.
CPC ........ *G06F 3/04845* (2013.01); *G06F 3/0482* (2013.01); *G06F 16/51* (2019.01); *G06F 16/54* (2019.01); *G06K 9/00288* (2013.01); *G06K 9/00744* (2013.01); *G06K 9/6215* (2013.01)

(58) Field of Classification Search
CPC ...... G06F 3/04845; G06F 16/51; G06F 16/54; G06F 3/0482; G06K 9/00288; G06K 9/00744; G06K 9/6215
See application file for complete search history.

(56) References Cited

U.S. PATENT DOCUMENTS

| | | | | |
|---|---|---|---|---|
| 5,634,095 A | * | 5/1997 | Wang | G06F 8/34 715/763 |
| 6,722,574 B2 | * | 4/2004 | Skantze | G06F 3/04886 235/487 |

(Continued)

*Primary Examiner* — Jung-Mu T Chuang
(74) *Attorney, Agent, or Firm* — Nixon Peabody LLP

(57) ABSTRACT

A computer-implemented method includes causing a first one of a plurality of digital photographs to be displayed on a video display device. Responsive to receiving an indication that a user desires to digitally link the first digital photograph with another one of the plurality of photographs, the method includes prompting the user to select one of the plurality of digital photographs to be digitally linked to the first digital photograph. Responsive to the user selecting a second one of the plurality of digital photographs, the method includes digitally linking the first digital photograph with the second digital photograph. The method includes causing the first digital photograph to be displayed with a user-selectable flipping element. Responsive to receiving a selection of the displayed user-selectable flipping element, the method includes causing the first digital photograph to be digitally flipped such that the second digital photograph is displayed on the video display device.

30 Claims, 39 Drawing Sheets

(51) Int. Cl.
*G06F 16/51* (2019.01)
*G06K 9/62* (2006.01)

(56) References Cited

U.S. PATENT DOCUMENTS

| | | | | |
|---|---|---|---|---|
| 7,133,149 B2* | 11/2006 | Keane | G06Q 40/00 | 358/1.15 |
| 7,333,257 B2* | 2/2008 | Reynolds | G02F 1/155 | 257/E21.273 |
| 7,466,845 B2* | 12/2008 | Bhaskaran | G06T 5/50 | 382/112 |
| 7,516,895 B2* | 4/2009 | Holoubek | G06Q 10/107 | 235/462.01 |
| 7,676,767 B2* | 3/2010 | Hofmeister | G06F 3/0483 | 345/173 |
| 7,920,296 B2* | 4/2011 | Beato | H04N 1/0005 | 358/3.28 |
| 7,924,314 B2* | 4/2011 | Getsch | H04N 1/2166 | 348/207.99 |
| 7,982,909 B2* | 7/2011 | Beato | H04N 1/32128 | 358/1.9 |
| 7,986,831 B2* | 7/2011 | Nielsen | G06K 9/6224 | 382/164 |
| 8,036,417 B2* | 10/2011 | Gallagher | G06F 16/58 | 382/100 |
| 8,079,511 B2* | 12/2011 | Silverbrook | G06Q 20/3224 | 235/375 |
| 8,108,240 B2* | 1/2012 | Gropper | G06Q 10/1093 | 705/7.18 |
| 8,254,684 B2* | 8/2012 | Raju | G06F 16/58 | 382/181 |
| 8,290,205 B2* | 10/2012 | Scalise | G03D 15/003 | 382/100 |
| 8,295,881 B2* | 10/2012 | Elleouet | G06Q 10/10 | 455/558 |
| 9,208,177 B2* | 12/2015 | Petrou | G06F 16/24578 | |
| 9,563,643 B2* | 2/2017 | Panneer | G06F 16/583 | |
| 9,789,403 B1* | 10/2017 | Furment | A63F 13/428 | |
| 9,794,435 B1* | 10/2017 | Islamov | G06F 3/1256 | |
| 9,812,700 B2* | 11/2017 | Okamoto | H01M 4/661 | |
| 2002/0087546 A1* | 7/2002 | Slater | G06F 16/48 | |
| 2002/0089549 A1* | 7/2002 | Munro | G06T 11/60 | 715/835 |
| 2004/0047510 A1* | 3/2004 | Kawabata | G06F 3/14 | 382/232 |
| 2005/0251448 A1* | 11/2005 | Gropper | G06Q 30/0277 | 705/14.61 |
| 2005/0273356 A1* | 12/2005 | Holoubek | G06Q 10/107 | 235/462.01 |
| 2006/0268361 A1* | 11/2006 | Krolczyk | H04N 1/00474 | 358/450 |
| 2006/0284852 A1* | 12/2006 | Hofmeister | G06F 3/0483 | 345/173 |
| 2007/0047842 A1* | 3/2007 | Bhaskaran | G06F 16/583 | 382/305 |
| 2007/0066356 A1* | 3/2007 | Lapstun | B41J 3/445 | 455/557 |
| 2007/0162953 A1* | 7/2007 | Bolliger | G06F 16/4393 | 725/142 |
| 2007/0186164 A1* | 8/2007 | Getsch | H04N 1/32101 | 715/723 |
| 2007/0250529 A1* | 10/2007 | Beato | H04N 1/32128 | |
| 2007/0266602 A1* | 11/2007 | Daghighian | G09F 1/00 | 40/492 |
| 2008/0056572 A1* | 3/2008 | Nielsen | G06K 9/6224 | 382/173 |
| 2008/0291507 A1* | 11/2008 | Rodrigues | H04N 1/32128 | 358/474 |
| 2008/0316508 A1* | 12/2008 | Silverbrook | G07F 17/3223 | 358/1.1 |
| 2009/0153925 A1* | 6/2009 | Beato | H04N 1/0005 | 358/537 |
| 2009/0171783 A1* | 7/2009 | Raju | G06F 16/58 | 705/14.26 |
| 2009/0310814 A1* | 12/2009 | Gallagher | G06F 16/58 | 382/100 |
| 2009/0323136 A1* | 12/2009 | Fujiwara | G03G 15/5025 | 358/474 |
| 2010/0273525 A1* | 10/2010 | Silverbrook | H04M 1/72561 | 455/556.1 |
| 2010/0329575 A1* | 12/2010 | Scalise | G06F 16/58 | 382/218 |
| 2011/0231747 A1* | 9/2011 | Zuckerberg | G06F 16/5866 | 715/206 |
| 2011/0292464 A1* | 12/2011 | Shih | H04N 1/233 | 358/474 |
| 2011/0316882 A1* | 12/2011 | Blose | G06K 9/3208 | 345/636 |
| 2011/0317193 A1* | 12/2011 | Iwase | G06F 3/0482 | 358/1.13 |
| 2011/0317195 A1* | 12/2011 | Mitsui | H04N 1/00411 | 358/1.13 |
| 2012/0105891 A1* | 5/2012 | Mano | H04N 1/40 | 358/1.13 |
| 2012/0272180 A1* | 10/2012 | Larres | G06F 3/04817 | 715/784 |
| 2012/0290601 A1* | 11/2012 | Huang | G06K 9/00469 | 707/769 |
| 2013/0091026 A1* | 4/2013 | Deng | G06Q 30/06 | 705/14.73 |
| 2013/0239056 A1* | 9/2013 | Ubillos | G06F 3/0482 | 715/833 |
| 2013/0254666 A1* | 9/2013 | Snavely | G06K 9/00637 | 715/731 |
| 2013/0293917 A1* | 11/2013 | Safonov | H04N 1/00413 | 358/1.13 |
| 2014/0172881 A1* | 6/2014 | Petrou | G06F 16/9535 | 707/748 |
| 2014/0195337 A1* | 7/2014 | Taylor | G06F 3/04883 | 705/14.45 |
| 2014/0229328 A1* | 8/2014 | Butler | G06Q 30/0633 | 705/26.8 |
| 2014/0355073 A1* | 12/2014 | Beato | G06K 9/00456 | 358/449 |
| 2015/0019579 A1* | 1/2015 | Won | G06F 16/48 | 707/758 |
| 2015/0149428 A1* | 5/2015 | Smith | G06F 3/0482 | 707/706 |
| 2015/0154736 A1* | 6/2015 | Seitz | G06T 3/0075 | 348/36 |
| 2015/0199385 A1* | 7/2015 | Choi | G06T 11/60 | 382/305 |
| 2015/0237268 A1* | 8/2015 | Vaiaoga | H04N 5/265 | 348/218.1 |
| 2017/0094023 A1* | 3/2017 | Jack | H04L 51/10 | |
| 2019/0132462 A1* | 5/2019 | Ogawa | H04N 1/00777 | |
| 2020/0053283 A1* | 2/2020 | Li | H04N 5/23293 | |

* cited by examiner

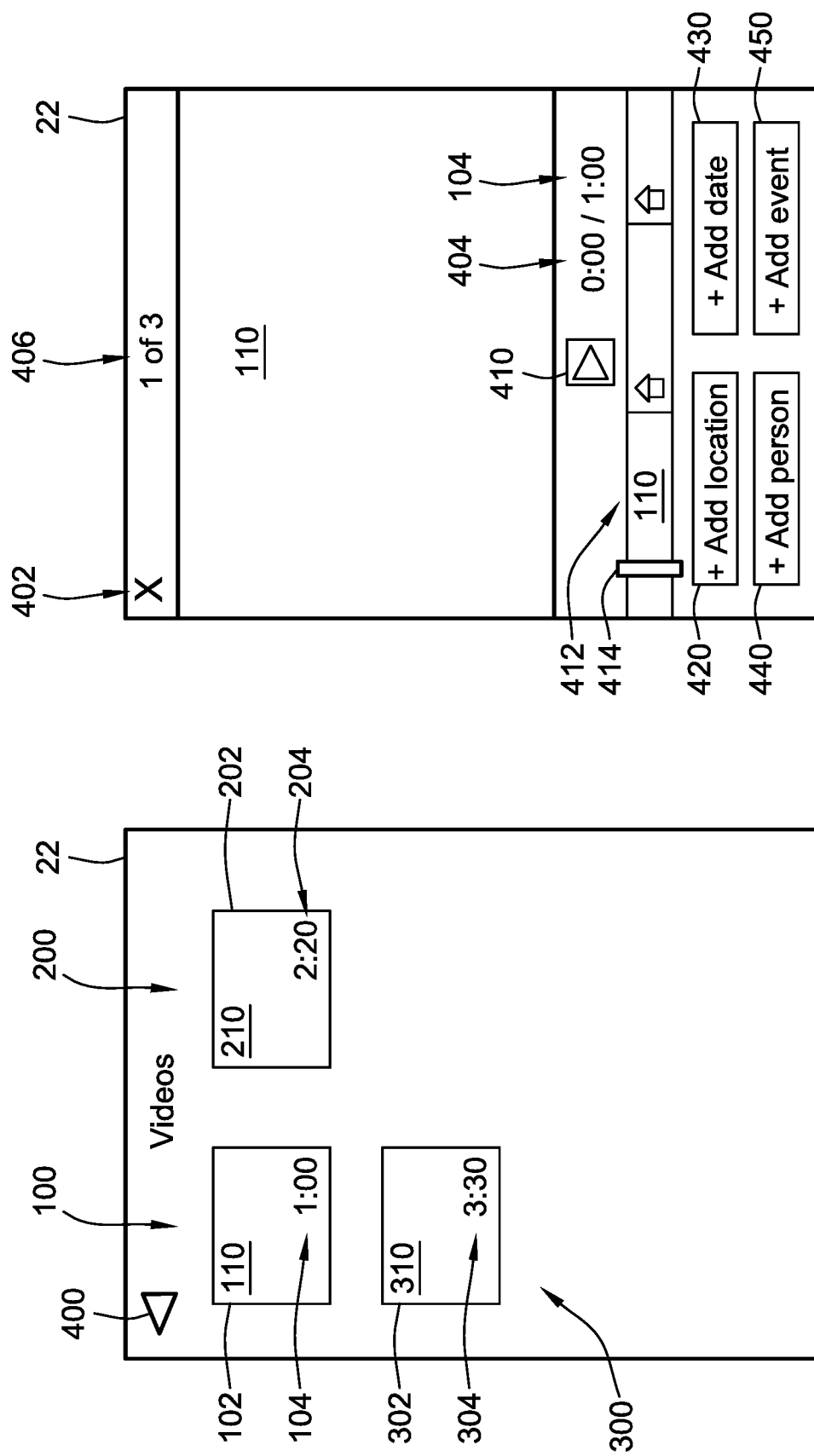

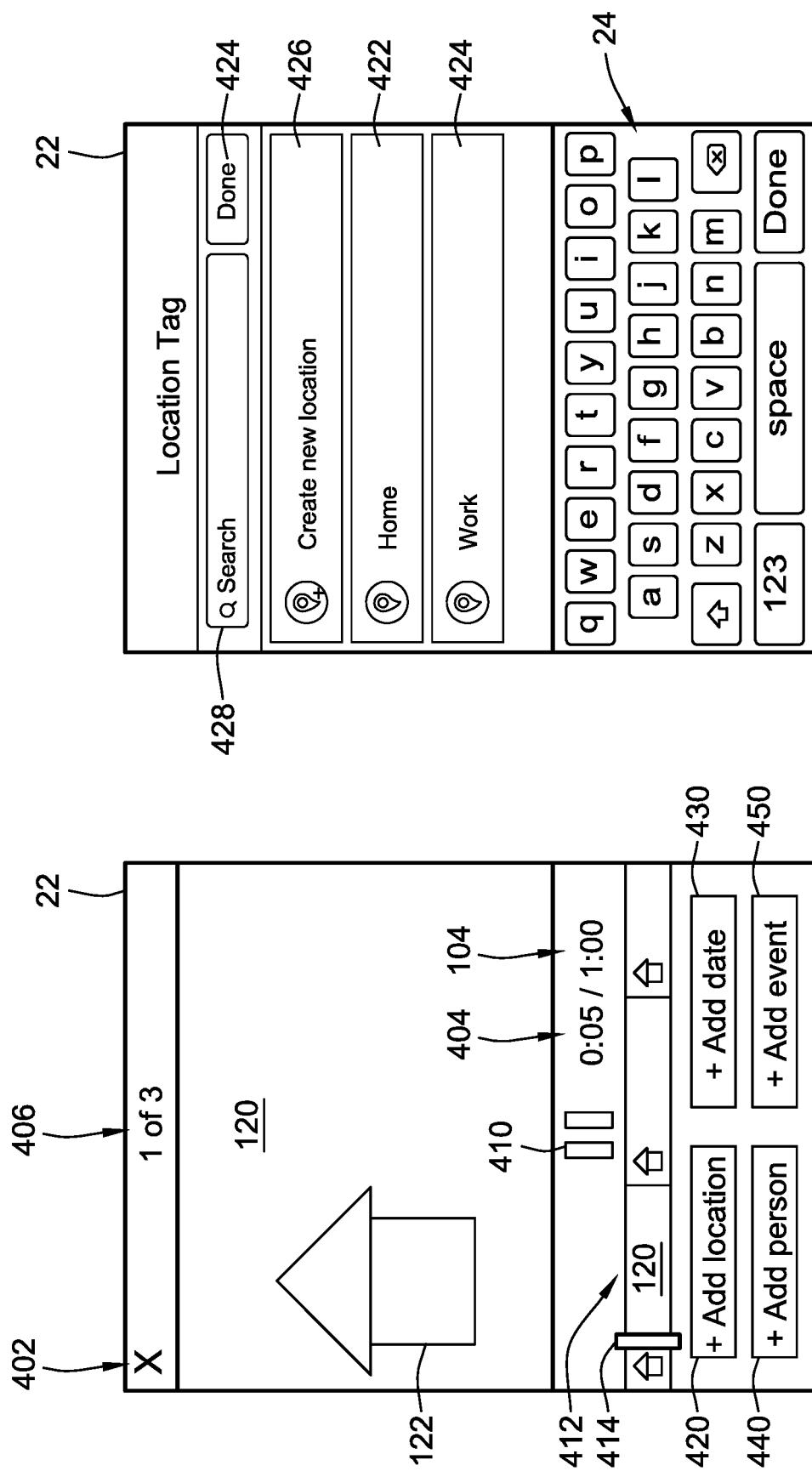

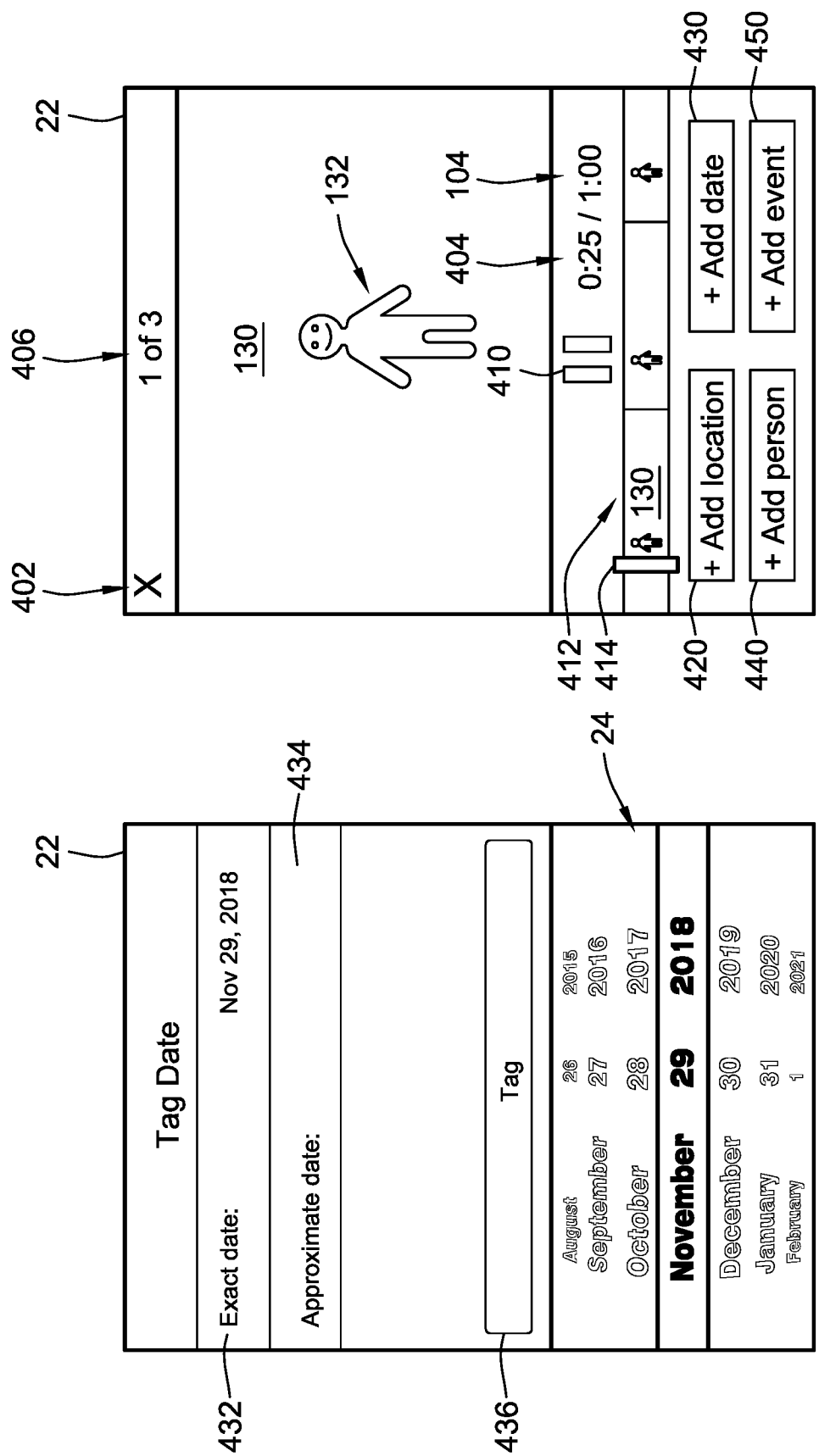

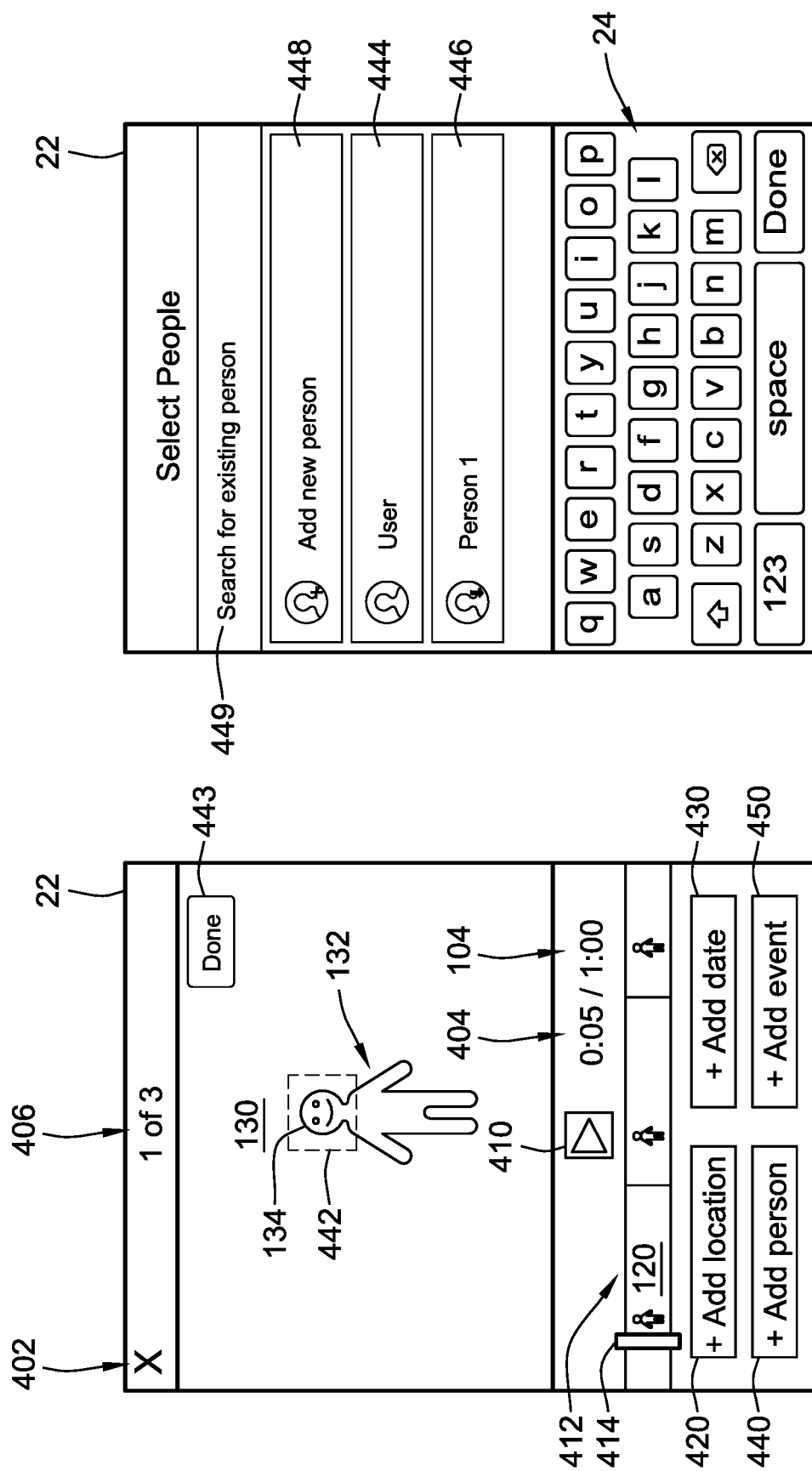

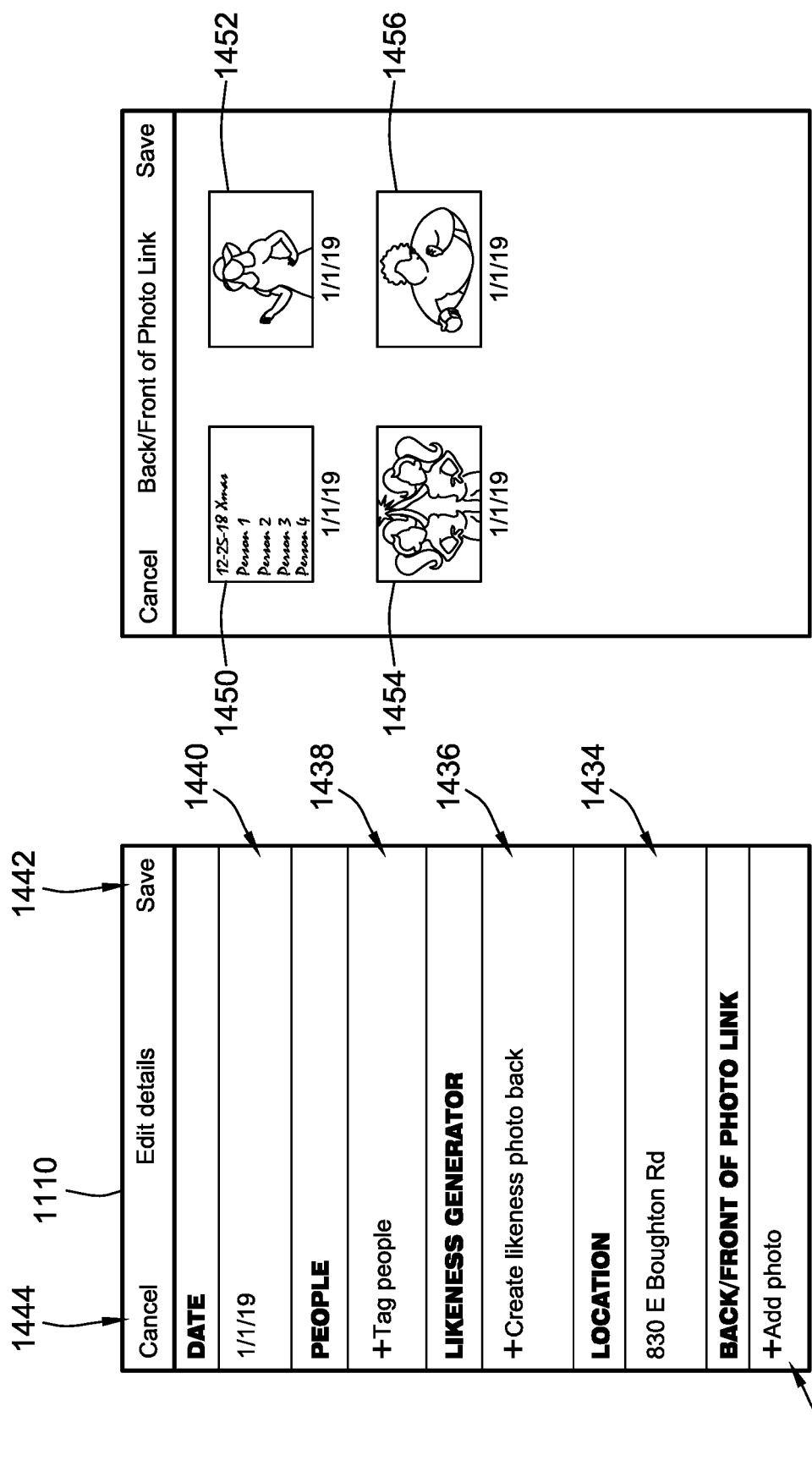

SYSTEMS AND METHODS FOR ANALYZING AND ORGANIZING DIGITAL PHOTOS AND VIDEOS

CROSS-REFERENCE TO RELATED APPLICATIONS

This application claims the benefit of, and priority to, U.S. Provisional Application No. 62/789,288, filed Jan. 7, 2019, which is hereby incorporated by reference herein in its entirety.

TECHNICAL FIELD

The present disclosure relates generally to systems and methods for organizing digital files, and more particularly, to systems and methods for organizing and/or displaying digital photographs or videos.

BACKGROUND

With the evolution of digital cameras, people often store many digital photographs and/or digital videos (e.g., tens, hundreds, thousands, etc.) on personal devices (e.g., smartphones, tablets, laptop computers, etc.) It is often useful to organize these digital photograph and/or videos based on, for example, the date the photo/video was generated, the location that the photo/video was generated, and/or the content of the photo/video. Organizing digital photographs and/or digital videos can aid the user in quickly and efficiently finding digital photographs and/or digital videos stored within a large library of photos/videos. Similarly, it is often useful to associate a first digital photograph or video with at least one other digital photograph or video such that accessing one photograph or video permits a user to quickly access the associated photograph(s) or video(s) without having to individually search for them. The present disclosure is directed to solving these and other problems.

SUMMARY

According to some implementations of the present disclosure, a computer-implemented method for organizing digital videos, each of the digital videos having content data and metadata, the content data being reproducible as an initial video frame, a final video frame, and a plurality of video frames therebetween includes analyzing the content data of a first digital video to associate at least a first portion of a first one of the plurality of video frames of the first digital video with a first automatically-generated content tag, the first video frame of the first digital video being associated with a first time $t_1$ of the first digital video, automatically generating a first thumbnail image associated with the first digital video, the first thumbnail image including at least a second portion of the first video frame of the first digital video, displaying, on a video display device, the first thumbnail image associated with the first digital video, and responsive to receiving a selection of the first thumbnail image associated with the first digital video via a user interface, causing the first digital video to be played on the video display device starting at the first time $t_1$.

According to some implementations of the present disclosure, a computer-implemented method for organizing digital videos, the digital videos having content data and metadata, the content data including an initial video frame, a final video frame, and a plurality of video frames therebetween includes while a first digital video is playing on a video display device, causing the first digital video to be paused at a first time $t_1$ responsive to an input received via a user interface such that a first one of the plurality of video frames of the first digital video is displayed, receiving, via the user interface, a user-generated tag, associating the user-generated content tag with the first video frame of the first digital video, generating a first thumbnail image associated with the first digital video, the first thumbnail image including at least a portion of the first video frame of the first digital video, displaying the first thumbnail image associated with the first digital video on the video display device, and responsive to receiving a selection of the first thumbnail image via the user interface, causing the first digital video to be played on the video display device starting at the first time $t_1$.

According to some implementations of the present disclosure, a computer-implemented method for organizing a plurality of digital videos, each of the plurality of digital videos having content data and metadata, the content data including an initial video frame, a final video frame, and a plurality of video frames therebetween includes analyzing the content data of a first one of the plurality of digital videos to associate at least a first portion of a first one of the plurality of video frames of the first digital video with a first automatically-generated content tag, the first video frame of the first digital video being associated with a first time $t_1$ of the first digital video, automatically generating a first thumbnail image associated with the first digital video, the first thumbnail image including at least a second portion of the first video frame of the first digital video, analyzing the content data of a second one of the plurality of digital videos to associate at least a first portion of a first one of the plurality of video frames of the second digital video with a second automatically-generated content tag, the first video frame of the second digital video being associated with a first time $t_1$ of the second digital video, automatically generating a second thumbnail image associated with the second digital video, the second thumbnail image including at least a second portion of the first video frame of the second digital video, displaying the first thumbnail image associated with the first digital video, the second thumbnail image associated with the second digital video, or both, on the video display device, responsive to a selection of the first thumbnail image associated with the first digital video, causing the first digital video to be played on the video display device starting at the first time $t_1$ of the first digital video, and responsive to a selection of the second thumbnail image associated with the second digital video, causing the second digital video to be played on the video display device starting at the first time $t_1$ of the second digital video.

According to some implementations of the present disclosure, a computer-implemented method includes storing, in a file repository, a plurality of digital photographs; causing a first one of the plurality of digital photograph to be displayed on a video display device; responsive to receiving an indication that a user desires to digitally link the first digital photograph with another one of the plurality of photographs, prompting the user to select one of the plurality of digital photographs to be digitally linked to the first digital photograph; responsive to the user selecting a second one of the plurality of digital photographs, digitally linking the first digital photograph with the second digital photograph; subsequent to the first digital photograph being digitally linked with the second digital photograph, causing the first digital photograph to be displayed on the display device along with an associated user-selectable flipping element; and responsive to receiving a selection of the displayed user-selectable flipping element, causing the first digital photograph to be digitally flipped such that the second digital photograph is displayed on the video display device and the first digital photograph is not displayed on the video display device.

According to some implementations of the present disclosure, a computer-implemented method for digitally linking a first digital photograph and a second digital photograph includes storing, in a file repository, a plurality of digital photographs, the plurality of digital photographs including the first digital photograph and the second digital photograph; causing the first digital photograph to be displayed on a video display device; responsive to receiving a linking input indicative of a desire to link the first digital photograph and the second digital photograph, causing the first digital photograph to be digitally linked to the second digital photograph; causing a first user-selectable flipping element and the first digital photograph to be displayed on the video display device; and responsive to receiving a selection of the first user-selectable flipping element, digitally flipping, on the display device, the first digital photograph such that subsequent to the digitally flipping, the second digital photograph is displayed on the video display device and the first digital photograph is not displayed on the video display device.

According to some implementations of the present disclosure, a method for training a regression algorithm for use in comparing one or more facial features of a first person with one or more corresponding facial features of a second person includes analyzing a first digital photograph of the first person to determine a first set of facial feature data for a first facial feature of a face of the first person, the first set of facial feature data including a pose of the face in the first digital photograph, an area of the face in the first digital photograph, and one or more landmarks for the first facial feature in the first digital photograph, determining, based at least in part on the first set of facial feature data, a second set of facial feature data for the first facial feature of the face, analyzing a second digital photograph of the first person to determine a third set of facial feature data for the first facial feature of the face of the first person, the third set of facial feature data including a pose of the face in the second digital photograph, an area of the face in the second digital photograph, and one or more landmarks for the first facial feature of the face in the second digital photograph, determining, based at least in part on the third set of facial feature data, a fourth set of facial feature data for the first facial feature of the face, and determining a regression model for the first facial feature of the first person based on the first set of facial feature data, the second set of facial feature data, the third set of facial feature data, and the fourth set of facial feature data, wherein inputting facial feature data associated with a corresponding first facial feature of the second person into the regression model results in an output value that is indicative of a similarity between the first facial feature of the first person and the corresponding first facial feature of the second person.

According to some implementations of the present disclosure, a computer-implemented method for comparing one or more facial features of a plurality of persons and displaying the results includes receiving, via a user input device, a selection of a first person, the first person being associated with a regression model stored in a photo repository, the regression model being associated with a first facial feature of the first person, responsive to receiving an input indicative of a desire to compare the first person with a second person, causing facial feature data associated with a corresponding first facial feature of the second person to be inputted into the regression model to obtain an output value from the regression model indicative of a similarity between the first facial feature of the first person and the corresponding first facial feature of the second person, and displaying, on a video display device, (i) a first thumbnail image including at least a portion of a digital photograph of the second person and (ii) an indicium indicative of the similarity between the first facial feature of the first person and the corresponding first facial feature of the second person.

According to some implementations of the present disclosure, a computer-implemented method for comparing one or more facial features of a plurality of persons and displaying the results includes receiving, via a user input device, a selection of a first person, the first person being associated with a first regression model is stored in a photo repository, the first regression model being associated with a first facial feature of the first person, responsive to receiving an input indicative of a desire to compare the first person to a plurality of other persons, causing facial feature data associated with each of the plurality of other persons to be inputted into the first regression model to obtain a first output value indicative of a similarity between the first facial feature of the first person and a corresponding first facial feature of each of the plurality of other persons, and responsive to determining that the first output value for at least one of the plurality of other persons is greater than a predetermined threshold, displaying, on a video display device, a thumbnail image including at least a portion of a digital photograph of the at least one of the plurality of other persons and an indicium indicative of the similarity between the first facial feature of the first person and the corresponding first facial feature of the at least one of the plurality of other persons.

The above summary is not intended to represent each embodiment or every aspect of the present invention. Additional features and benefits of the present invention are apparent from the detailed description and figures set forth below.

BRIEF DESCRIPTION OF THE DRAWINGS

FIG. 2A illustrates exemplary thumbnail images associated with digital videos displayed on a video display device according to some implementations of the present disclosure;

FIG. 2B illustrates an initial video frame of a first digital video displayed on the video display device subsequent to a user's selection of a first thumbnail of FIG. 2A associated with the first digital video according to some implementations of the present disclosure;

FIG. 2C illustrates a first video frame of the first digital video displayed on the video display device according to some implementations of the present disclosure;

FIG. 2D illustrates selectable location tags displayed on the video display device responsive to a user selection of a location tag element of FIG. 2C according to some implementations of the present disclosure;

FIG. 2E illustrates selectable date tags displayed on the video display device responsive to a user selection of a date tag element of FIG. 2C according to some implementations of the present disclosure;

FIG. 2F illustrates a second video frame of the first digital video displayed on the video display device according to some implementations of the present disclosure;

FIG. 2G illustrates a movable region of interest overlaid on the second video frame of FIG. 2F responsive to a user selection of a person tag element of FIG. 2F according to some implementations of the present disclosure;

FIG. 2H illustrates selectable person tags displayed on the video display device according to some implementations of the present disclosure;

FIG. 5B illustrates a linking element displayed on the video display device according to some implementations of the present disclosure;

FIG. 5C illustrates a plurality of digital photographs displayed on the video display device according to some implementations of the present disclosure;

Figure 1:
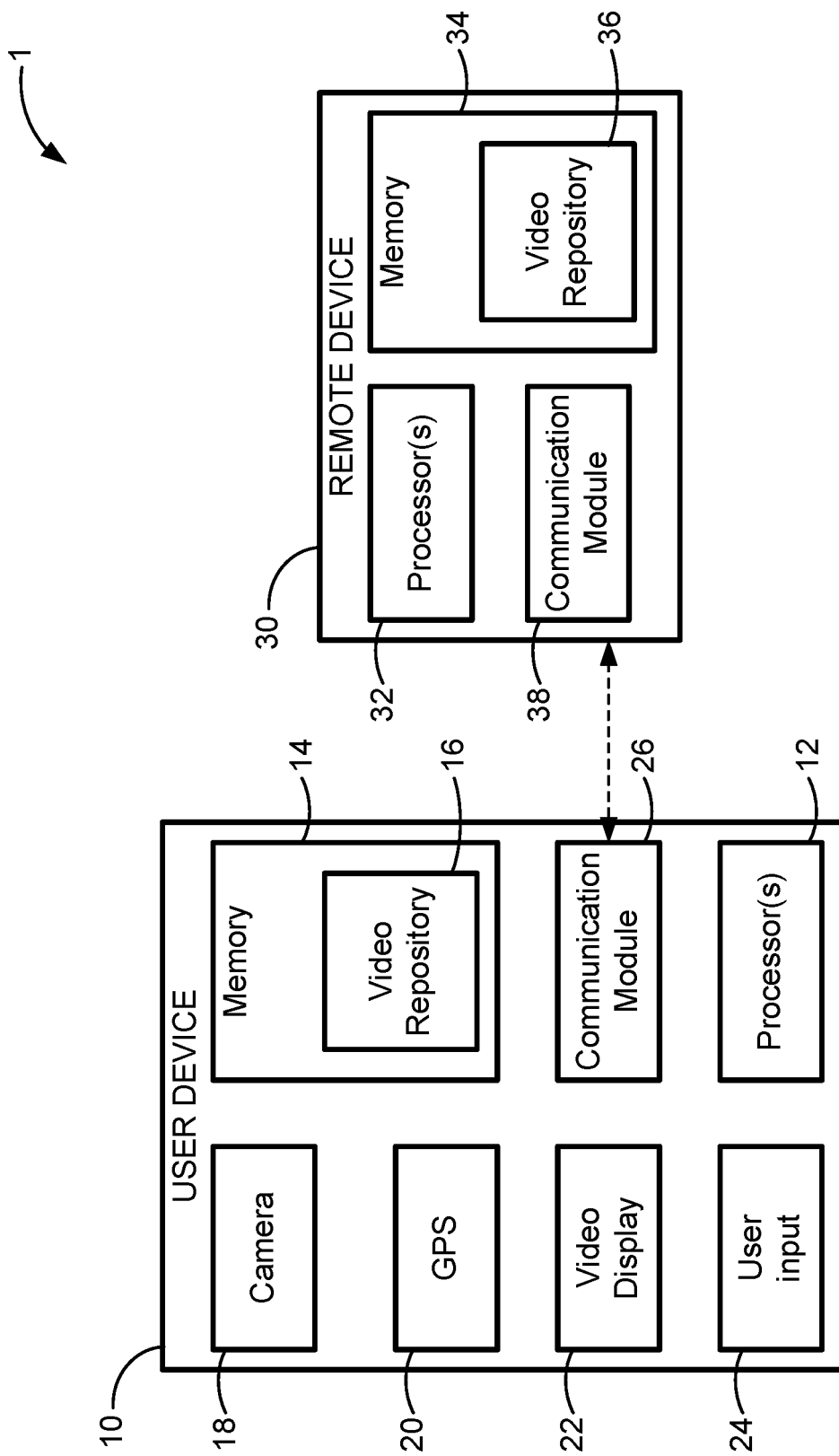
FIG. 1 is a functional block diagram of a system for organizing digital videos according to some implementations of the present disclosure.

While the disclosure is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Digital Video Tagging

With the evolution of digital cameras, people often have a voluminous library of digital videos (e.g., videos recorded using a smartphone camera) that stored and/or can be accessed on, for example, personal device(s) (e.g., smartphones, tablets, laptop computers, etc.) Often, digital videos are organized in a library based on the date that the video was generated, or in albums (e.g., user generated albums). Each digital video can be associated with a user-selectable thumbnail image that includes, for an example, an image from the digital video. Selecting the thumbnail image causes the digital video to be displayed on a display device. However, unlike digital photographs which are a single image, digital videos contain a series of video frames. If a user desires to view a certain event or person in a digital video (e.g., five minutes into the video), the user must either wait five minutes or take affirmative action(s) once the video starts playing (e.g., fast forwarding) to view that event or person. This leads to inefficiencies when attempting to view a particular point in time in one of many videos that are stored on the user's device.

With the advent of digital videos, people often convert older video formats (e.g., VHS, 8 mm film, etc.) to a digital format. In particular, a VHS tape or an 8 mm film, for example, are often converted into a single digital video file. However, old cameras would often record a series of videos on a single film (e.g., VHS or 8 mm film) such that when the film is converted, the digital video file contains a series of video segments. For example, a converted VHS tape that was originally recorded using a camcorder may contain video segments that were generated on different dates, different locations, and/or contain multiple people or events. While the converted digital version may be associated with a date of the conversion, it is a blank slate and not associated with a date that the video or video segments were generated, location information, or content information (e.g., the names of people or events in the video). Thus, it would be advantageous to permit a user to manually tag digital videos (e.g., with person tags, location tags, date tags, etc.) to aid in organizing and accessing these digital videos.

Referring to FIG. 1, a system 1 for organizing digital videos includes a user device 10 and a remote device 30. Generally, the system 1 organizes digital videos (e.g., digital videos generated by the user device 10) by automatically generating tags and associating them with the digital videos, receiving user-generated tags and associating them with the digital videos, or both. Assigning an automatically-generated tag and/or a user-generated tag to a desired time within a digital video causes a selectable thumbnail image to be generated, which can then be displayed on the video display device. Selecting the thumbnail image causes the digital video to be played starting at the desired time associated with the assigned tag. Thus, the system 1 can be used to organize digital videos and provide an efficient and intuitive user interface for accessing (e.g., viewing) particular people, events, tags, locations, etc. that appear in a video.

The user device 10 includes one or more processors 12 (hereinafter "processor"), one or more memory devices 14 (hereinafter, "memory device"), a digital camera 18, a GPS module 20, a video display device 22, a user input device 24, and a communication module 26. The processor 12 of the user device 10 is communicatively coupled to the memory device 14, the digital camera 18, the GPS module 20, the video display device 22, the user input device 24, and the communication module 26. The processor 12 is generally used to control the operation of these various components of the system 1 and implement the methods described herein. The processor 12 can be a general or special purpose processor or microprocessor, and the user device 10 can include any suitable number of processors (e.g., one processor, two processors, four processors, ten processors, etc.)

The memory device 14 is generally used to store machine readable instructions that are executable by the processor 12. The memory device 14 can be any suitable computer readable storage device or media, such as, for example, a random or serial access memory device, a hard disk drive, a solid state drive, a flash memory device, etc. In particular, the memory device 14 stores a video repository 16. The video repository 16 of the memory device 14 stores one or more digital videos (e.g., that are generated by the camera 18). As described in further detail herein, each of the digital videos stored in the video repository 16 include content data and metadata. While the memory device 14 is described herein as including video repository 16, the memory device 14 can also store therein one or more digital photographs (e.g., a combined video/photo repository).

The content data of each digital video includes data reproducible as a series of video frames that can be displayed in succession, for example, on the video display device 22. More specifically, the content data of a digital video includes an initial video frame associated with an initial time $t_0$ of the digital video (e.g., the beginning of the digital video), a final video frame associated with an end time $t_{end}$ of the digital video (e.g., the end of the digital video), and a plurality of video frames therebetween. Each of the plurality of video frames is associated with a time between the initial to of the digital video and the end time $t_{end}$ of the digital video. The number of video frames in the content data of a digital video is a function of the total length (time) of the digital video and the number of frames per second ("fps") that were generated. For example, if the digital video is generated at 30 fps, and the digital video is 10 seconds long, the content data of that digital video includes 300 video frames: an initial video frame, a final video frame, and 298 video frames therebetween.

The metadata of a digital video stored in the video repository 16 includes location data indicative of a geographic location where the digital video was generated and/or date and time data associated with the date and/or time when the digital video was generated. In some implementations, the metadata of a digital video can also include file information (e.g., file name, file type, file size, etc.), camera information (e.g., camera make/model, fps, etc.), author information, (e.g. author name, device name, etc.)

The digital camera 18 is generally configured to generate image data reproducible as one or more digital images, including still images, video images, or both. Thus, the digital camera 18 can be used to generate the digital videos that are stored in the video repository 16 of the memory device 14. The digital camera 18 can optionally include optical and/or digital zoom features, a light to aid in generating digital videos, filters, or any combination thereof. While the user device 10 is shown as including one digital camera 18, the user device 10 can include a plurality of digital cameras (e.g., two digital cameras, three digital cameras, etc.) For example, the user device 10 can include a first front-facing digital camera and an opposing, second rear-facing digital camera.

The GPS module 20 (e.g., GPS sensor) is configured to receive GPS signals for determining a location of the user device 10 (e.g., expressed in terms of latitude and longitudinal, or other coordinates). Thus, when a digital video is generated using the camera 18 of the user device 10, the GPS module 20 can be used to generate the location data indicative of the geographic location of the user device 10 when the photo or video is generated that is then included in the metadata of the digital video when stored in the video repository 16 of the memory device 14. This location data from the GPS module 20 is then stored as part of the digital video's metadata that can later be analyzed, for example, to automatically assign a location tag to the digital video.

The video display device 22 is a human-machine interface (HMI) including a graphical user interface (GUI) that can display images (e.g., still images, video images, etc.) As described in further detail herein, the video display device 22 of the user device 10 can be used to display digital videos that are stored in the video repository 16 of the memory device 14. The video display device 22 can be, for example, a general or special purpose desktop computer, a laptop, a tablet computer, a smartphone, a display monitor, a television, LED display, LCD display, or the like, or any combination thereof. The user input device 24 is configured to sense inputs made by a human user interacting with the user device 10 and can be, for example, a touchscreen or touch-sent vie substrate, a mouse, a keyboard, or any combination thereof. For example, as described herein, the user input device 24 can receive input(s) from a human user that controls what is displayed on the video display device 22. In some implementations, the user input device 24 is integrated within the video display device 22 (e.g., the user input device 24 and the video display device are a touchscreen display of a smartphone).

The communication module 26 is configured for wireless communication (e.g., via a cellular network) with the remote device 30. As described in further detail herein, the communication module 26 can be used to transmit data stored in the video repository 16 of the memory device 14 of the user device 10 to the remote device 30 for processing, and/or transmit data stored in the video repository 36 of the memory device 34 of the remote device 30 to be displayed on the video display device 22 of the user device 10. The communication module 26 can include, for example, an antenna, a receiver, a transmitter, a transceiver, or any combination thereof.

Generally, the user device 10 can be, for example, a general or special purpose desktop computer, a laptop computer, a tablet computer, or a smartphone, with all or some of the components contained therein. In some implementations, the user device 10 is a smartphone containing each of the processor 12, memory device 14, camera 18, GPS module 20, video display device 22, user input device 24, and the communication module 26 within a housing. While the user device 10 is shown in FIG. 1 as including all of the components described herein, more or fewer components can be included in a user device. For example, an alternative user device (not shown) includes the processor 12, the memory device 14, the video display device 22, the user input 116, and the communication module 26. Thus, various user devices can be formed using any portion of the components described herein.

The remote device 30 includes one or more processors 32 (hereinafter, "processor"), one or more memory devices 34 (hereinafter, "memory device"), and a communication module 38. The processor 32 is the same as, or similar to, to the processor 12 of the user device 10 described herein and is communicatively coupled to the memory device 34 and communication module 128. The memory device 34 is the same as, or similar to, the memory device 14 of the user device 10 and includes a video repository 36 that is the same as, or similar to, the video repository 16 of the memory device 14 of the user device 10. The video repository 36 stores digital videos therein. The communication module 38 of the remote device 30 is configured to wirelessly communicate with the communication module 26 of the user device 10 (e.g., via a cellular network, WiFi, or the like). For example, the remote device 30 can receive data from the video repository 16 of the user device 10 via the communication module 38 and store the data in the video repository 36 (e.g., such that all of the data stored in the video repository 16 of the user device 10 is stored in the video repository 36). In some implementations, the remote device 30 is a remote server that communicates with the user device 10 via the Internet (e.g., via a cellular network).

While the system 1 is shown in FIG. 1 as including one user device 10, in some implementations, the remote device 30 can be communicatively coupled to a plurality of user devices that are the same as, or similar to, the user device 10 (e.g., two user devices, ten user devices, one hundred user devices, one thousand user devices, etc.) Thus, data from the video repository of each of a plurality of user devices can be transmitted and stored in the video repository 36 of the remote device 30.

Referring to FIG. 2A, a first thumbnail image 100, a second thumbnail image 200, and a third thumbnail image 300 are displayed on the video display device 22. The first thumbnail image 100 is associated with a first digital video, the second thumbnail image 200 is associated with a second digital video, and the third thumbnail image 300 is associated with a third digital video. The first, second, and third digital videos are stored the video repository 16 of the user device 10 and/or the video repository 36 of the remote device 30. A user-selectable navigation element 400 is also displayed on the video display device 22. The user-selectable navigation element 400 can be selected by a user (e.g., by tapping or clicking) to navigate away from the thumbnail images 100, 200, and 300 displayed on the video display device 22 (e.g., to an album of photos and videos, a home page/screen or dashboard, etc.)

As shown, the first thumbnail image 100 associated with the first digital video includes a boundary 102 and a runtime indicium 104 representative of the length (e.g., total time) of the first digital video. The first thumbnail image 100 also includes at least a portion of an initial video frame 110 of the first digital video that is associated with an initial time $t_0$ of the first digital video. As shown, both the initial video frame 110 and the runtime indicium 104 are positioned within the boundary 102. The runtime indicium 104 is overlaid on a portion of the initial video frame 110 and includes alphanumeric text that provides an indication of the total length of the first digital video (e.g., expressed in terms of seconds, minutes, hours, or any other suitable measurement of time, or any combination thereof). In this example, the runtime indicium 104 indicates that the first digital video is one (1)

minute long. While the runtime indicium 104 is shown as being positioned within the boundary 102, the runtime indicium 104 can more generally be positioned generally adjacent to the boundary 102 (e.g., below the boundary 102).

The second thumbnail image 200 associated with the second digital video is similar to the first thumbnail image 100 associated with the first digital video and includes a boundary 202 and a runtime indicium 204. At least a portion of an initial video frame 210 of the second digital video is displayed within the boundary 202 of the second thumbnail image 200. The runtime indicium 204 of the second thumbnail image 200 differs from the runtime indicium 104 in that it indicates the second digital video is two (2) minutes and twenty (20) seconds long. The third thumbnail image 300 associated with the third digital video is similar to the first thumbnail image 100 and the second thumbnail image 200 and includes a boundary 302 and a runtime indicium 304. At least a portion of an initial video frame 310 of the third digital video is displayed within the boundary 302 of the second thumbnail image 300. The runtime indicium 304 of the third thumbnail image 300 differs from the runtime indicium 104 and the runtime indicium 204 in that the runtime indicium 304 indicates that the third digital video is three (3) minutes and thirty (30) seconds long.

Each of the first thumbnail image 100, the second thumbnail image 200, and the third thumbnail image 300 are user-selectable, such that responsive to a selection of the first thumbnail image 100 (e.g., by tapping or clicking within the boundary 102 of the first thumbnail image 100), the initial video frame 110 of the first digital video is displayed on the video display device 22. In this manner, a user can select one of the first digital video, second digital video, and the third digital video to be displayed on the video display device 22 by selecting one of the first thumbnail image 100, the second thumbnail image 200, or the third thumbnail image 300, respectively.

Referring to FIG. 2B, responsive to a user selection of the first thumbnail image 100 (FIG. 2A), the initial video frame 110 of the first digital video is displayed on the video display device 22. In addition to the initial video frame 110, a user-selectable navigation element 402, a current time indicium 404, a video indicium 406, a playback control element 410, preview frames 412, a playback slider element 414, a location tag element 420, a date tag element 430, a person tag element 440, and an event tag element 460 are displayed on the video display device 22. The runtime indicium 104 (FIG. 2B) indicating the total length of the first digital video is also displayed adjacent to the current time indicium 404, which indicates the time within the video that is associated with the displayed video frame (in this example, the initial video frame 110 of the first digital video). As described above, the initial video frame 110 of the first digital video is associated with the initial time $t_0$ of the first digital video. Thus, in the example shown in FIG. 2B, the current time indicium 404 indicates that the current time within the first digital video is zero (0) seconds. The video indicium 406 is also displayed to provide an indication of which of the digital videos is being displayed on the video display device 22. As shown in FIG. 2A, there are three digital videos in the library, thus, the video indicium 406 indicates that the first digital video of three total digital videos is being displayed. Alternatively, the video indicium 406 can be a file or video name associated with the first digital video (e.g., "video #1").

The navigation element 402, the playback control element 410, the playback slider element 414, the location tag element 420, a date tag element 430, the person tag element 440, and the event tag element 460 displayed on the video display device 22 are user-selectable (e.g., by clicking or tapping). Selecting the navigation element 402 causes the video display device 22 to revert to the previous display, such that the user can use the navigation element 402 to navigate from what is shown in FIG. 2B back to what is shown in FIG. 2A (e.g., to select a different digital video for playback). As shown in FIG. 2B when the first digital video is not playing, the playback control element 410 is a play symbol (e.g., a generally triangular shape). Selecting the playback control element 410 causes the first digital video to begin playing on the video display device 22. That is, selecting the playback control element 410 causes each of the subsequent video frames of the first digital video to be displayed on the video display device 22. Alternatively, in some implementations, the playback of the first digital video begins automatically responsive to a user selection of the first thumbnail image 100 (FIG. 2A). The playback slider 414 is overlaid on the preview frames 412 of the first digital video. The preview frames 412 include at least a portion of the next, successive video frames following the current video frame that is displayed on the video display device 22. In this example, the preview frames 412 include three video frames: the initial video frame 110 (the current video frame displayed on the video display device), the next video frame following the initial video frame, and the next video frame after that. The playback slider 414 is overlaid on the preview frames 412 and more specifically, on the initial video frame 110 because the initial video frame 110 is displayed on the video display device. By sliding the playback slider 414 (e.g., by tapping or clicking and holding), a user can navigate through the various video frames of the first digital video to find a particular video frame or time within the first digital video.

Referring to FIG. 2C, responsive to a user selection of the playback control element 410, the first digital video begins to play on the video display device 22 such that the first digital video is advanced from the initial video frame 110 at the initial time $t_0$ to a first video frame 120 at a first time $t_1$ that is subsequent to the initial time $t_0$. As described above, in some implementations, selecting the first thumbnail image 100 (FIG. 2A) automatically begins playback of the first digital video, in which case playback will proceed to FIG. 2C without requiring the user to select the playback control element 410 (FIG. 2B). As shown, when the first digital video advances to the first video frame 120 (which is subsequent to the initial video frame 110), the current time indicium 404 is updated to display the first time $t_1$, which in this example is one (1) second. As shown in this example, a building 122 is included within the first video frame 120.

When the building 122 is viewed by a user, the user may desire to associate the first digital video with a location. To do so, the user can pause playback of the first digital video using the playback control element 410 (which is now displayed as a pause symbol) and select (e.g., by clicking or tapping) the location tag element 420. Referring to FIG. 2D, selecting the location tag element 420 causes a first location tag 422, a second location tag 424, and a custom location tag generator 426 to be displayed on the video display device 22. In this example, the first location tag 422 is associated with a "home" location (e.g., the home of the user) and the second location tag 424 is associated with a "work" location (e.g., the workplace of the user). If the user desires to associate the first digital video with the home location (e.g., based on the building 122 in the first video frame 120), the user can select (e.g., by clicking or tapping) the first location tag 422, thereby associating the first digital video with the first location tag 422. Likewise, if the user desires to associate the first digital video with the work location (e.g., based on the building 122 in the first video frame 120), the user can select the second location tag 424, thereby associating the first digital video with the second location tag 424.

If the user desires to associate the first digital video with a location other than those associated with the first location tag 422 or the second location tag 424, the user can select the custom location tag generator 426, which prompts the user to input the name of the location via the user input device 24 (in this example, a touchscreen keyboard displayed on the video display device 22), generating a third location tag. In this manner, the user can create one or more custom location tags and associate digital videos with one or more of these locations. This may be especially desirable if the metadata of the digital video does not contain location data indicative of the geographic location where the digital video was generated (e.g., such that a location tag for the digital video cannot be automatically generated, as described in further detail herein). Once created, the third location tag generated by the user will be displayed along with the first location tag 422 and the second location tag 424 the next time that the user selects the location tag element 420 (e.g., when tagging another digital video). Additionally, a search bar 428 and a navigation element 429 are displayed on the video display device 22. Responsive to a selection of the search bar 428 (e.g., by clicking or tapping the search bar 428), a user can input search criteria via the user input device 24 (in this example, the touchscreen keyboard) to search for one or more location tags to then be selected (e.g., rather than scrolling through a long list of location tags). Responsive to a selection of the navigation element 429 (e.g., by clicking or tapping the navigation element 429), the user is returned to the previous display (in this example, what is shown in FIG. 2C).

While only the first location tag 422 and the second location tag 424 are displayed on the video display device 22 in FIG. 2D responsive to a selection of the location tag element 420 (FIG. 2C), more generally, any suitable number of location tags can be displayed on the video display device (e.g., four location tags, ten location tags, twenty location tags, one-hundred location tags, etc.) either simultaneously or in a manner that permits a user to scroll through each of the various location tags. Further, the location tags can include alphanumeric text indicative of one or more types of location information, such as, for example, a street address, a town or city name, a county name, a country name, a landmark name, a business name, or any combination thereof.

As described above, the digital video may have been converted from an older film (e.g., VHS or 8 mm film) and thus contain video segments that were generated on different dates. A user can manually tag the digital video with a plurality of location tags (e.g., two, five, ten, twenty, etc.) in the same or similar manner as described above to associate the digital video with those locations. Thus, as described in further detail herein, a user-selectable thumbnail image will be generated for each of the plurality of location tags for the digital video.

The user may also desire to associate the first digital video with the date on which it is was generated. To do so, the user can select the date tag element 430 (FIG. 2C), which causes an exact date 432, an approximate date 434, and a date tag 436 to be displayed on the video display device 22, as shown in FIG. 2E. The exact date 432 indicates the actual, exact date when the first digital video was generated based on the metadata of the first digital video. If the user desires to associate the first digital video with the exact date 432, the user can select the date tag 436 (e.g., by clicking or tapping the date tag 436), which causes the first digital video to be associated with the exact date 432 and also automatically returns the user to the previous display (FIG. 2C).

In some cases, the metadata of the first digital video does not include data indicative of the date when the first digital video was generated. For example, if the first digital video was not generated on the user device 10 and was instead imported from another source, the metadata may not contain data indicative of the date that it was generated. In particular, this may occur if the first digital video was converted to a digital format from some other format (e.g., historical video footage, a camcorder tape, a VHS tape, 8 mm film, etc.) In this scenario, a user can input the approximate date 434 based on the content of the first digital video (e.g., the user recognizes the building 122 shown in the first video frame 120 and approximates the date) using the user input device 24. In this example, the user input device 24 includes slidable month, date, and year inputs. Once the user has input the approximate date 434 and desires the first digital video to be associated with that approximate date 434, the user selects the date tag 436 (e.g., by clicking or tapping the date tag 436), which causes the first digital video to be associated with the approximate date 434 and also returns the user to the previous display (in this example, what is shown in FIG. 2C). Moreover, the user can associate the digital video with a plurality of date tags (e.g., two, five, ten, twenty, etc.) in the same or similar manner described above. This may be advantageous when the digital video is converted from an older film (e.g., VHS or 8 mm film) and contains a plurality of video segments that were generated on different dates.

Referring now to FIG. 2F, as the first digital video continues to play (e.g., subsequent to the assignment of the location tag and/or date tag described above), a second video frame 130 associated with a second time $t_2$ of the first digital video is displayed on the video display device 22. In this example, the second time $t_2$ is twenty-five (25) seconds, which is indicated on the video display device 22 via the current time indicium 404. The second video frame 130 includes a person 132. Upon identifying the person 132 in the second video frame 130, a user can associate the appearance of the person 132 at time $t_2$ in the video with a person tag by selecting the person tag element 440 (e.g., by clicking or tapping the person tag element 440 via the user input device 24). To do so, playback of the first digital video on the video display device 22 can be stopped by the user via the playback control element 410 (e.g., clicking or tapping the pause symbol), or automatically responsive to the user selecting the person tag element 440.

As shown in FIG. 2G, in some implementations, responsive to the selection of the person tag element 440, playback of the first digital video is paused and a movable region of interest 442 is displayed on the video display device 22. More specifically, the movable region of interest 442 is overlaid on the second video frame 130. The user can adjust the size and position of the region of interest 442 via the user input device 24 (e.g., by clicking and dragging the region of interest 442, tapping and holding the region of interest 442, using a multi-touch gesture on a touchscreen to resize the region of interest 442, etc.) For example, as shown, the user can size and position the region of interest 442 over a face 134 of the person 132. In some implementations, the second video frame 130 can be automatically analyzed (as described further herein) to identify the face 134 of the person 132, and the region of interest 442 is automatically positioned on the face 134. While the region of interest 442 is shown as having a square shape, the region of interest 442 more generally can have any suitable shape, such as, for example, a rectangular shape, a circular shape, an oval shape, a triangular shape, a polygonal shape, etc. Moreover, in other implementations, the contours of the region of interest 442 can be drawn by the user (e.g., using a touchscreen). A navigation element 443 is also displayed on the video display device 22, which a user can select to finalize the size and position of the region of interest 442.

Referring to FIG. 2H, responsive to selecting the size and position of the movable region of interest 442 and selecting the navigation element 443, a first person tag 444, a second person tag 446, a custom person tag generator 448, and a search bar 449 are displayed on the video display device 22. In this example, the first person tag 444 is associated with the user and the second person tag 446 is associated with a first person (a person other than the user, such as a friend, family member, etc.) If the user desires to associate the selected region of interest 442 (FIG. 2G) with the user (e.g., the user is the person 132 in the video), the user can select the first person tag 444 (e.g., by clicking or tapping the first person tag 444) to associate the selected region of interest 442 of the second video frame 130 with the first person tag 444, and thus the user. Likewise, if the user desires to associate the selected region of interest 442 (FIG. 2G) with the first person (someone other than the user), the user can select the second person tag 446 (e.g., by clicking or tapping the second person tag 446) to associate the selected region of interest 442 of the second video frame 130 with the second person tag 446 and thus the user. While only the first person tag 444 and the second person tag 446 are displayed on the video display device 22 in FIG. 2G, any suitable number of person tags can be displayed on the video display device 22 (e.g., a user can scroll up and down such that different person tags are displayed). In some implementations, additional person tags can be automatically populated from, for example, a contact list of the user (e.g., stored on the user device 10) and displayed on the video display device 22.

If the user desires to associate the movable region of interest 442 with a person other than those associated with the first person tag 444 or the second person tag 446, the user can generate a customized third person tag (not shown) associated with that person by selecting the custom person tag generator 448, which prompts the user to input the name of the person via the user input device 24 (in this example, a touchscreen keyboard displayed on the video display device 22). Responsive to this input, the movable region of interest 442 will then be associated with the third person tag. The generated third person tag will then be subsequently displayed with the first person tag 444 and the second person tag 446 the next time that the user selects the person tag element 440 (e.g., when tagging another digital video). Additionally, a search bar 449 is displayed on the video display device 22. Responsive to a selection of the search bar 449, the user can input search criteria (e.g., a person's first and/or last name) via the user input device (in this example, the touchscreen keyboard) to search for a person tag.

In some implementations, there may be multiple people in the second video frame 130. In such implementations, the user can associate the second video frame 130 of the first digital video with some or all of the people that are in the second video frame 130. For example, if a second person (not shown) is next to the person 132 (FIG. 2F), the user can associate the second video frame 130 with the second person as described above by selecting the person tag element 440 and selecting, for example, the second person tag 446 (FIG. 2H) as described above. Once the person 132 is associated with the user, the user can then associate the second person (not shown) with the first person by selecting the person tag element 440 (FIG. 2F), thereby causing the movable region of interest 442 to be displayed, moving the movable region interest 442 onto the face of the second person and selecting navigation element 443 (FIG. 2G), and selecting the second person tag 446 (FIG. 2H). In this manner, the user can associate a video frame of the first digital video with multiple people (e.g., three people, five people, ten people, twenty people, etc.)

In some implementations, rather than only associating the second video frame 130 with a person tag (e.g., the first person tag 444), the user can associate a group of video frames with the person tag. For example, if the user identifies the person 132 in the second video frame 130, the user can select the person tag element 440 and associate the first person tag 444 to the second video frame 130 as described herein. The user can then continue to view the first digital video, proceeding through video frames subsequent to the second video frame 130, until the person 132 is no longer in the video (e.g., the person 132 exits the field of view at a tenth video frame (not shown) of the first digital video). In such implementations, the user can then select the person tag element 440 at the tenth video frame, thereby associating multiple video frames with the first person tag 444 (e.g., the second video frame through the ninth video frame). As described in further detail herein, assigning a person tag to a particular video frame causes a thumbnail image associated with the person tag to be generated that when selected causes the digital video to be played starting at the video frame associated with the particular video frame. When multiple, sequential video frames within a digital video are associated with the person tag as described above, thereby constituting a video clip, a thumbnail image associated with the first digital video is generated that when displayed on the video display device 22 and selected by a user, causes the video clip to be played on the video display device 22.

In some implementations, selecting the person tag element 440 (FIG. 2F) does not cause the movable region of interest 442 (FIG. 2G) to be displayed on the video display device 22. Instead, in such implementations, selecting the person tag element 440 (FIG. 2F) causes the first person tag 444, the second person tag 446, and the custom person tag generator 448 to be displayed on the video display device 22, as shown in FIG. 2H. In such implementations, the entirety of the second video frame 130 is associated with the selected person tag (e.g., the first person tag 444), rather than just the portion of the second video frame 130 within the moveable region of interest 442 (FIG. 2G).

Figure 2I:
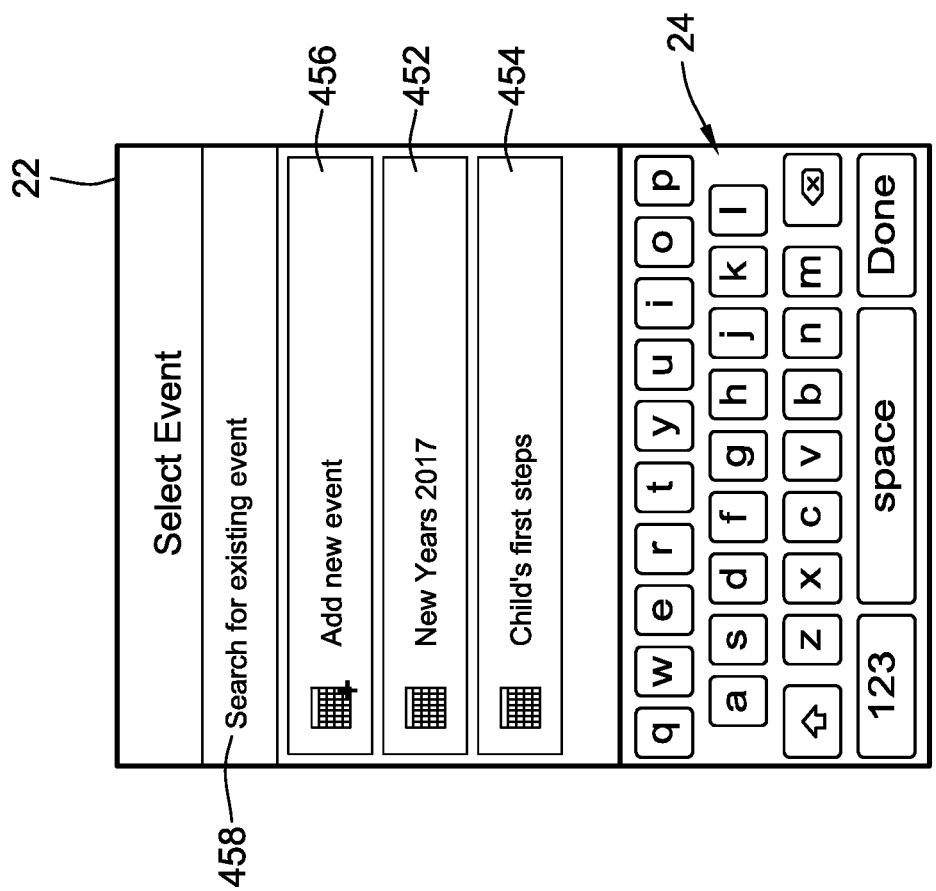
FIG. 2I illustrates selectable event tags displayed on the video display device responsive to a user selection of an event tag element of FIG. 2F according to some implementations of the present disclosure.

Referring back to FIG. 2F, in addition to, or in the alternative of, selecting the person tag element 440 to associate the second video frame 130 of the first digital video with a person tag, the user can select the event tag element 450 to associate the second video frame 130 of the first digital video with an event tag. Referring now to FIG. 2I, responsive to selecting the event tag element 450, a first event tag 452, a second event tag 454, a custom event tag generator 456, and a search bar 458 are displayed on the video display device 22. Generally, the event tag can be associated with any event, such as, for example, a milestone (e.g., a child's first steps, a graduation, an anniversary, a birthday, etc.), a holiday (e.g., Christmas, Hanukkah, New Years, Halloween, Thanksgiving, etc.), a sporting event, a performance event (e.g., a play, a movie, etc.), or any combination thereof. In the example shown in FIG. 2I, the first event tag 452 contains alphanumeric text indicative of New Year's 2017, a holiday event. The second event tag 454 includes alphanumeric text indicative of a milestone event, which in this example, is a child's first steps. For example, if the user sees that the person 132 in the second video frame 130 is wearing a "Happy New Year 2017" hat, the user can select the first event tag 452 to associate the first digital video with that particular event. Likewise, in another example of event tagging, if the person 132 in the second video frame 130 is a child and the user sees that the child begins walking in the second video frame 130, the user can select the second event tag 454 and associate the second video frame 130 the first digital video with that event. The user may, of course, wish to associate the second video frame 130 of the first digital video with an event other than those associated with the first event tag 452 and the second event tag 454. To do so, the user can select the custom event tag generator 456, which prompts the user to input the name of the event via the user input device 24 (in this example, a touchscreen keyboard). In this manner, a user can associate the first digital video with any type event based on the content of the first digital video.

Figure 3A:
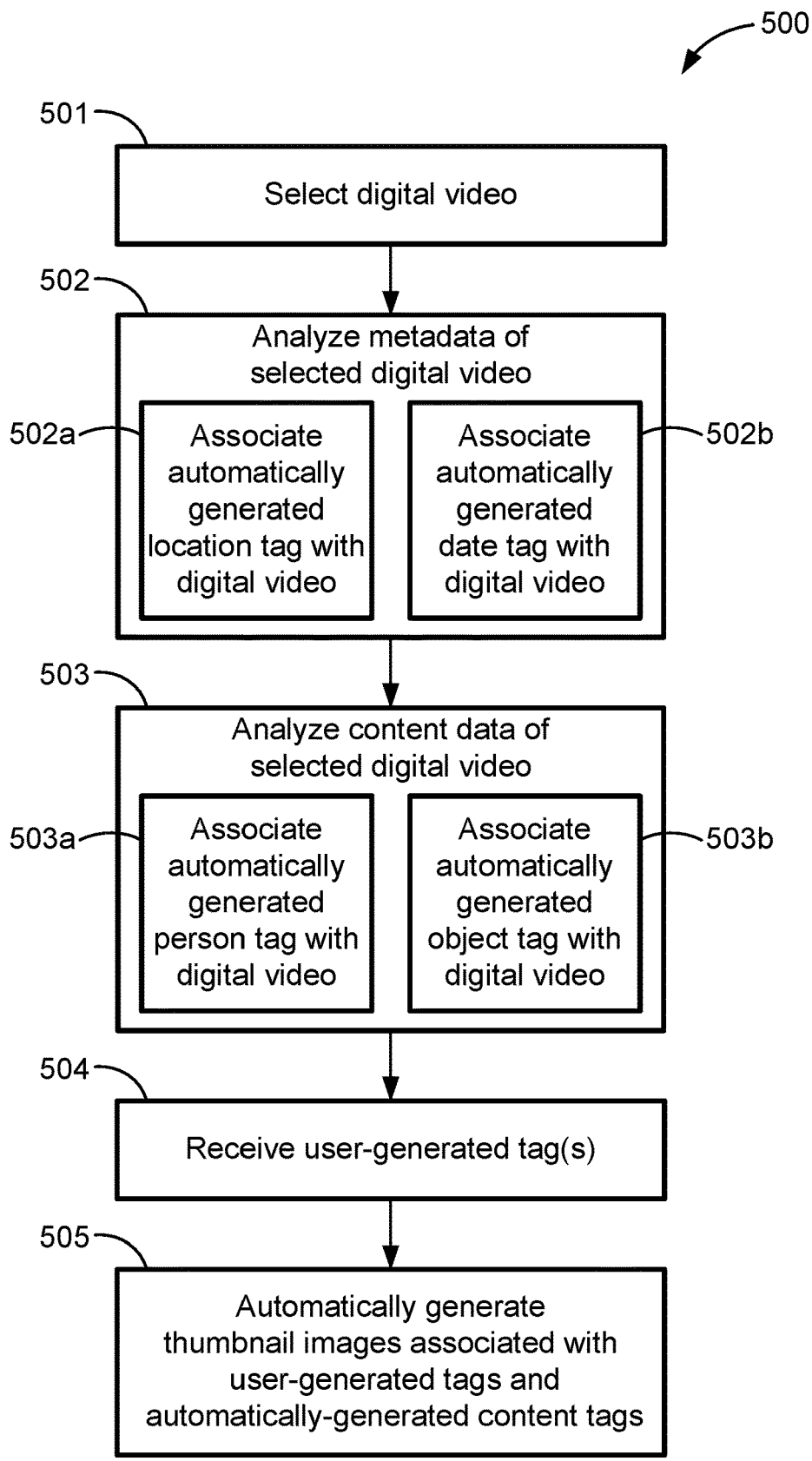
FIG. 3A is a process flow diagram for a method for organizing digital videos according to some implementations of the present disclosure.
Figure 3B:
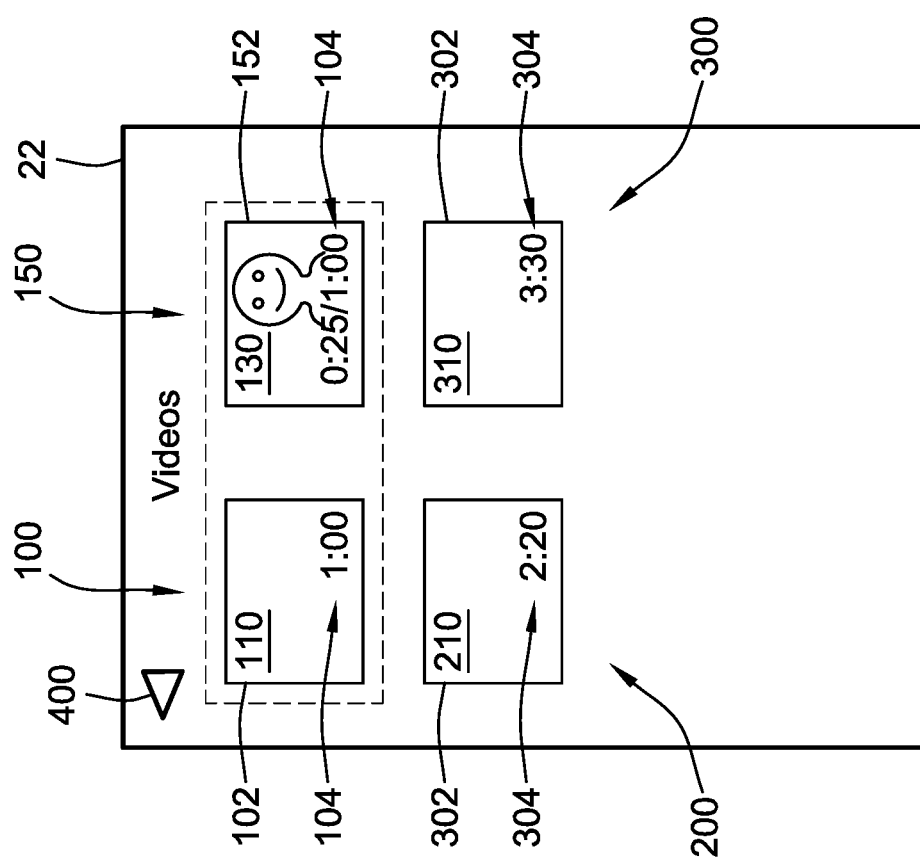
FIG. 3B illustrates a second thumbnail image associated with the first digital video according to some implementations of the present disclosure.

Referring now to FIG. 3, a method 500 for organizing digital videos is described. The method 500 can be implemented, for example, using the system 1 (FIG. 1) described herein. More specifically, the flowchart can be implemented as a computer algorithm that instructs or causes the processor 12 of the user device 10 to perform the following functions according to non-transitory, machine-readable instructions stored in the memory device 14. Alternatively, the flowchart can be implemented as a computer algorithm that instructs or causes the processor 32 of the remote device 30 to perform the following functions according to non-transitory, machine-readable instructions stored in the memory device 34. Alternatively still, the flowchart can be implemented as a computer algorithm that instructs or causes both the processor 32 of the remote device 30 to perform the following functions according to non-transitory, machine-readable instructions stored in the memory device 34 and the processor 12 of the user device 10 to perform the following functions according to non-transitory, machine-readable instructions stored in the memory device 14.

First step 501 of the method 500 includes selecting a digital video stored in the video repository 16 of the user device 10 or the video repository 36 of the remote device 30. For example, as described herein and shown in FIG. 2A, the first thumbnail image 100, the second thumbnail image 200, and the third thumbnail image 300 can be displayed on the video display device 22. Selecting the first thumbnail image 100 (e.g., by clicking or tapping) causes the initial video frame 110 of the first digital video to be displayed on the video display device 22, as shown in FIG. 2B.

Alternatively, rather than receiving a user selection of a digital video, first step 501 can include receiving an automatic selection of a digital video. As described in further detail herein, each of the digital videos stored in the video repository 16 of the user device 10 and/or the video repository 36 of the remote device 30 can be automatically selected (e.g., in succession or randomly) such that the metadata and/or content data thereof can be automatically analyzed (e.g., during steps 502 and 503).

Second step 502 of the method 500 includes analyzing the metadata of the selected digital video, and includes performing one or both of first sub-step 502a and second sub-step 502b. First sub-step 502a includes associating an automatically-generated location tag with the selected digital video.

As described herein, the metadata of each digital video can include location data indicative of a location where the digital video was generated (e.g., location data generated by the GPS module 20 of the user device 10). First sub-step 502a includes comparing the location data of the selected digital video (e.g., GPS coordinates) to, for example, a lookup table of locations (e.g., from a map) to associate the selected digital video with an automatically-generated location tag. Alternatively, the first sub-step 502a includes comparing the location data of the selected digital video (e.g., GPS coordinates) to, for example, location data associated with user-generated location tags (e.g., the first location tag 422 and the second location tag 424 of FIG. 2D). That is, if the user has previously associated another digital video with a user-generated location tag (e.g., the first location tag 422 of FIG. 2D), first sub-step 502a includes comparing the location data of the selected digital video to the location data associated with user-generated location tags. If the location data (e.g., GPS coordinates) of the selected digital video corresponds to location data associated with a user-generated location tag, the selected digital video is automatically associated with the user-generated location tag. In this manner, once a user-generated location tag is associated with one digital video, all subsequently analyzed digital videos with location data corresponding to that location can be automatically associated with the same user-generated location tag. If the metadata of the selected first digital video does not contain location data, first sub-step 502a of second step 502 is not performed, however, a user-generated location tag can be associated with the first digital video (e.g., in step 505 of the method 500).

Second sub-step 502b of second step 502 of the method 500 includes associating an automatically-generated date tag with the selected digital video. As described herein, the metadata of each digital video can include date and time data indicative of a date and/or time that the digital video was generated. Second sub-step 502a includes analyzing the date and time data within the metadata of the selected digital video to automatically generate a date tag that is associated with the date and time that the selected digital video was generated. The automatically-generated date tag is then associated with the selected digital video. If the metadata of the selected digital video does not include data and time data, then the second sub-step 502b is not performed, however, a user-generated date tag can be associated with the selected digital video during fifth step 505 of the method 500.

Third step 503 of the method 500 includes analyzing the content data of the selected digital video, and includes first sub-step 503a. First sub-step 503a includes associating an automatically-generated person tag with the selected digital video. As described herein, the content data of each digital video includes a series of video frames (e.g., an initial video frame, a final video frame, and a plurality of video frames therebetween). As also described herein, there may be one or more persons in one or more of the video frames of the selected digital video (e.g., the person 132 shown in the second video frame 130 of FIG. 2F). First sub-step 503a includes analyzing the video frames of the selected digital video to identify one or more persons in a video frame and associate that video frame with an automatically-generated person tag. For example, the first sub-step 503 includes detecting a face of a person in a video frame and comparing the detected face of the person to a facial recognition database (e.g., that is stored in the memory device 14 of the user device 10 and/or the memory device 34 of the remote device 30 shown in FIG. 1) to identify a name of the person.

A person tag that is associated with the identified name of the person is then automatically generated and associated with the video frame in which the person was identified.

As one example, the initial video frame of the selected digital video is analyzed during first sub-step 503a to identify the face of a person. If no face is detected in the initial video frame, the analysis proceeds to the subsequent video frame to identify a face of a person. This process continues until a face of a person is identified in, for example, a second video frame of the selected digital video. Once a face is identified in the second video frame, the portion of the second video frame containing the face is compared to images in a facial recognition database to find a match (e.g., the face in the second video frame is a 100% match with a face in the facial recognition database, a 95% match with a face in the facial recognition database, an 85% match with a face in the facial recognition database, etc.) Once the face in the second video frame is matched with a face in the facial recognition database, the name of the person is identified and a person tag associated with the identified name is automatically generated and associated with the second video frame of the selected digital video.

In some implementations, the third step 503 also includes second sub-step 503b, which includes associating an automatically-generated object tag with the selected digital video. The automatically-generated object tag is similar to the automatically-generated person tag described herein, but differs in that instead of associating a video frame of the selected digital video with a person, the video frame is associated with an object. Various objects (e.g., animals, trees, food, clothing, cars, buildings, etc.) can be detected in the video frames of the selected digital video in the same or similar manner faces are detected during first sub-step 503b (e.g., by comparing at least a portion of the video frame to a database or look-up table of objects).

Fourth step 504 of the method 500 includes receiving one or more user-generated tags via the user input device 24 of the user device 10 (FIG. 1). As described herein, responsive to the selection of a digital video during step 501 (e.g., selecting the first thumbnail image 100 associated with the first digital video), the location tag element 420, the date tag element 430, the person tag element 440, and the event tag 450 are displayed on the video display device 22 (see, e.g., FIG. 2B). Thus, user-generated tags can be a user-generated location data, a user-generated date tag, a user-generated person tag, a user-generated event tag, or any combination thereof. For one example, as described above, the user can select the person tag element 440 and associate the second video frame 130 of the first digital video with the first person tag 444 (see FIGS. 2G and 2H). While not shown, in some implementations, an object tag element is also displayed on the video display device 22, such that the system 1 can receive a user-generated object tag in the same or similar manner as the user-generated person tags described herein.

Fifth step 505 of the method 500 includes generating thumbnail images associated with the user-generated tags, the automatically-generated location tag, the automatically-generated date tag, the automatically-generated content tag(s), or any combination thereof, for the selected digital video. For example, referring to FIG. 3B, if the user selects the first digital video by selecting the first thumbnail image 100 (FIG. 2B) during step 501 and assigns the first person tag 444 (FIGS. 2G and 2H) to the second video frame 130 of the first digital video during step 504, a fourth thumbnail image 540 associated with the first digital video is displayed along with the first thumbnail image 100 associated with the first digital video, the second thumbnail image 200 associated with the second digital video, and the third thumbnail image 300 associated with the third digital video. As shown, the fourth thumbnail image 540 includes the movable region of interest 442 (FIG. 2G), which includes the face 134 of the person 132 that was selected by the user when assigning the person tag to the second video frame 130 of the first digital video.

The fourth thumbnail image 540 is similar to the first thumbnail image 100 in that selecting the fourth thumbnail image 540 (e.g., by clicking or tapping) causes the first digital video to be displayed on the video display device 22. However, a selection of the fourth thumbnail image 540 differs a selection of the first thumbnail image 100 (as shown in FIG. 2B) in that selecting the fourth thumbnail image 540 causes the first digital video to be played on the video display device 22 starting at the second video frame 130 associated with time $t_2$ (in this example, 25 seconds) (FIG. 2F) rather than the initial video frame 110 associated with the initial time $t_0$ (FIG. 2B). As shown, the fourth thumbnail image 540 includes the runtime indicium 104 (in this example, one minute) and the current time indicium 404 associated with the second video frame 130 of the first digital video. While the fourth thumbnail image 540 is shown as including the movable region of interest 442 which includes the face 134 of the person 132, in some implementations, the fourth thumbnail image 540 includes the entire second video frame 130 rather than just the movable region of interest 442.

Additional thumbnail images can be generated in the same or similar manner as the automatically-generated and user-generated tags described herein. For example, if a user-generated event tag is received during step 504 that is associated with a tenth video frame of the first digital video that occurs at time t3 of the first digital video, a fifth thumbnail image (not shown) is generated that is associated with the first digital video. Selecting the fifth thumbnail image causes the first digital video to be played on the video display device 22 starting at time t3 of the first digital video. Generating a plurality of thumbnail images for each of the digital videos during step 505 in this manner allows a user to organize the digital videos according to the associated tags. For example, the user can filter the thumbnail images displayed on the video display device 22 by selecting the first person tag 444. In this example, only thumbnail images that are associated with the first person tag 444 will be displayed on the video display device 22, and selecting one of these thumbnail images associated with the first person tag 444 will cause a digital video to be displayed on the video display device 22 starting at a video frame containing the person 132 that is associated with the first person tag 444.

Steps 501-505 of the method 500 can be repeated one or more times for any number of digital videos that are stored in the video repository 16 of the user device 10 and/or the video repository 36 of the remote device 30 (e.g., two digital videos, ten digital videos, one-hundred digital videos, etc.) While assignment of various location, date/time, person, and event tags has been described herein in connection with certain video frames of a digital video, it should be understood that these various tags can be assigned at any video frame within a digital video, including the initial video frame and/or the final video frame. Thus, each digital video stored in the video repository 16 of the user device 10 and/or the video repository 36 of the remote device 30 can be associated with any number of different types of tags at one or more times within the digital video (e.g., a first digital video is associated with an automatically-generated location tag, an automatically-generated date tag, and a user-generated person tag, and a second digital video is associated with an automatically-generated date tag and a user-generated event tag).

The video tagging systems and methods described herein (e.g., system 1 and method 500) allows users to more efficiently and accurately retrieve digital videos associated with different types of information (e.g., location tags, date tags, people tags, event tags, etc.) As described herein, associating digital videos with automatically-generated and/or user-generated tags causes user-selectable thumbnail images to be generated and displayed on a video display device. Thus, rather than selecting a digital video and having to wait or fast-forward to a desired time, a user can simply search for the corresponding thumbnail image, select that thumbnail image, and the digital video will begin playing at the desired time.

Digital Photograph Linking

A physical photograph has two sides: a first side where the image is printed and a second, opposing side that is typically blank. Often, people desire to link the physical photograph with one or more details, such as, for example, the location where the photograph was taken, the date the photograph was taken, the people depicted in the photograph, the event depicted in the photograph, etc. To do so, people often write these details on the second (blank) side of the physical photograph so that a person can simply flip the physical photograph over to quickly access this linked information.

With the evolution of digital photography and personal electronic devices (e.g., smartphones, tablets, laptop computers, desktop computers, etc.), people often have a voluminous library of digital photographs. A user may desire to digitally link a first digital photograph and a second digital photograph such that when one is displayed, the user can quickly access the other without browsing through the library of photos, much like how one can flip a physical photograph to see the other side. Further, a user may desire to scan a physical photograph to create a digital version, and link a scanned image of the first side with a scanned image of the second side so that the writing on the back of the physical photograph stays linked with the image on the other side of the physical photograph.

Figure 4:
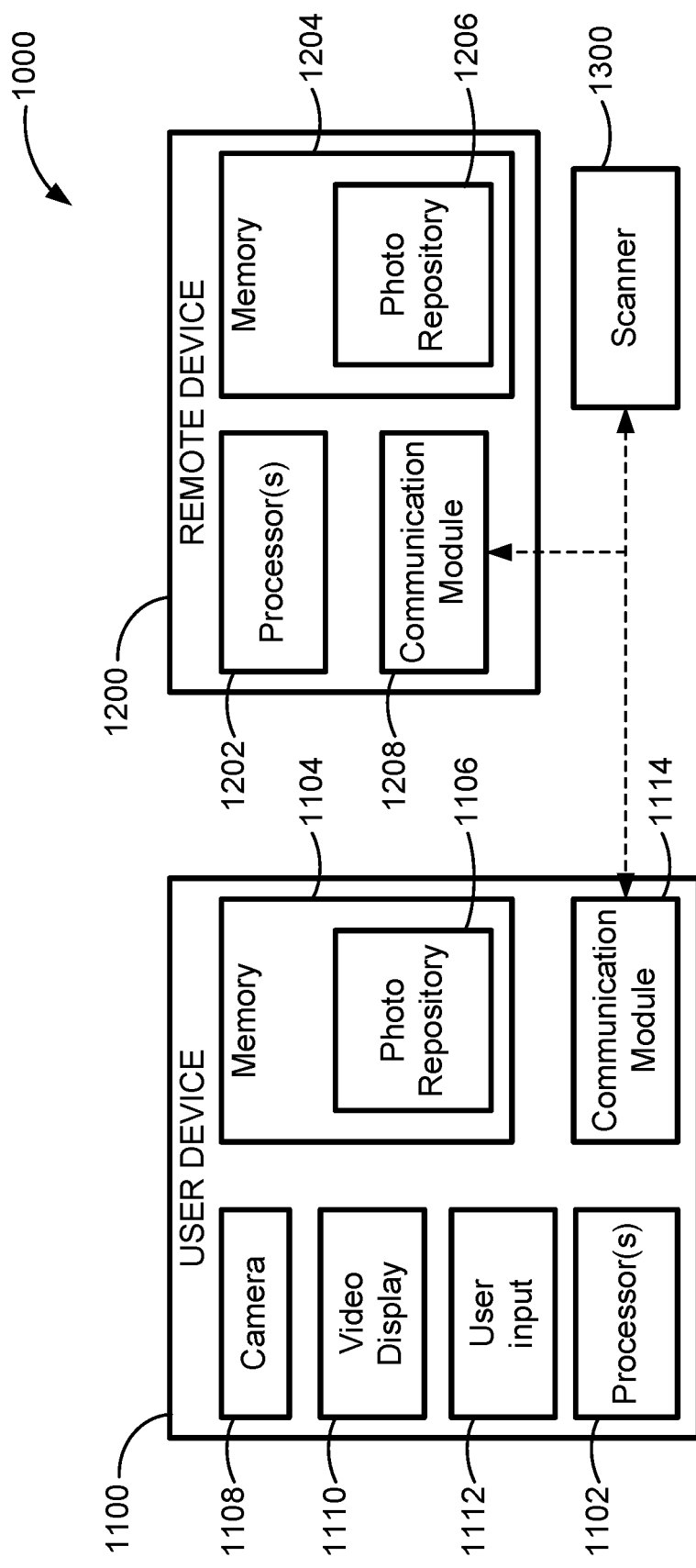
FIG. 4 is a functional block diagram of a system for linking digital photographs according to some implementations of the present disclosure.

Referring to FIG. 4, a system 1000 for linking digital photographs includes a user device 1100, a remote device 1200, and a scanner 1300. Generally, the system 1000 is used to store and organize digital photographs and implement the methods described herein. For example, the system 1000 can be used to digitally link a first digital photograph to a second digital photograph such that a user can digitally flip the first digital photograph to immediately view the second digital photograph. In another example, the system 1000 can be used to scan both sides of a physical photograph, creating two digital photographs (one for the first side and one for the second side), and digitally link the two digital photographs such that a user can digitally flip between the digital photographs in the same or similar manner as the physical photograph.

The user device 1100 includes one or more processors 1102 (hereinafter, "processor"), one or more memory devices 1104 (hereinafter, "memory device"), a camera 1108, a video display device 1110, a user input device 1112, and a communication module 1114. The processor 1102 is communicatively coupled to the memory device 1104, the camera 1108, the video display device 1110, the user input device 1112, and the communication module 1114 and is generally used to control the operation of these various components of the system 1000 and implement the methods described herein. The processor 1102 can be a general or special purpose processor or microprocessor. The user device 1100 can include any suitable number of processors (e.g., one processor, two processors, four processors, ten processors, etc.)

The memory device 1104 is generally used to store machine readable instructions that are executable by the processor 1102. The memory device 1104 can be any suitable computer readable storage device or media, such as, for example, a random or serial access memory device, a hard disk drive, a solid state drive, a flash memory device, etc. As shown, the memory device 1104 includes a digital file repository 1106, which contains one or more digital photos (e.g., 2 digital photos, 100 digital photos, 100,000 digital photos, 1,000,000, digital photos, etc.) As described in further detail herein, each of the digital files includes image data reproducible as an image (e.g., a still image) and metadata. The metadata each digital file stored in the digital file repository 1106 can include location data indicative of a geographic location where the image of the digital file was generated and/or the date and time data associated with the date and/or time when the image of the digital filed was generated.

The digital camera 1108 is generally configured to generate image data reproducible as one or more digital images, including still images, video images, or both. Thus, the digital camera 1108 can be used to generate the images of the digital flies that are stored in the digital file repository 1106 of the memory device 1104. The digital camera 1108 can optionally include optical and/or digital zoom features, a light to aid in generated digital photos and videos, filters, or any combination thereof. While the user device 1100 is shown as including one digital camera 1088, the user device 1100 can include a plurality of digital cameras (e.g., two digital cameras, three digital cameras, etc.) For example, the user device 1100 can include a first front-facing digital camera and an opposing, second rear-facing digital camera.

The video display device 1110 is a human-machine interface (HMI) including a graphical user interface (GUI) that can display images (e.g., still images, video images, etc.) As described in further detail herein, the video display device 1110 of the user device 1100 can be used to display images of the digital files that are stored in the digital file repository 1106 of the memory device 1104. The video display device 1110 can be, for example, a general or special purpose desktop computer, a laptop, a tablet computer, a smartphone, a display monitor, a television, LED display, LCD display, or the like, or any combination thereof. The user input device 1112 is configured to sense inputs made by a human user interacting with the user device 1100 and can be, for example, a touchscreen or touch-sent vie substrate, a mouse, a keyboard, or any combination thereof. For example, as described herein, the user input device 1112 can receive input(s) from a human user that controls what is displayed on the video display device 1110. In some implementations, the user input device 1112 is integrated within the video display device 1110 (e.g., the user input device 1112 and the video display device 1110 are a touchscreen display of a smartphone).

The communication module 1114 is configured for wireless communication (e.g., via a cellular network) with the remote device 1200. As described in further detail herein, the communication module 1114 can be used to transmit data stored in the digital file repository 1106 of the memory device 1104 of the user device 1100 to the remote device 1200 for processing, and/or transmit data stored in the video/digital file repository 1206 of the memory device 1204 of the remote device 1200 to be displayed or played on the video display device 1110 of the user device 1100.

Generally, the user device 1100 can be, for example, a general or special purpose desktop computer, a laptop computer, a tablet computer, or a smartphone, with all or some of the components contained therein. In some implementations, the user device 1100 is a smartphone containing each of the processor 1102, memory device 1104, camera 1108, video display device 1110, user input device 1112, and the communication module 1114 within a housing. While the user device 1100 is shown in FIG. 4 as including all of the components described herein, more or fewer components can be included in a user device. For example, an alternative user device (not shown) includes the processor 1102, the memory device 1104, the video display device 1110, the user input device 1112, and the communication module 1114. Thus, various user devices can be formed using any portion of the components described herein.

The remote device 1200 includes one or more processors (hereinafter, "processor") 1202, one or more memory devices (hereinafter, "memory device") 1204, and a communication module 1208. The processor 1202 is the same as, or similar to, the processor 1102 of the user device 1100 and is communicatively coupled to the memory device 1204 and the communication module 1208. The memory device 1204 is the same as or similar to the memory device 1104 of the user device 1100 and includes a digital file repository 1206 that is the same as, or similar to, the digital file repository 1106 of the user device 1100. The communication module 1208 of the remote device 1200 is configured to wirelessly communicate with the communication module 1114 of the user device 1100 (e.g., via a cellular network, WiFi, or the like). For example, the remote device 1200 can receive data from the digital file repository 1106 of the user device 1100 via the communication module 1208 and store the data in the video/photo repository 1206 (e.g., such that all of the data stored in the digital file repository 1106 of the user device 1100 is stored in the video/photo repository 1206). In some implementations, the remote device 1200 is a remote server that communicates with the user device 1100 via the Internet (e.g., via a cellular network).

While the system 1 is shown in FIG. 1 as including one user device 1100, in some implementations, the remote device 1200 can be communicatively coupled to a plurality of user devices that are the same as, or similar to, the user device 1100 (e.g., two user devices, ten user devices, one hundred user devices, one thousand user devices, etc.) Thus, data from the digital file repository of each of a plurality of user devices can be transmitted and stored in the video/photo repository 1206 of the remote device 1200.

The scanner 1300 of the system 1000 is generally used to scan physical photographs (e.g., a photograph printed on film or paper) and generates digital versions of the scanned physical photographs (digital photographs). The scanner 1300 can be a flatbed scanner, a hand-held scanner, a sheet-fed scanner, an optical scanner, or the like. As shown, the scanner 1300 is communicatively coupled to the communication module 1114 of the user device 1100 such that digital files generated by the scanner 1300 can be transmitted to and stored in the digital file repository 1106 of the memory device 1104 of the user device 1100. In some implementations, the system 1000 does not include the scanner 1300; instead, in such implementations, the camera 1108 of the user device 1100 can be used to scan photographs or images and generate digital photographs.

Figure 5A:
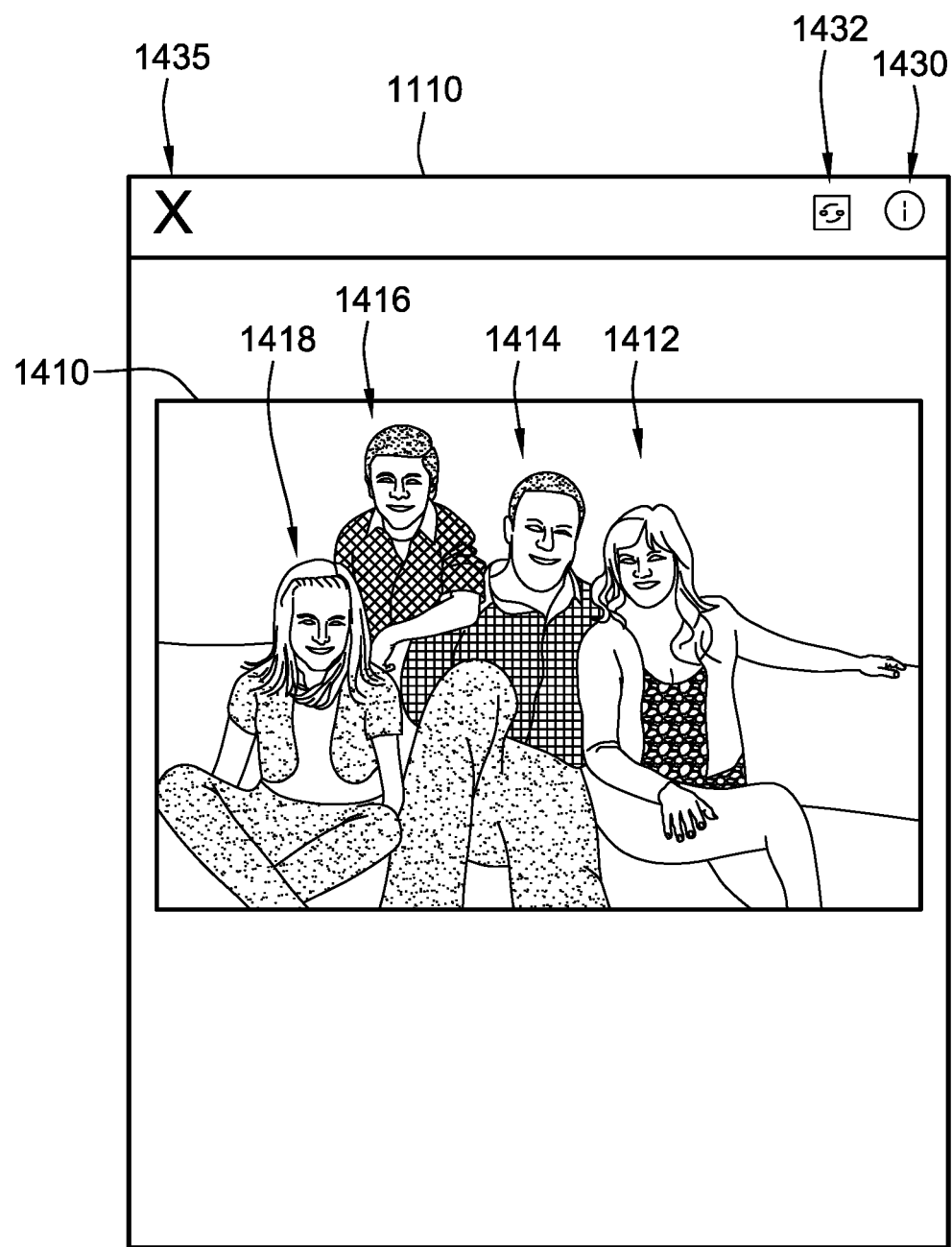
FIG. 5A illustrates a first digital photograph displayed on a video display device of the system of FIG. 4 according to some implementations of the present disclosure.

Referring to FIG. 5A, a first digital photograph 1410 is displayed on the video display device 1110. The first digital photograph 1410 is stored in the digital file repository 1106 of the user device 1100, the digital photo repository 1206 of the remote device 1200, or both. In this example, four people are pictured in the first digital photograph 1410: a first person 1412, a second person 1414, a third person 1416, and a fourth person 1418.

As shown in FIG. 5A, a user-selectable information element 1430 and a user-selectable navigation element 1435 are also displayed on the video display device 1110 along with the first digital photograph 1410. The user-selectable navigation element 1435 can be selected by a user (e.g., by tapping or clicking) to navigate away from the first digital photograph 1410 (e.g., such that the first digital photograph 1410 is no longer displayed on the video display device 1110). The user-selectable information element 1430 can be selected by a user (e.g., by clicking or tapping) to permit the user, for example, to digitally link the first digital photograph 1410 with another digital photograph as described in further detail herein.

Referring to FIG. 5B, responsive to a user selection of the information element 1430 (FIG. 5A), a linking element 1433, a location tag element 1434, a likeness generator element 1436, a people tag element 1438, a date tag element 1440, a save element 1442, and a cancel element 1444 are displayed on the video display device 1110, each of which are user-selectable (e.g., by clicking or tapping). In some implementations, a caption element (not shown) is also displayed which permits a user to input a caption for the first digital photograph 1410. Selecting the location tag element 1434 permits a user to input (e.g., using a touchscreen keyboard) a location associated with the first digital photograph 1410 (e.g., a street address, a town or city name, a county name, a country name, a landmark name, a business name, or any combination thereof). Selecting the people tag element 1438 permits a user to input a name of a person that is depicted in the first digital photograph 1410. In some implementations, an album tag element (not shown) is also displayed and permits a user to associate the first digital photograph 1410 with one or more albums of digital photographs (e.g., an album that is stored in the digital photograph repository 1106 of the user device 1100, an album that is stored in the digital photograph repository 1206 of the remote device 1200, or both).

Selecting the date tag element 1440 permits a user to input a date that will be associated with the first digital photograph 1410. As described herein, in some implementations, the first digital photograph 1410 can be a scanned version of a physical photograph. In such implementations, the first digital photograph 1410 will be automatically associated with the date that the scan was generated (e.g., in this example, 1/1/19). However, the first digital photograph 1410 may have actually been generated on an earlier date (e.g., 12/25/18). Thus, a user can select the date tag element 1440 and update or correct the date tag for the first digital photograph 1410 (e.g., change the date tag from 1/1/19 (the scan date) to 12/25/2018 (the date the photo was taken)). Selecting the save element 1442 causes any inputs to the linking element 1433, the location tag element 1434, the likeness generator element 1436, the people tag element 1438, the date tag element 1440 to be saved and permanently associated with the first digital photograph 1410 and automatically causes the first digital photograph 1410 to be displayed on the video display device 1110 (FIG. 2A). Selecting the cancel element 1444 causes any inputs to the linking element 1433, the location tag element 1434, the likeness generator element 1436, the people tag element 1438, the date tag 1440 that were added subsequent to selecting the information element 1430 (FIG. 5A) to be deleted and automatically causes the first digital photograph 1410 to be displayed on the video display device 1110 (FIG. 2A).

If the user desires to link the first digital photograph 1410 (FIG. 5A) with another digital photograph, the user can select the linking element 1433. As shown in FIG. 5C, selecting the linking element 1433 causes a plurality of digital photographs to be displayed on the video display device 1110. More specifically, thumbnail images of a second digital photograph 1450, a third digital photograph 1452, a fourth digital photograph 1454, and a fifth digital photograph 1456 are displayed on the video display device 1110. While only four digital photographs are illustrated in FIG. 5C, more generally, any suitable number of digital photographs can be displayed, including, for example, an entire library or album of photographs (e.g., one digital photograph, fifty digital photographs, one-hundred digital photographs, etc.). In this manner, the user can choose to link the first digital photograph 1410 (FIG. 5A) with any digital photograph that is stored in the digital file repository 1106 of the user device 1100 and/or digital photo repository 1206 of the remote device 1200. In some implementations, rather than displaying an entire library or album of photographs, selecting linking element 1433 causes thumbnail images to be displayed for digital photographs associated with the same date as the first digital photograph 1410. For example, as shown, each of the second digital photograph 1450, the third digital photograph 1452, the fourth digital photograph 1454, and the fifth digital photograph 1456 are associated with the same date as the original date tag 1440 (FIG. 5B) of the first digital photograph 1410 (e.g., in this example, 1/1/19). As described herein, a user may desire to scan both sides of a physical photograph and link the two scanned, digital versions together. Thus, only displaying thumbnails of photographs with the same date as the first digital photograph 1410 aids a user in quickly finding the second side of the physical photograph that was scanned on the same date/time as the first side of the physical photograph.

Each of these thumbnail images is user-selectable such a selection (e.g., by clicking or tapping) of the second digital photograph 1450 causes the first digital photograph 1410 (FIG. 5A) to be linked with the second digital photograph 1450 (FIG. 5C). Once the user makes a selection, the user can select the save element 1442, which automatically navigates the user to the previous screen (FIG. 5B), where the user can select the save element 1442 again to navigate to the previous screen (FIG. 5A). Alternatively, in some implementations, selecting one of the digital photographs shown in FIG. 5C (e.g., the second digital photograph 1450) causes the system 1000 to automatically navigate to either FIG. 5B or FIG. 5A.

While the linking element 1433, the location tag element 1434, the likeness generator element element 1436, the people tag element 1438, the date tag 1440, the save element 1442, and the cancel element 1444 are each shown as being displayed on the video display device 1110 in FIG. 5B, more generally, any combination of these elements can be displayed on the video display device 1110 responsive to a user selection of the information element 1430 (FIG. 5A). Alternatively, in some implementations, the linking element 1433 (FIG. 5B) can be displayed along with the first digital photograph 1410 in addition to or instead of the user-selectable information element 1434 in FIG. 5A.

Figure 6A:
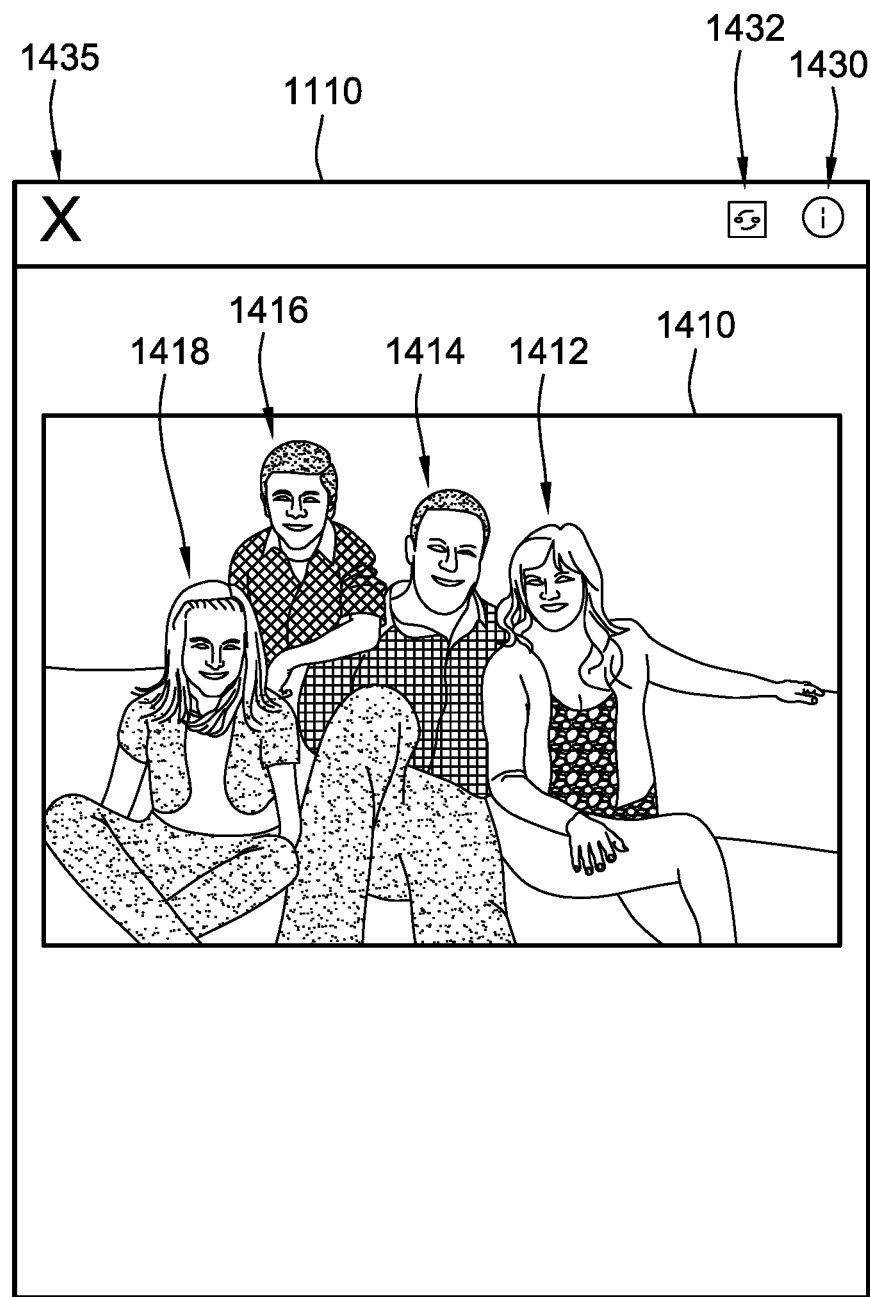
FIG. 6A illustrates a first digital photograph and a flipping element displayed on a video display device of the system of FIG. 4 prior to the initiation of a digital flipping action according to some implementations of the present disclosure.

Referring to FIG. 6A, subsequent to linking the first digital photograph 1410 to the second digital photograph 1450 as described above, a user-selectable flipping element 1432 is displayed on the video display device 1110 along with the first digital photograph 1410. The flipping element 1432 thus provides an indication to a user of the video display device 1110 that the first digital photograph 1410 that is displayed on the video display device 1110 is linked with another digital photograph. Generally, selecting (e.g., by clicking or tapping) the flipping element 1432 causes the first digital photograph 1410 to be digitally flipped such that the second digital photograph 1450 is displayed on the video display device 1110 and the first digital photograph 1410 is not displayed on the video display device 1110. This digitally flipping is similar to physically flipping a physical photograph where a person can quickly flip between viewing a first side of a physical photograph and a second side of the same physical photograph.

Figure 6B:
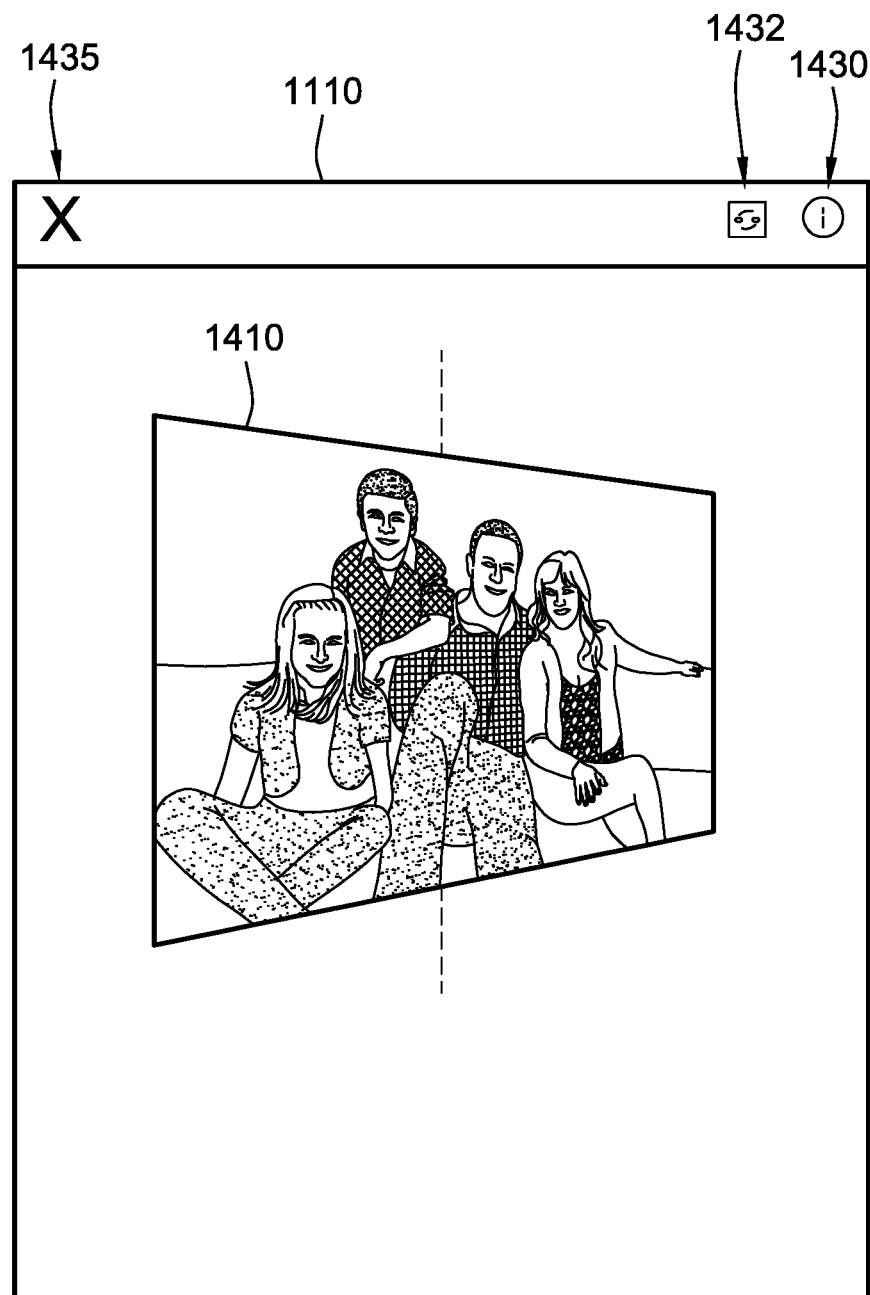
FIG. 6B illustrates the first digital photograph of FIG. 6A in a first position during digital flipping according to some implementations of the present disclosure.
Figure 6C:
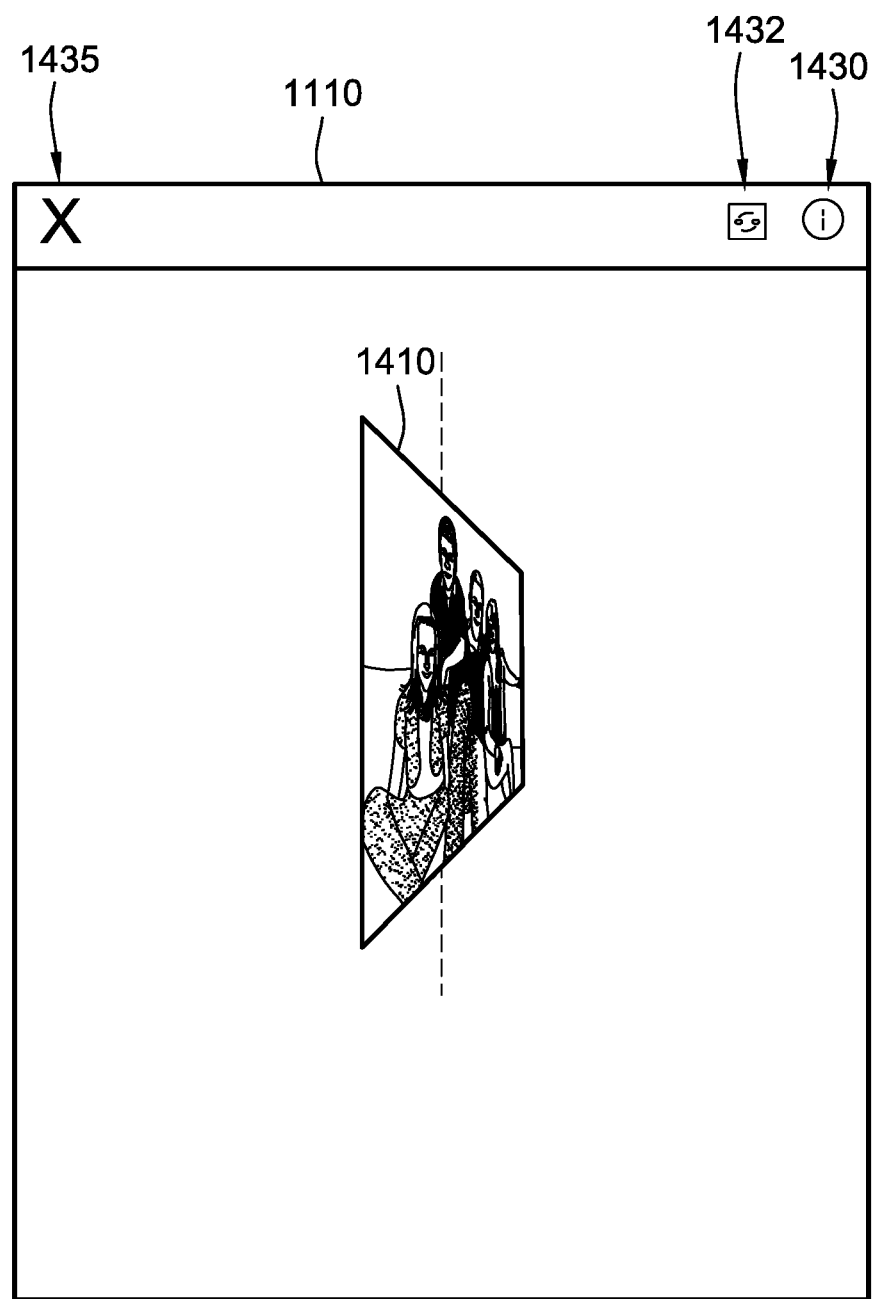
FIG. 6C illustrates the first digital photograph of FIG. 6A in a second position during digital flipping according to some implementations of the present disclosure.
Figure 6D:
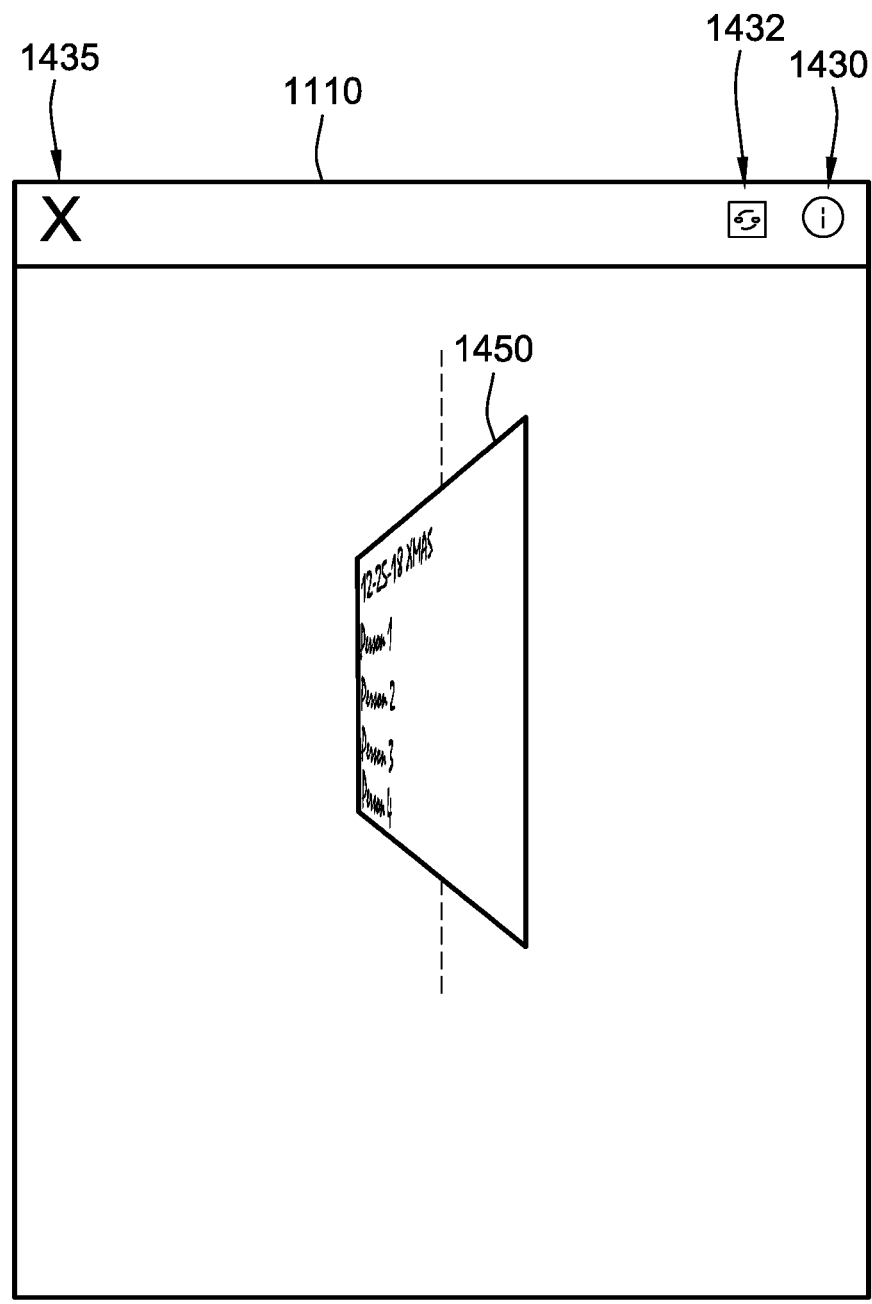
FIG. 6D illustrates a second digital photograph in a first position during digital flipping according to some implementations of the present disclosure.
Figure 6E:
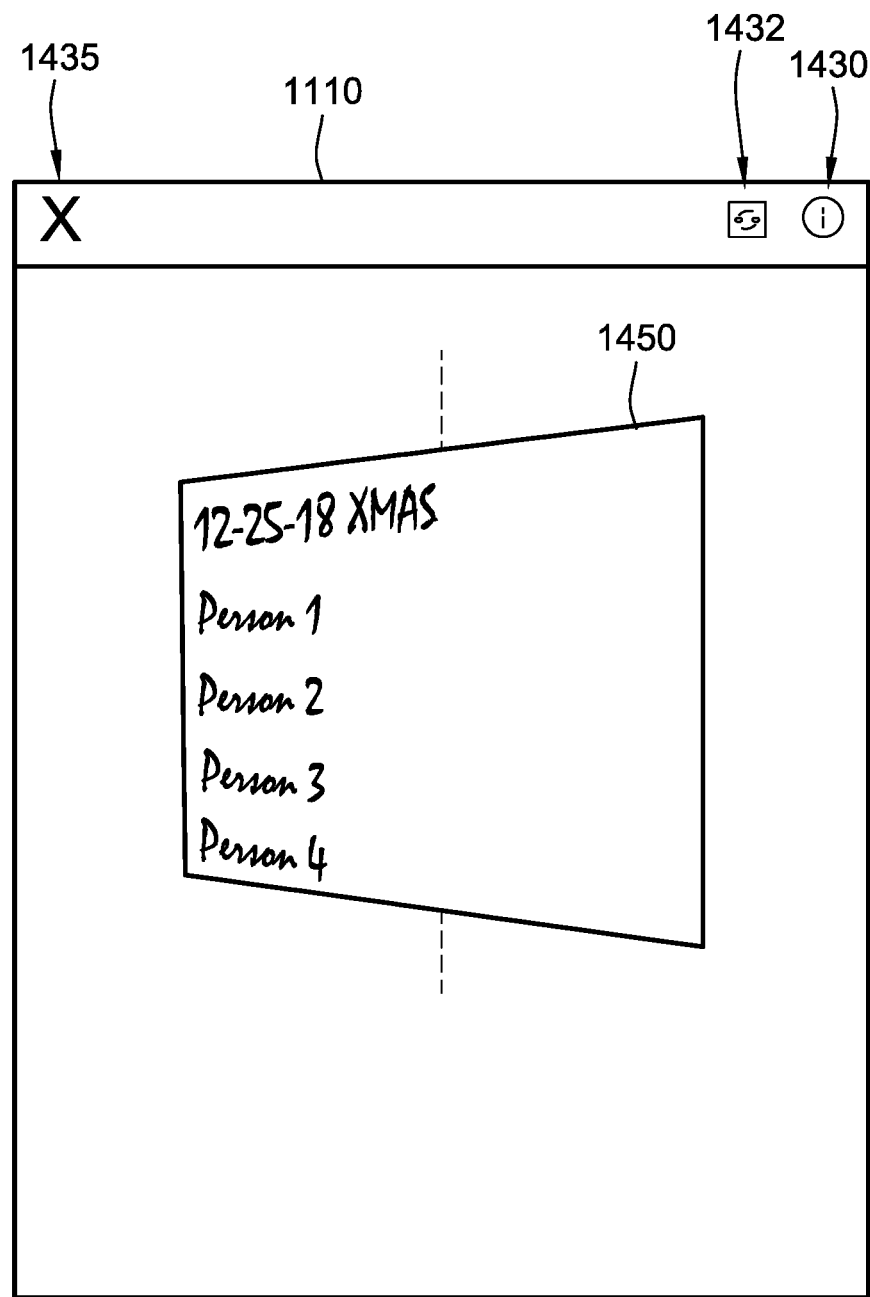
FIG. 6E illustrates the second digital photograph of FIG. 6D in a first position during digital flipping according to some implementations of the present disclosure.
Figure 6F:
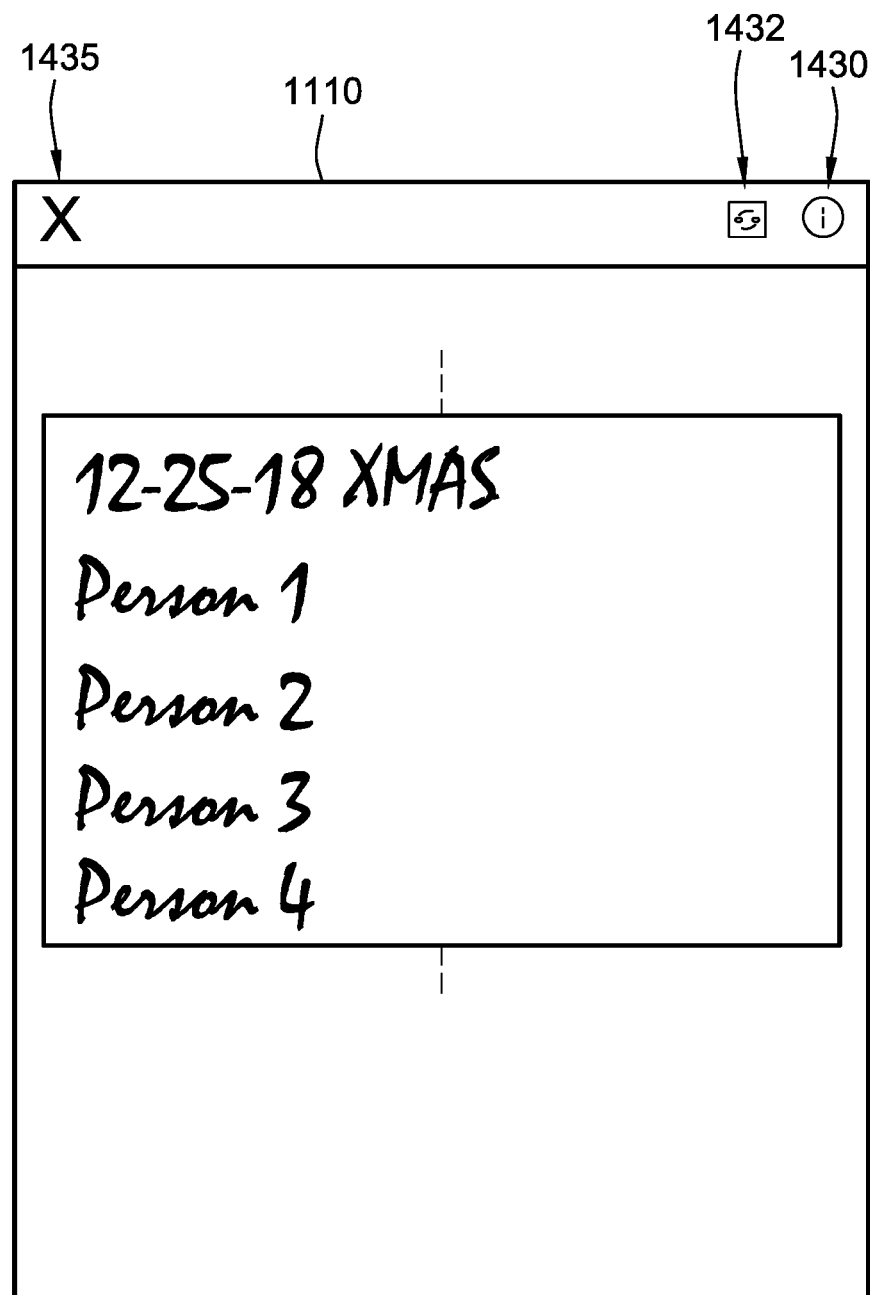
FIG. 6F illustrates the second digital photograph of FIG. 6D upon completion of the digital flipping in FIGS. 6B-6E according to some implementations of the present disclosure.

As shown in FIGS. 6A-6F, in some implementations, the digitally flipping includes rotating the first digital photograph 1410 about a vertical axis until the first digital photograph 1410 no longer is displayed on the video display device 1110 and the second digital photograph 1450 is displayed on the video display device 1110. Flipping the first digital photograph 1410 about the vertical axis is similar to rotating a physical photograph about a vertical axis to turn from the first side to the second side (or vice versa). Starting with FIG. 6A, selecting (e.g., by clicking or tapping) the flipping element 1432 initiates the digital flipping of the first digital photograph 1410. As shown in FIG. 6B, the first digital photograph 1410 begins to rotate about its vertical axis such that the left side of the first digital photograph 1410 appears to be turning towards the user of the video display device 1110 and the right side of the first digital photograph 1410 appears to be turning away from the user of the video display device 1110. As shown in FIG. 6C, as the digital flipping continues, the first digital photograph 1410 continues to rotate about its vertical axis. Eventually, the first digital photograph 1410 rotates until it is no longer displayed on the video display device 1110. As shown in FIG. 6D, the first digital photograph 1410 is not displayed on the video display device 1110 and instead, the second digital photograph 1450 is displayed on the video display device 1110. The second digital photograph 1450 rotates about its vertical axis in the same way that the first digital photograph 1410 rotated such that the right side of the second digital photograph 1450 appears to be moving away from the user of the video display device 1110 and the left side of the second digital photograph 1450 appears to be moving toward the user of the video display device 1110. As shown in FIG. 6E, as the second digital photograph 1450 continues to rotate, the area that the second digital photograph 1450 takes up on the video display device 1110 increases. Finally, as shown in FIG. 6F, upon completion of the digital flipping the second digital photograph 1450 is displayed on the video display device 1110. As shown, the second digital photograph 1450 includes handwriting from the back of the same physical photograph that the first digital photograph 1410 was scanned from. Thus, the user can flip between the first digital photograph 1410 and the second digital photograph 1450 in the same or similar manner as the user can flip the physical photograph from which the first digital photograph 1410 and the second digital photograph 1450 were scanned. The digital flipping in FIGS. 6A-6F can have a predetermined time (e.g., the time it takes to go from FIG. 6A to FIG. 6F). Generally, the predetermined time can be any suitable time (e.g., 0.01 seconds, 0.1 seconds, 1 second, 3 seconds, 10 seconds, 30 seconds, etc.)

When the second digital photograph 1450 is displayed on the video display device 1110 (FIG. 6F), the user can again select the flipping element 1432 to digitally flip the second digital photograph 1450 in the same or similar manner as the first digital photograph 1410 such that the first digital photograph 1410 is displayed on the video display device 1110 (FIG. 6A). The second digital photograph 1450 can be flipped in the same direction about its vertical that the first digital photograph was flipped in FIGS. 6A-6F or in the opposite direction about its vertical axis. In other implementations, the first digital photograph 1410 and second digital photograph 1450 can be digitally flipped in other ways (e.g., other than flipping the photos about a vertical axis), as described herein (e.g., as shown in FIGS. 7A-7F or FIGS. 8A-8E).

Figure 7A:
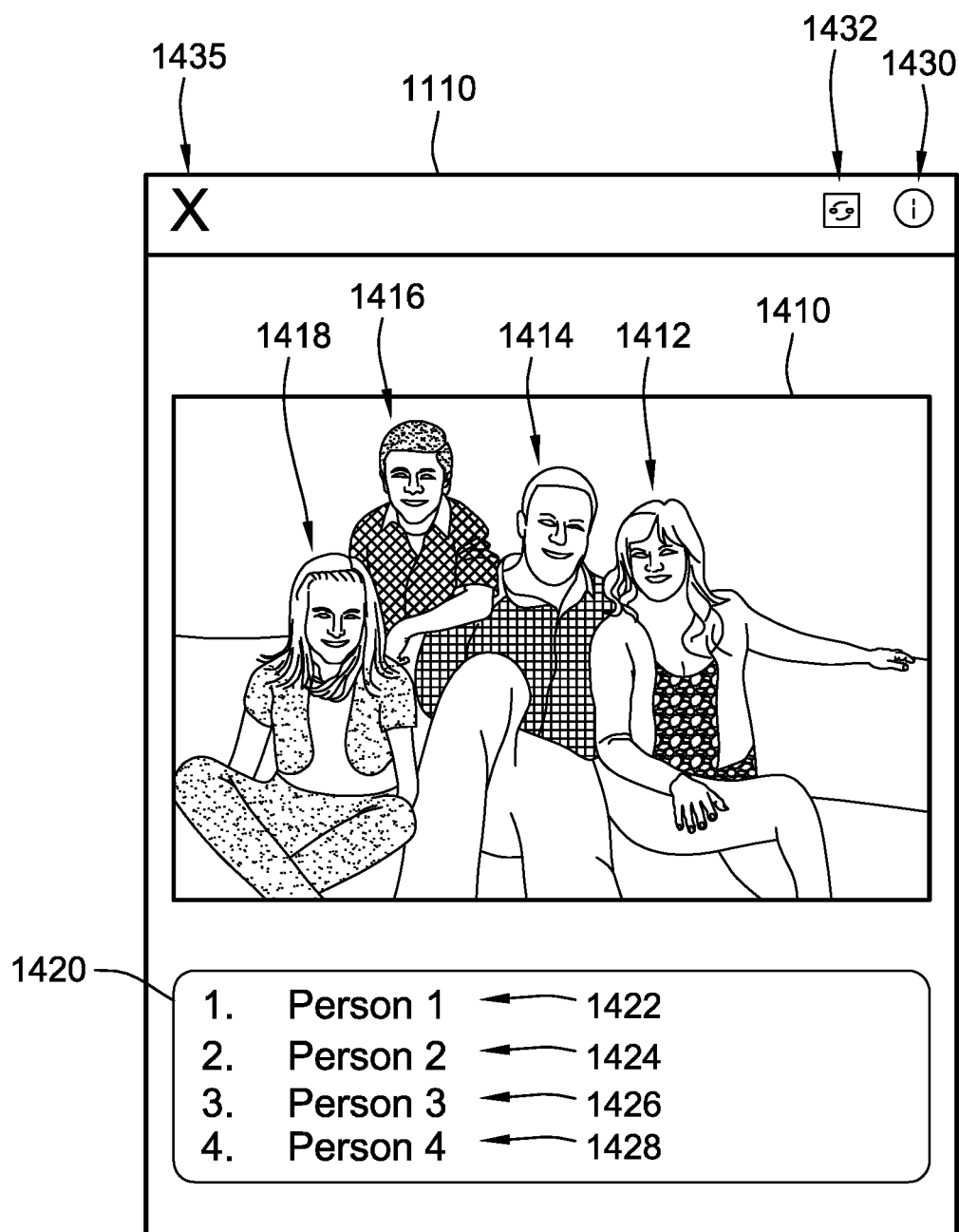
FIG. 7A illustrates a first digital photograph and a flipping element displayed on a video display device of the system of FIG. 4 prior to the initiation of a digital flipping action according to some implementations of the present disclosure.
Figure 7B:
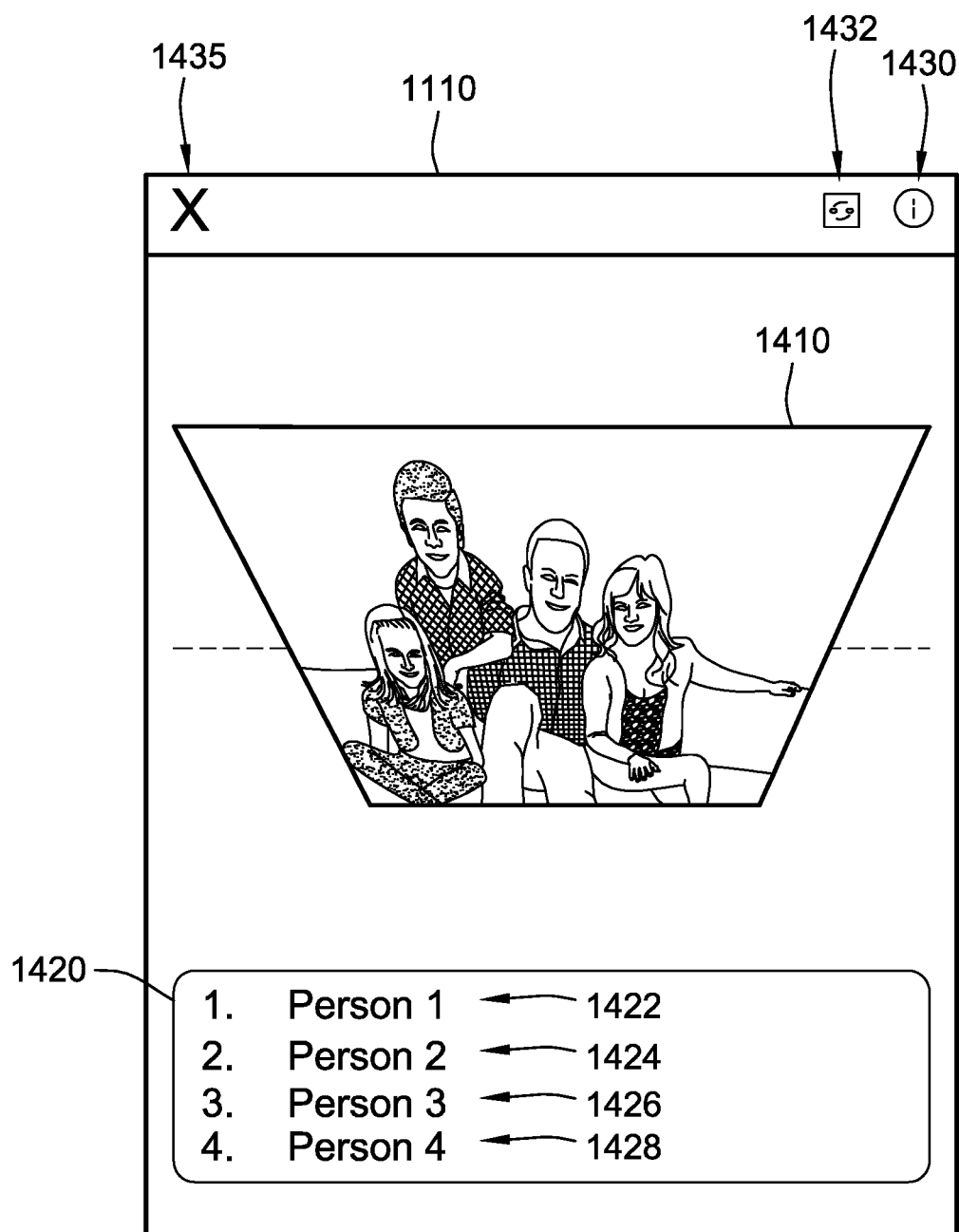
FIG. 7B illustrates the first digital photograph of FIG. 7A in a first position during digital flipping according to some implementations of the present disclosure.
Figure 7C:
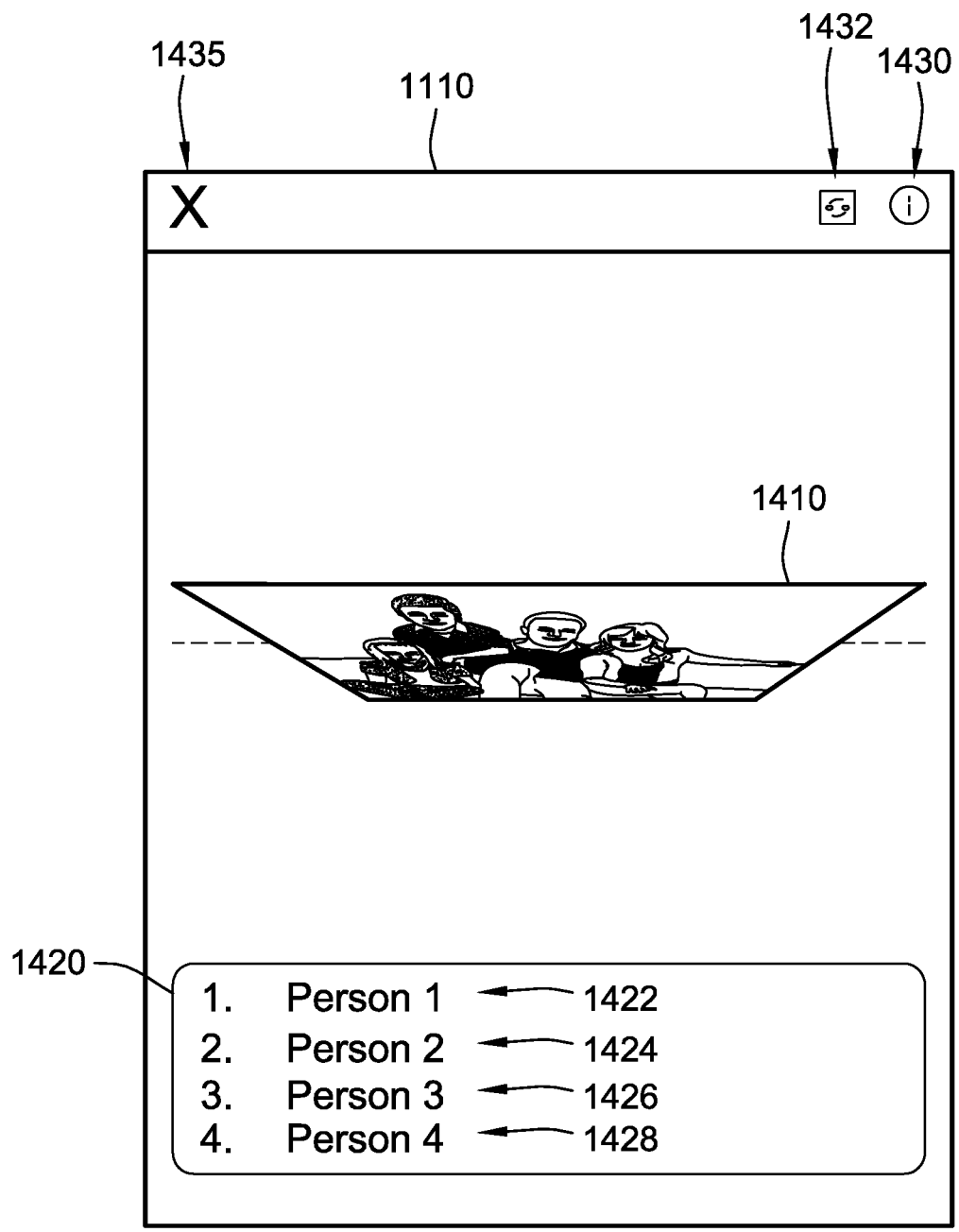
FIG. 7C illustrates the first digital photograph of FIG. 7A in a second position during digital flipping according to some implementations of the present disclosure.
Figure 7D:
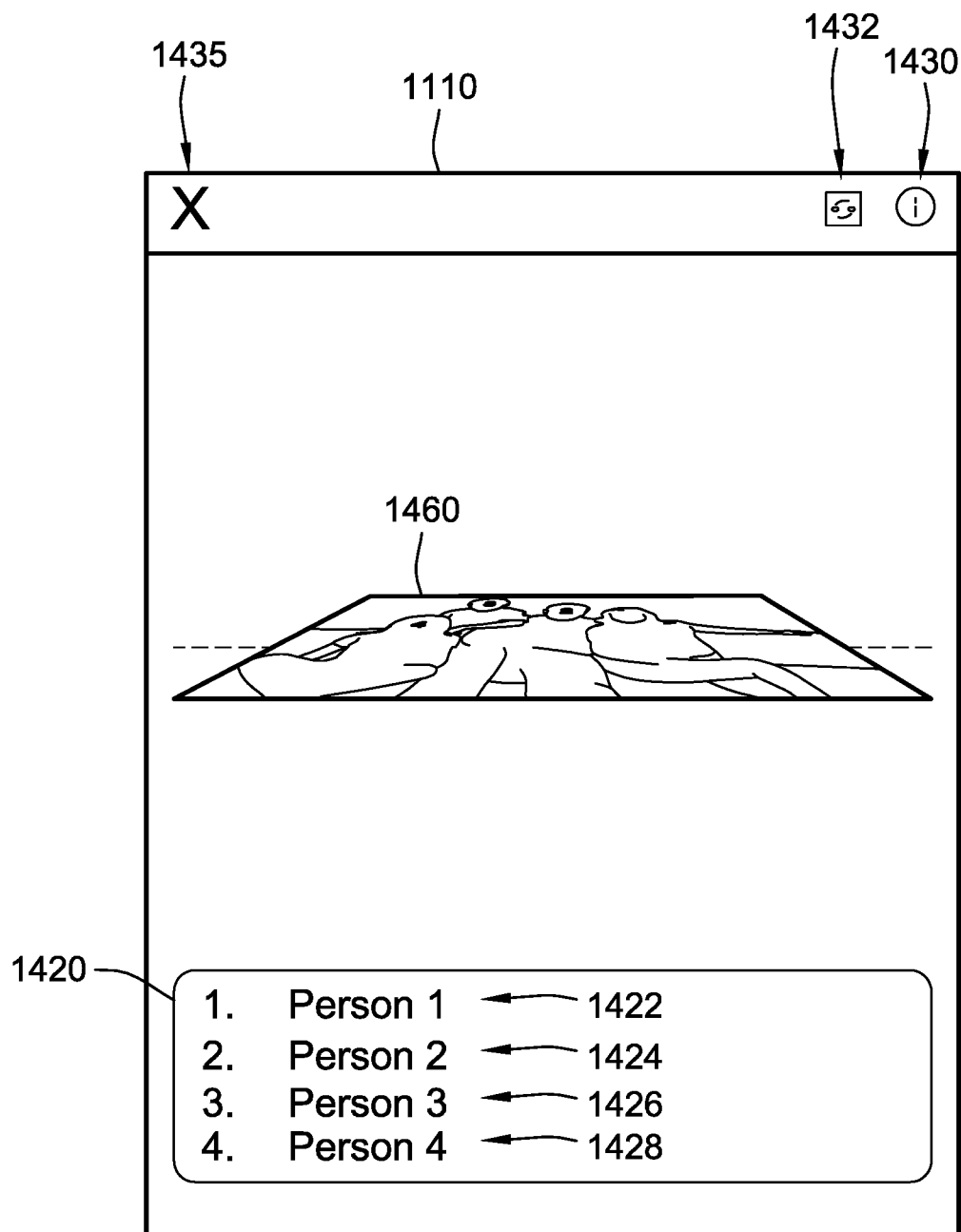
FIG. 7D illustrates a second digital photograph in a first position during digital flipping according to some implementations of the present disclosure.
Figure 7E:
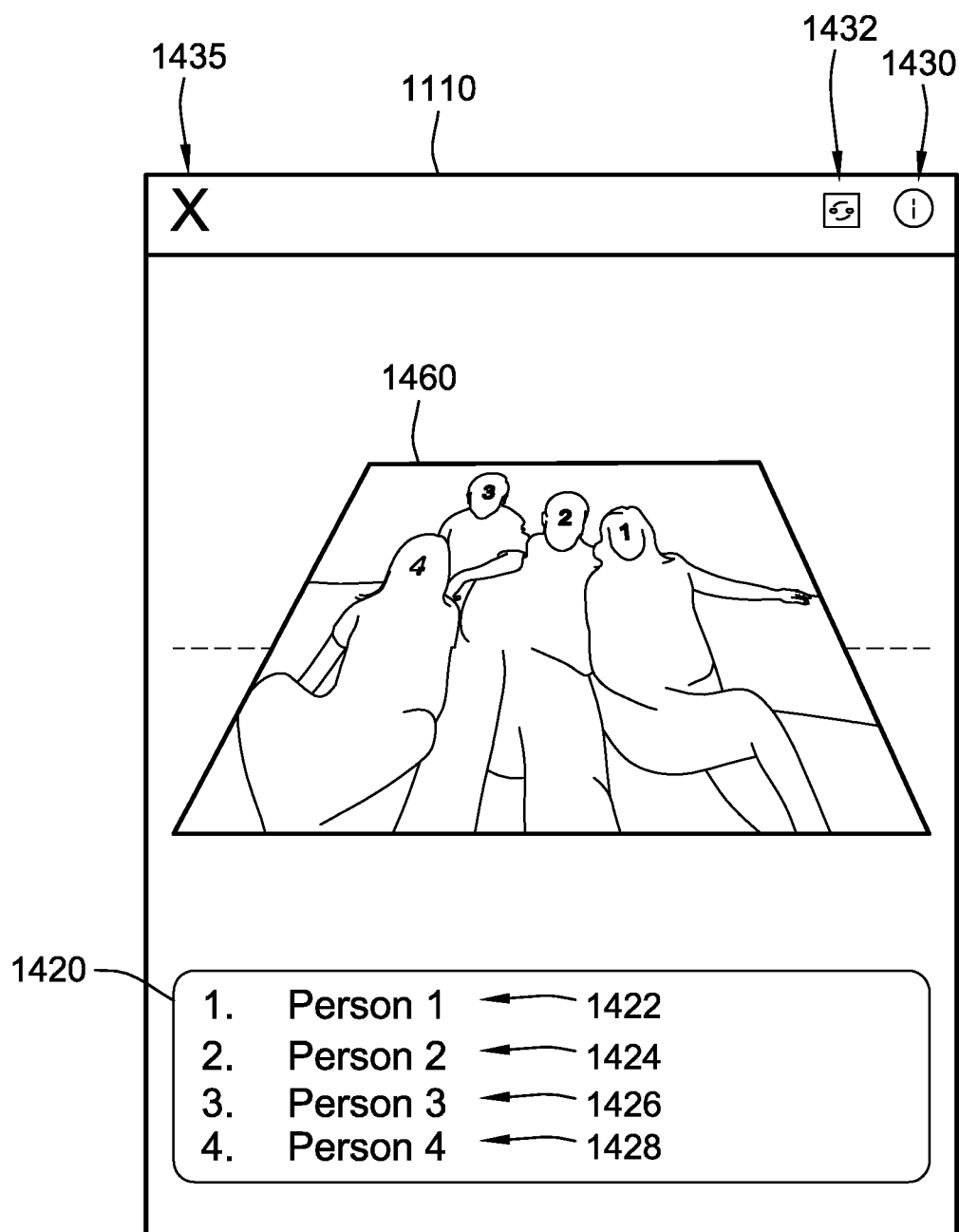
FIG. 7E illustrates the second digital photograph of FIG. 7D in a first position during digital flipping according to some implementations of the present disclosure.
Figure 7F:
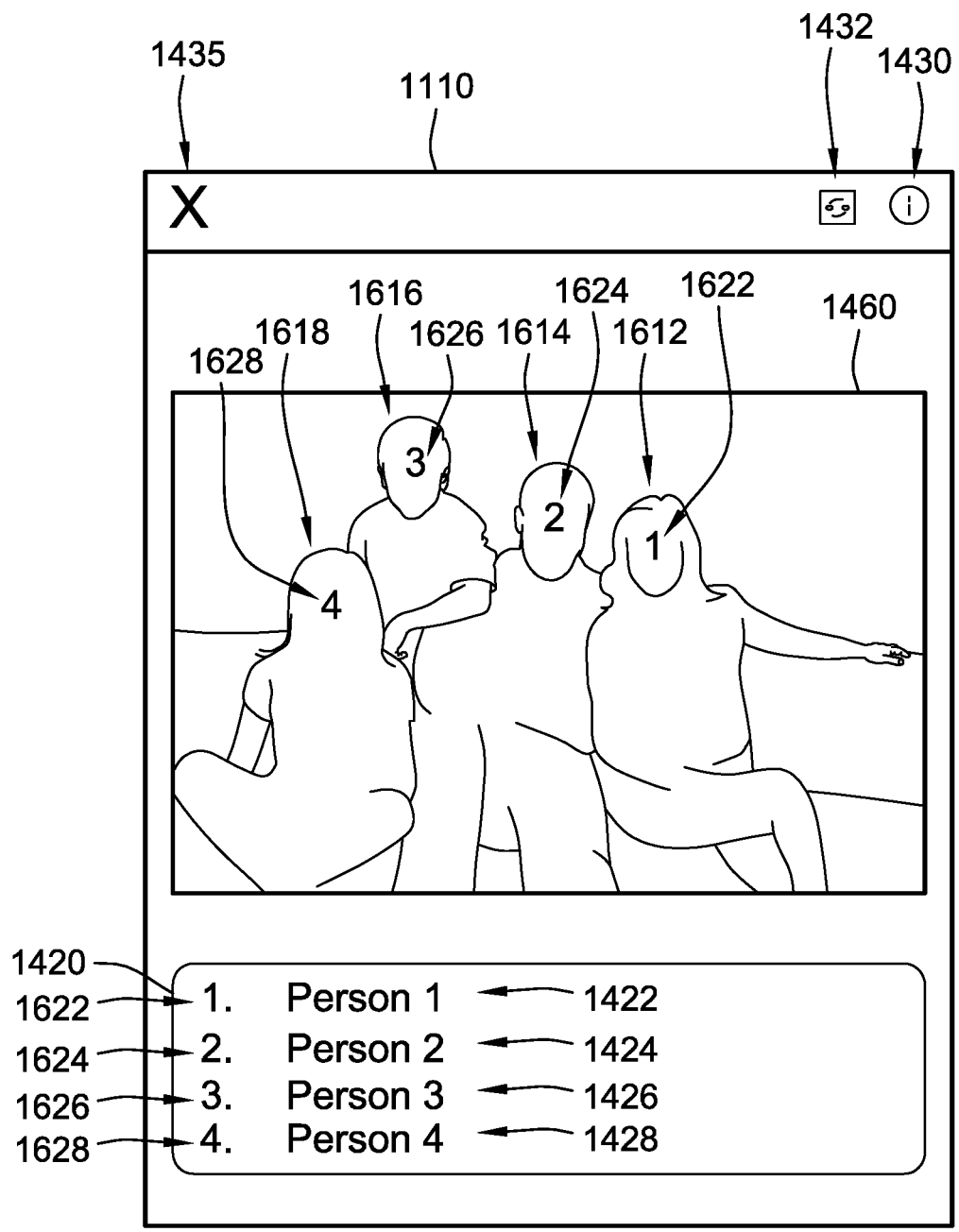
FIG. 7F illustrates the second digital photograph of FIG. 7D upon completion of the digital flipping in FIGS. 7B-7E according to some implementations of the present disclosure.

Referring back to FIG. 5B, a likeness generator element 1436 is also displayed on the video display device 1110. Selecting (e.g., by clicking or tapping) the likeness generator element 1436 causes a second digital image 1460 to be generated including a likeness of each of the people pictured in the first digital photograph 1410. As described above, the first digital photograph 1410 includes the first person 1412, the second person 1414, the third person 1416, and the fourth person 1418. As shown in FIG. 7A, in some implementations, the first digital photograph 1410 also includes the legend 1420, which includes the first person tag 1422, the second person tag 1424, the third person tag 1426, and the fourth person tag 1428, which correspond to the first person 1412, the second person 1414, the third person 1416, and the fourth person 1418, respectively. Referring to FIG. 7F, the second digital image 1460 includes a first person likeness 1612, a second person likeness 1614, a third person likeness 1616, and a fourth person likeness 1618, each of which correspond to the first person 1412, the second person 1414, the third person 1416, and the fourth person 1418, shown in FIG. 7A, respectively.

As evident by a comparison of FIG. 7A to FIG. 7F, the first person likeness 1612 in FIG. 7F is an outline of the first person 1412 in FIG. 7A. In other words, the first person likeness 1612 is only an outline (e.g., the outer contours) of the first person 1412 and does not include details such as colors, facial features, clothing details, or the like. Likewise, as shown by a comparison of FIG. 7A to FIG. 7F, the second person likeness 1614 in FIG. 7F is an outline of the second person 1414 in FIG. 7A, the third person likeness 1616 in FIG. 7F is an outline of the third person 1416 in FIG. 7A, and the fourth person likeness 1618 in FIG. 7F is an outline of the fourth person 1418 in FIG. 7A.

As shown in FIG. 7F, a first person indicium 1622, a second person indicium 1624, a third person indicium 1626, and a fourth person indicium 1628 are also displayed on the video display device 1110. More specifically, the first person indicium 1622 is overlaid on the first person likeness 1612, the second person indicium 1624 is overlaid on the second person likeness 1614, the third person indicium 1626 is overlaid on the third person likeness 1616, and the fourth person indicium 1628 is overlaid on the fourth person likeness 1618. As shown, each of the first person indicium 1622, the second person indicium 1624, the third person indicium 1626, and the fourth person indicium 1628 are overlaid where the face of the corresponding person would be (cf FIGS. 6A and 6F). Alternatively, the first person indicium 1622, the second person indicium 1624, the third person indicium 1626, and/or the fourth person indicium 1628 can more generally be overlaid on any portion of the corresponding person likeness.

Additionally, each of the first person indicium 1622, the second person indicium 1624, the third person indicium 1626, and the fourth person indicium 1628 are also displayed within the legend 1420. As shown, the first person indicium 1622 is positioned directly adjacent to the first person tag 1422, the second person indicium 1624 is positioned directly adjacent to the second person tag 1424, the third person indicium 1626 is positioned directly adjacent to the third person tag 1426, and the fourth person indicium 1628 is positioned directly adjacent to the fourth person tag 1428. This positioning of the person indicia relative to the person tags causes a user viewing the video display device 1110 to intuitively associate the adjacent indicium and person tag. For example, the first person indicium 1622 is intuitively linked to the first person tag 1422. Thus, the user can determine that the first person likeness 1612 on which the first person indicium 1622 is overlaid corresponds to the first person tag 1422.

In this manner, the indicia 1622-1628 act as unique identifier from which a user can intuitively determine who each of the individuals depicted in the first digital photograph 1410 are. As described herein, the user can digitally flip between the second digital photograph 1450 (FIG. 7F) and the first digital photograph 1410 (FIG. 7A), and vice versa. While a user can determine which people are in the first digital photograph 1410 based on the person tags 1422-1428 in the legend 1420, the user may not know which people in the first digital photograph 1410 correspond to which person tags 1422-1428 (e.g., because the user does not personally recognize the people in the first digital photograph 1410). In this case, the user can digitally flip the first digital photograph 1410 as described herein to view the second digital image 1460 (FIG. 7F). Given that the indicia 1622-1628 are overlaid on the likenesses 1612-1218 in the second digital image 1460 (FIG. 7F), the user can then determine which person tags 1422-1428 in the legend 1420 correspond to which of the persons 1412-1418 in the first digital photograph 1410 (FIG. 7A) by digitally flipping between them.

Thus, advantageously, the person tags 1422-1426 do not need to be overlaid on the first digital photograph 1410 (FIG. 7A), which would obscure the first digital photograph 1410, for the user to determine who each person is the first digital photograph 1410. Instead, the person tags 1422-1426 are positioned in the legend 1420 below the first digital photograph 1410. Because the second digital image 1460 (FIG. 7F) only includes the likenesses 1612-1618, overlaying the indicia 1622-1628 on the second digital image 1460 does not obscure the image as would be the case if these were overlaid on the first digital photograph 1410 (FIG. 7A). Thus, the combination of the legend 1420 containing person tags 1422-1428 that is displayed below the first digital photograph 1410 (FIG. 7A) and the second digital image 1460 (FIG. 7F) and the indicia 1622-1628 (FIG. 7F) allow the user more quickly and easily identify the people depicted in the first digital photograph 1410.

While each of the first person indicium 1622, the second person indicium 1624, the third person indicium 1626, and the fourth person indicium 1628 (FIG. 7F) are shown as including alphanumeric text (in this example, the numbers 1, 2, 3, and 4), alternatively, the first person indicium 1622, the second person indicium 1624, the third person indicium 1626, and/or the fourth person indicium 1628 can be different symbols or shapes (e.g., the first person indicium 1622 is a square and the second person indicium 1624 is a triangle) such that the user can intuitively link the likenesses 1612-1618 to the person tags 1422-1428, and ultimately the persons 1412-1418 in the first digital photograph 1410 (FIG. 7A).

A user can flip between the first digital photograph 1410 and the second digital image 1460 in the same or similar manner as between the first digital photograph 1410 and the second digital image 1460 (FIGS. 6A-6F). For example, referring to FIGS. 7A-7F, the first digital photograph 1410 can be flipped about a horizontal axis rather than the vertical axis (FIGS. 6A-6F). Starting with FIG. 7A, the user initiates digital flipping of the first digital photograph 1410 by selecting (e.g., by clicking or tapping) the flipping element 1432. As shown in FIG. 7B, the first digital photograph 1410 begins to rotate about its horizontal axis such that the top edge of the first digital photograph 1410 appears to be moving towards the user of the video display device 1110 and the bottom edge of the first digital photograph 1410 appears to be moving away from the user of the video display device 1110. As shown in FIG. 7C, as the digital flipping continues, the first digital photograph 1410 continues to rotate about its horizontal axis. Eventually, the first digital photograph 1410 rotates until it is no longer displayed on the video display device 1110. As shown in FIG. 7D, the first digital photograph 1410 is not displayed on the video display device 1110 and instead, the second digital image 1460 is displayed on the video display device 1110. The second digital image 1460 rotates about its horizontal axis in the same way that the first digital photograph 1410 rotated such that the top edge or portion of the second digital image 1460 appears to be towards the user of the video display device 1110 and the bottom edge or portion of the second digital image 1460 appears to be moving away from the user of the video display device 1110. As shown in FIG. 7E, as the second digital image 1460 continues to rotate, the area that the second digital image 1460 takes up on the video display device 1110 increases. Finally, as shown in FIG. 7F, upon completion of the digital flipping the second digital image 1460 is displayed on the video display device 1110. The digital flipping in FIGS. 7A-7F can have a predetermined time (e.g., the time it takes to go from FIG. 7A to FIG. 7F). Generally, the predetermined time can be any suitable time (e.g., 0.01 seconds, 0.1 seconds, 1 second, 3 seconds, 10 seconds, 30 seconds, etc.)

Figure 8A:
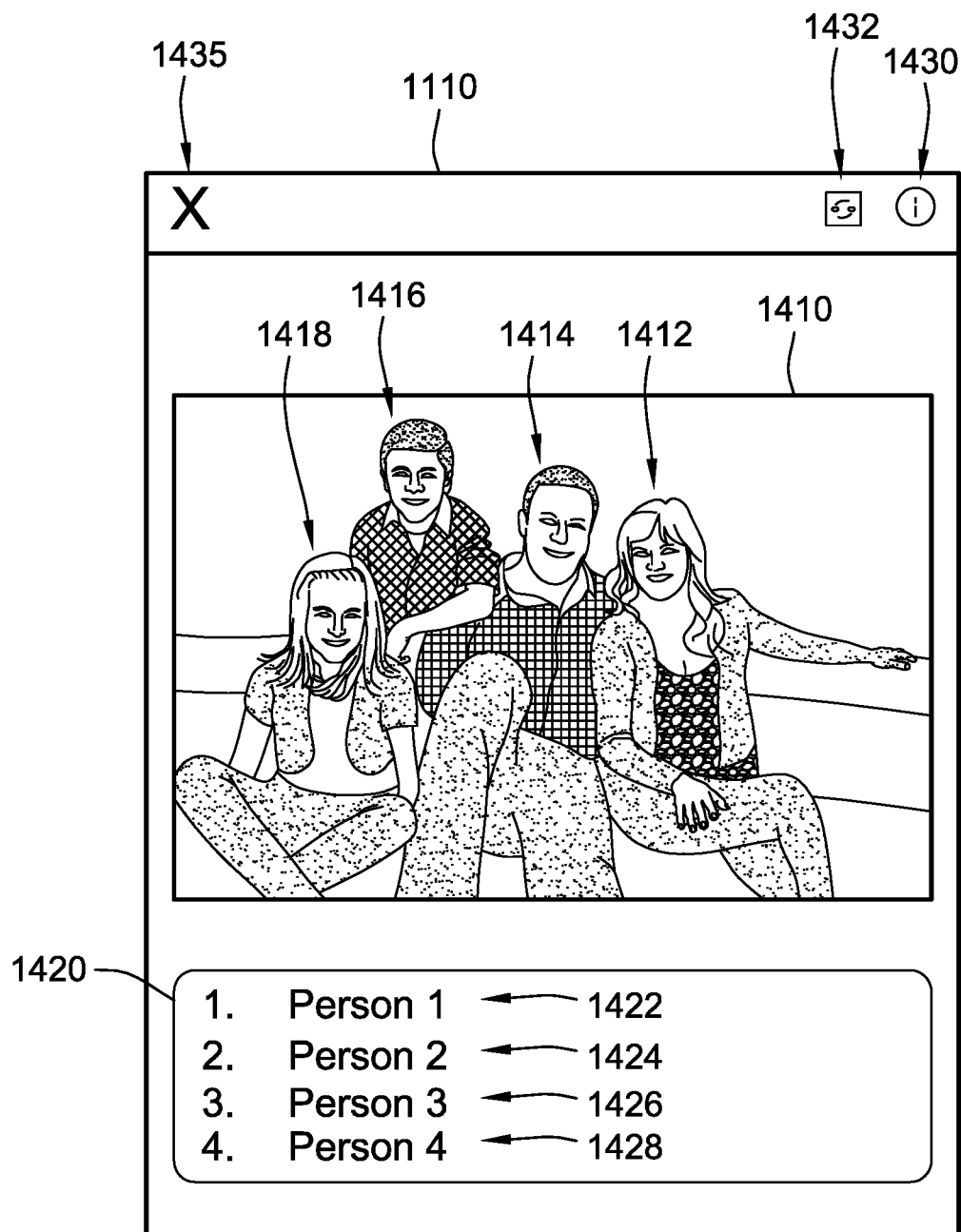
FIG. 8A illustrates a first digital photograph and a flipping element displayed on a video display device of the system of FIG. 4 prior to the initiation of a digital flipping action according to some implementations of the present disclosure.
Figure 8B:
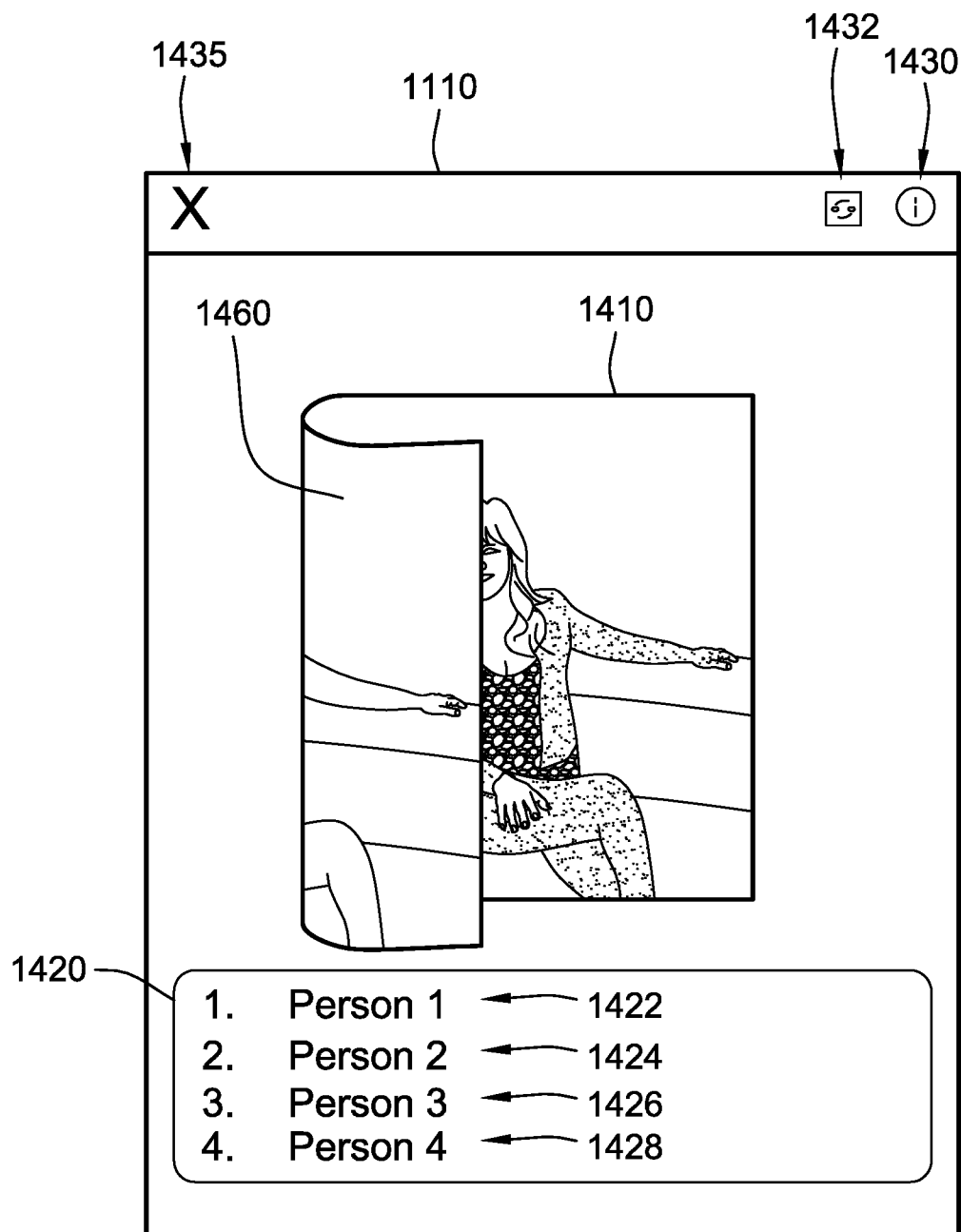
FIG. 8B illustrates a first portion of the first digital photograph of FIG. 7A and a first portion of a second digital image during digital flipping according to some implementations of the present disclosure.
Figure 8C:
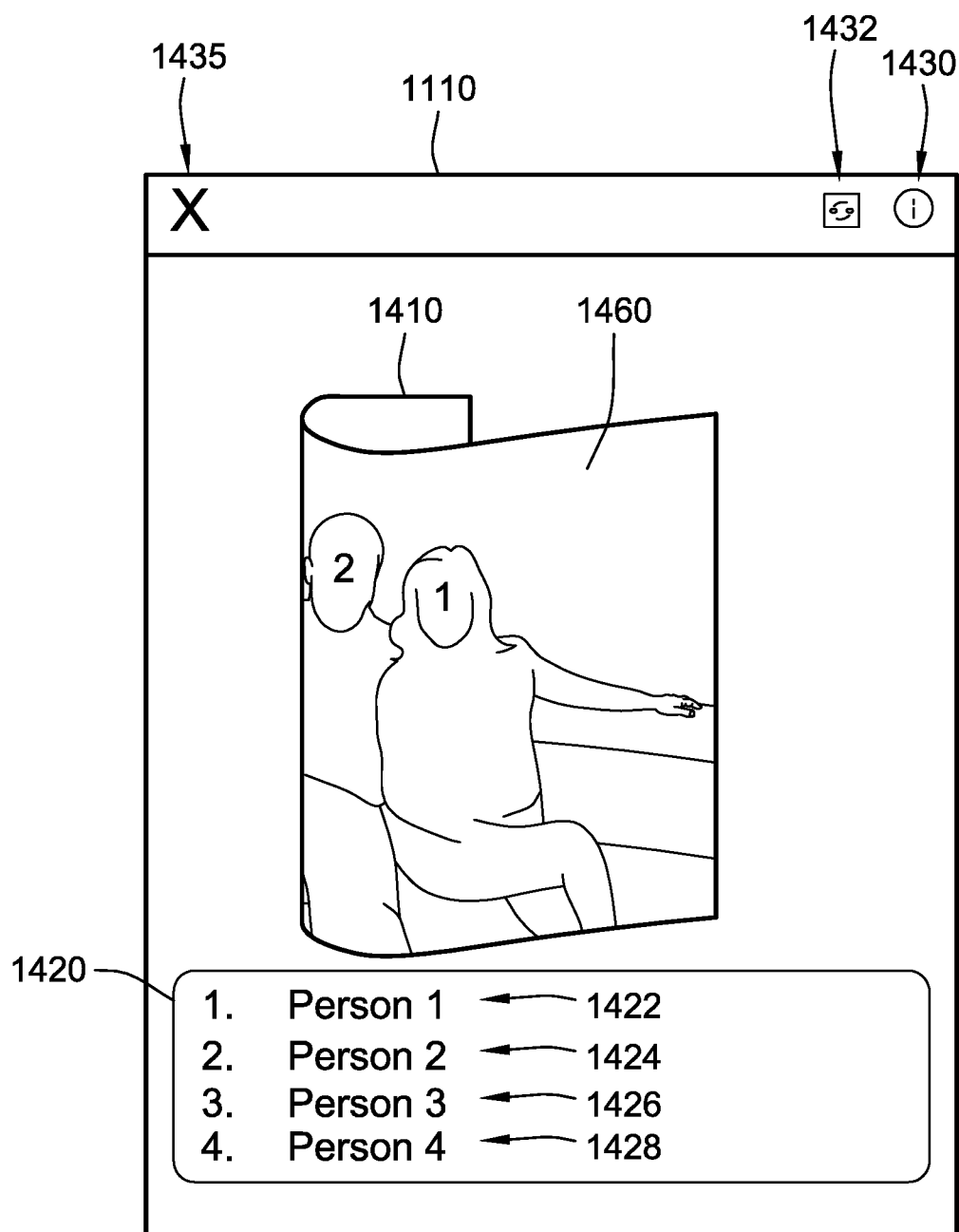
FIG. 8C illustrates a second portion of the second digital image of FIG. 8B during digital flipping according to some implementations of the present disclosure.
Figure 8D:
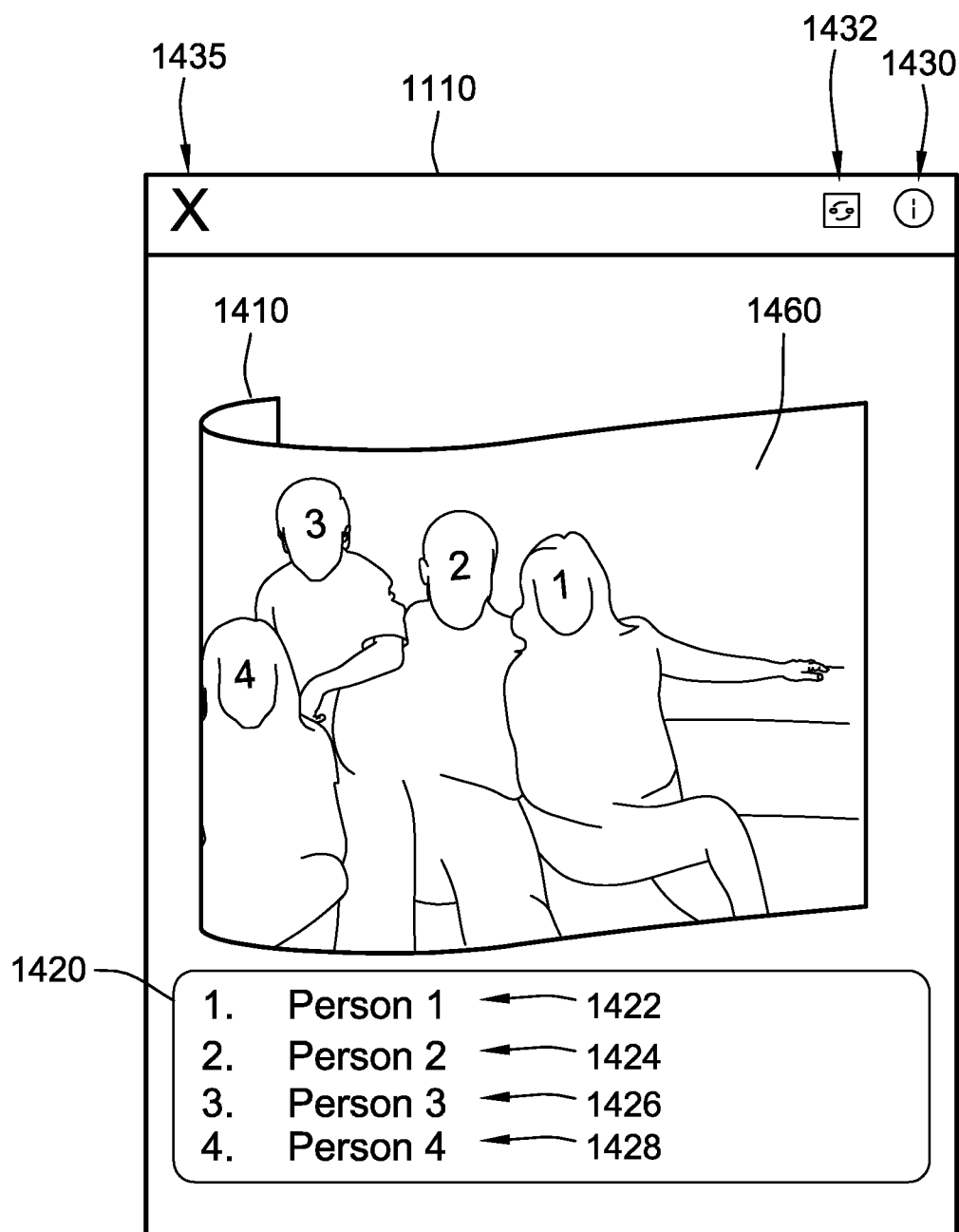
FIG. 8D illustrates a third portion of the second digital image of FIG. 8B during digital flipping according to some implementations of the present disclosure.
Figure 8E:
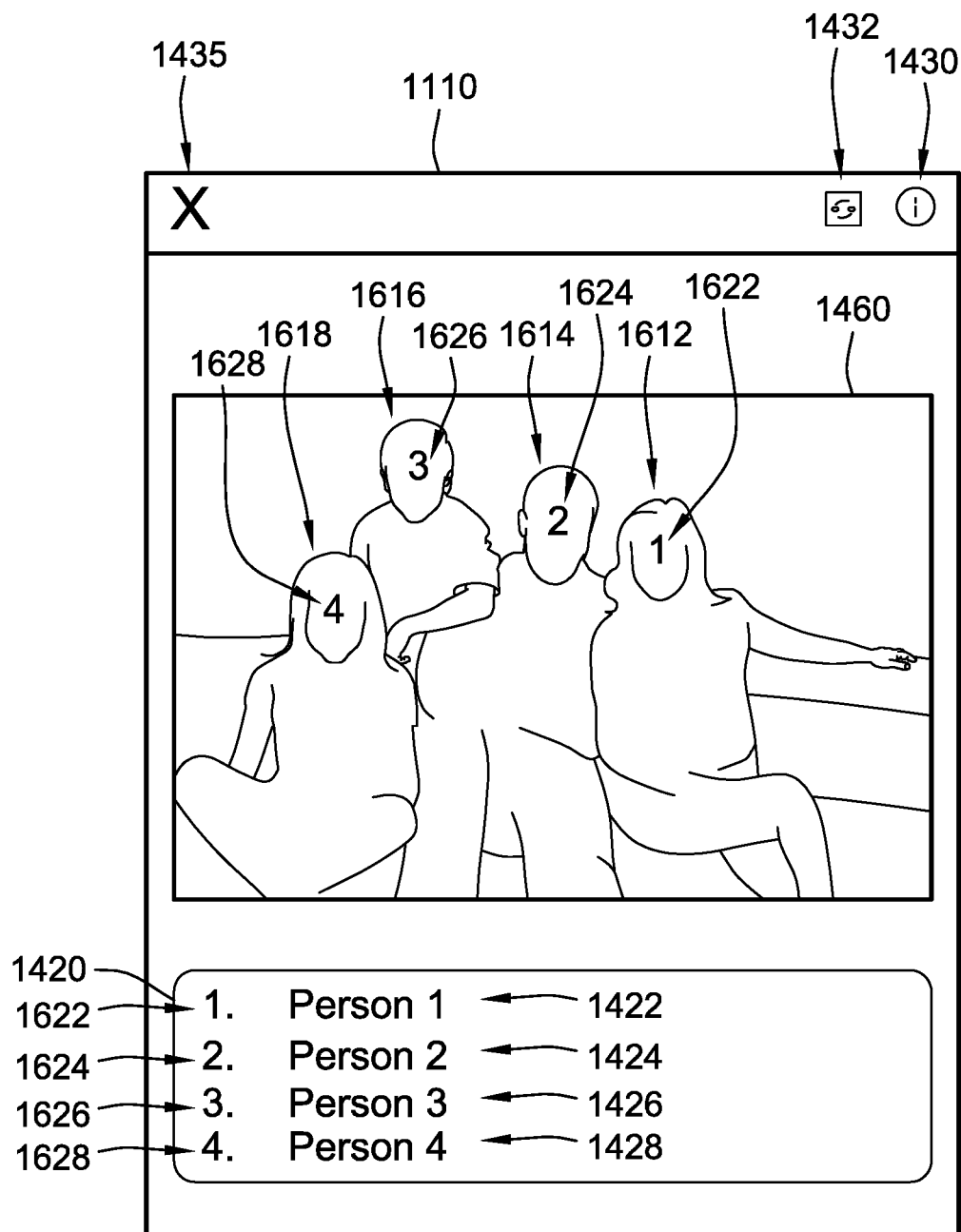
FIG. 8E illustrates the second digital photograph upon completion of the digital flipping according to some implementations of the present disclosure.

Referring to FIG. 8A-8D, the first digital photograph 1410 is displayed on the video display device 1110. Responsive to a selection of the flipping element 1432, as shown in FIG. 8B, the left side of the first digital photograph 1410 begins to peel back revealing a portion of the second digital image 1460 that is on the back of the first digital photograph 1410 (e.g., as if a user was turning/curling a physical photograph to see the back like turning the page of a book). As shown in FIGS. 8C and 8D, as the digital flipping continues, the left side of the first digital photograph 1410 continues to move towards the right such that a larger portion of the second digital image 1460 is displayed and of the first digital photograph 1410 is no longer displayed on the video display device 1110. The digital flipping in FIGS. 8A-8D can have a predetermined time (e.g., the time it takes to go from FIG. 8A to FIG. 8D). Generally, the predetermined time can be any suitable time (e.g., 0.01 seconds, 0.1 seconds, 1 second, 3 seconds, 10 seconds, 30 seconds, etc.) Further, while the left side of the first digital photograph 1410 is shown as being moved towards the right for the flip in FIGS. 8A-8D, more generally, the first digital photograph 1410 can be flipped in this manner in any direction (e.g., the top right corner moves towards the bottom left corner, the bottom right corner moves towards the top left corner, the left edge moves towards the right edge, the right edge moves towards the left edge, the top edge moves towards the bottom edge, the bottom edge moves towards the top edge, etc.)

In some implementations, rather than be digitally flipped responsive to a selection of the flipping element 1432, a user can cause the first digital photograph 1410 to be digitally flipped by clicking or tapping on the first digital photograph 1410 and dragging in a desired direction. For example, a user can click or tap the first digital photograph 1410 at or near the left edge thereof and pull to the right, causing the first digital photograph 1410 to flip about its vertical axis in the same or similar manner as shown in FIGS. 6A-6E. As another example, the user can click or tap the first digital photograph 1410 at or near the top edge thereof and pull down, causing the first digital photograph 1410 to flip about its horizontal axis in the same or similar manner as shown in FIGS. 7A-7E. As yet another example, the user can click or tap the first digital photograph 1410 at or near the left side thereof and pull towards the right, causing the first digital photograph 1410 to flip over to the second digital image 1460 in the same or similar manner as shown in FIGS. 8A-D.

Figure 9:
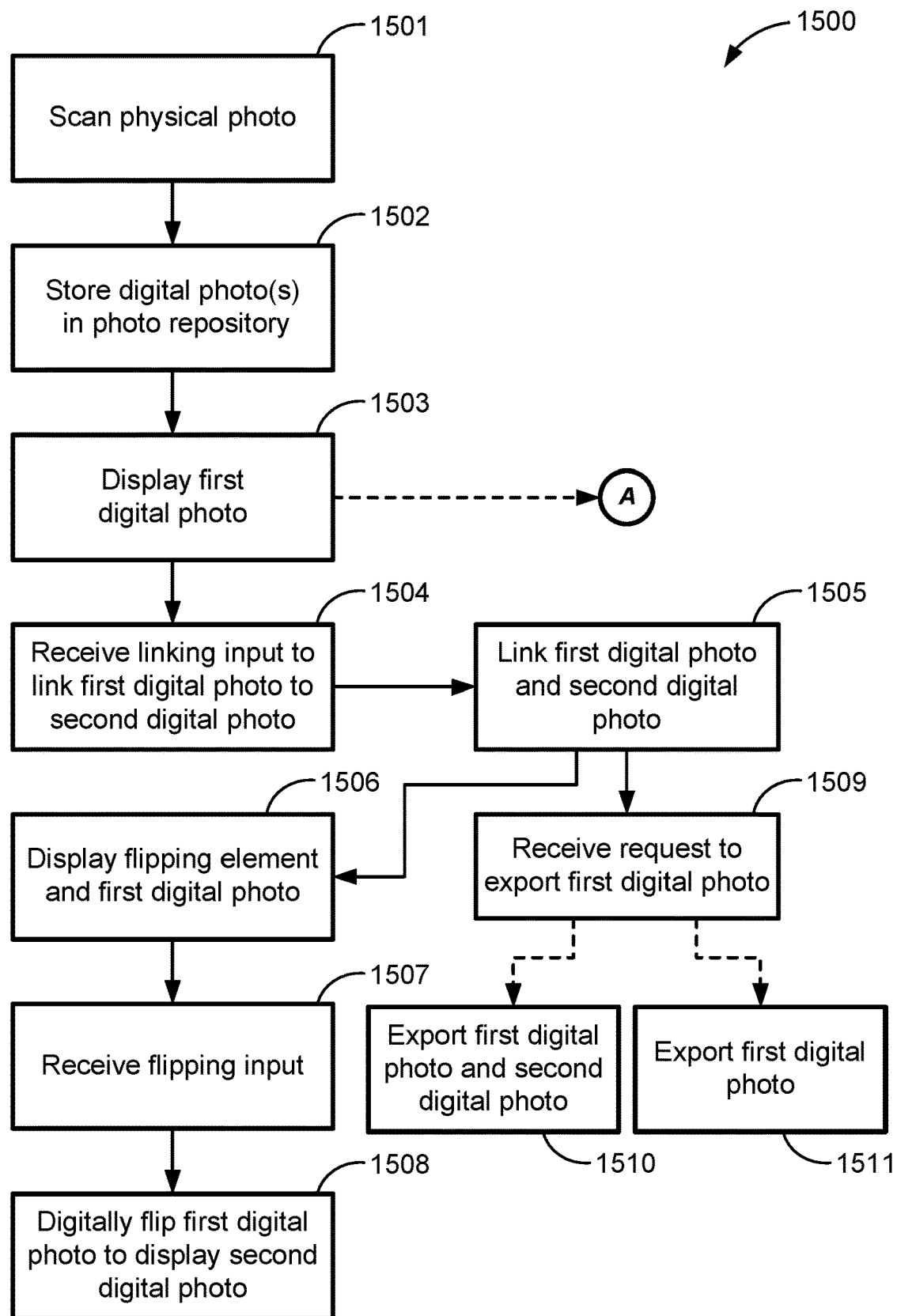
FIG. 9 is a process flow diagram for a method of linking digital photographs according to some implementations of the present disclosure.

Referring to FIG. 9, a method 1500 for digitally linking digital photograph is described. The method 1500 can be implemented, for example, using the system 1000 (FIG. 4) described herein. More specifically, the flowchart can be implemented as a computer algorithm that instructs or causes the processor 1102 of the user device 1100 to perform the following functions according to non-transitory, machine-readable instructions stored in the memory device 1104. Alternatively, the flowchart can be implemented as a computer algorithm that instructs or causes the processor 1202 of the remote device 1200 to perform the following functions according to non-transitory, machine-readable instructions stored in the memory device 1204. Alternatively still, the flowchart can be implemented as a computer algorithm that instructs or causes both the processor 1202 of the remote device 1200 to perform the following functions according to non-transitory, machine-readable instructions stored in the memory device 1204 and the processor 1102 of the user device 1100 to perform the following functions according to non-transitory, machine-readable instructions stored in the memory device 1104.

Step 1501 of the method 1500 includes scanning a physical photograph using, for example, the scanner 1300 of the system 1000 (FIG. 4). As described herein, a physical photograph has two sides (e.g., a first side on which the image is printed and a second side including writing). Thus, the scanning in step 1501 can include scanning both sides of the physical photograph. Scanning allows each side of the physical photograph to be converted to a digital photograph that can be stored on the user device 1100 and/or the remote device 1200 (FIG. 4).

Step 1502 of the method 1500 includes storing one or more digital photographs in the file repository 1106 of the user device 1100, the photo repository 1206 of the remote device 1200, or both. Storing the digital photographs allows each digital photograph to be retrieved and displayed on the video display device 1110 of the user device 1100. Upon completion of step 501, the digital photographs generated by the scanner 1300 are received and stored in the digital file repository 1106 of the user device 1100, the photo repository 1206 of the remote device 1200, or both. In some implementations, the method 1500 does not include first step 1501. In such implementations, the digital photographs are not scanned versions of a physical photograph (e.g., the digital photographs are digital photograph that were generated by the camera 1108 of the user device 1100 shown in FIG. 4).

Step 1503 of the method 1500 includes displaying a first digital photograph on the video display device (e.g., the first digital photograph 1410 described and illustrated herein). As shown in FIG. 5A, the user-selectable information element 1430 and the user-selectable navigation element 1435 are also displayed on the video display device 1110 along with the first digital photograph 1410.

Step 1504 of the method 1500 includes receiving a linking input indicative of a desire to link the first digital photograph with a second digital photograph. For example, step 1504 includes receiving a selection of the user-selectable information element 1430 shown in FIG. 5A, which causes the linking element 1433 to be displayed on the video display device 1110 as shown in FIG. 5B. Selecting the linking element 1433 causes a plurality of digital photographs to be displayed on the video display device 1110, including the second digital photograph 1450, as shown in FIG. 5C. If the user desires to link the first digital photograph 1410 (FIG. 5A) with the second digital photograph 1450 (FIG. 5C), the user selects the second digital photograph 1450.

Step 1505 of the method 1500 includes digitally linking the first digital photograph and the second digital photograph together. For example, step 1505 includes causing the first digital photograph 1410 to be digitally linked to the second digital photograph 1450. The linking during step 1505 also includes modifying the metadata of the first digital photograph to include information associated with the second digital photograph responsive to receiving a linking input (step 1504). As described herein, the each of the digital photographs includes metadata. Step 1508 includes modifying the metadata of the first digital photograph to include a name of the linked second digital photograph.

Step 1506 of the method 1500 includes displaying the first digital photograph and a flipping element on the video display device. For example, as shown in FIG. 6A, the first digital photograph 1410 and the flipping element 1432 are displayed on the video display device 1110 responsive receiving the linking input indicative of a desire to link the first digital photograph 1410 and the second digital photograph 1450 during step 1504 described above. Displaying the flipping element 1432 provides an indication to the user that the displayed first digital photograph 1410 is linked with another digital photograph.

Step 1507 of the method 1500 includes receiving a flipping input from the user indicative of a desire to flip the first digital photograph and view the linked second digital photograph. As described herein, in some implementations, the flipping input is a selection (e.g., by clicking or tapping) of the flipping element 1432 (FIG. 6A).

Step 1508 of the method 1500 includes digitally flipping the first digital photograph. As described herein, the first digital photograph 1410 can be flipped such that the second digital photograph 1450 is displayed on the video display device 1110. For example, the first digital photograph 1410 can be flipped to the second digital photograph 1450, for example, as shown in FIGS. 6A-6E. Additionally, while flipping between the first digital photograph 1410 and the second digital image 1460 are shown in FIGS. 7A-7E and FIGS. 8A-8D, step 1508 can include flipping between the first digital photograph 1410 and the second digital photograph 1450 in the same or similar manner.

In some implementations, the method optionally includes step 1509. Step 1509 includes receiving a request to export the first digital photograph to a remote device (e.g., export the first digital photograph 1410 from the user device 1100 or the remote device 1200 to some other remote device). Responsive to receiving a request to export the first digital photograph, the user is prompted to input whether the user desires to: (1) export only the first digital photograph; or (2) export both the first digital photograph and the second digital photograph. If an input indicative of a desire to export the first digital photograph and the second digital photograph is received, the method 1500 proceeds to step 1510, which includes exporting both the first digital photograph and the second digital photograph to the remote device. If an input indicative of a desire to export only the first digital photograph is received, the method proceeds to step 1511. Step 1510 includes exporting the first digital photograph to the remote device. As described above, the first digital photograph is linked to the second digital photograph during step 1505 and the metadata of the first digital photograph is modified during step 1508. Thus, in both steps 1510 and 1511, the metadata of the exported first digital photograph will include the name of the second digital photograph. In step 1511 where the second digital photograph is not exported, the metadata of the first digital photograph will include the name of the linked second digital photograph.

The digital photograph linking systems and methods described herein (e.g., system 1000 and method 1500) allow users to more efficiency and accurately retrieve and display digital photographs. Unlike a physical photograph that is a three-dimensional object that can be flipped back and forth to see both sides, digital photographs are generally two-dimensional when displayed on display devices. Moreover, in the case of a physical photograph, the two sides are physically linked together, whereas two digital photographs in a database may be stored in different locations. If a user desires to link two digital photographs together such that the user can quickly flip between the two digital photographs (e.g., like the first and second sides of a physical photograph), typically, the digital photographs would need to be displayed side-by-side or organized in the database of digital photographs such that the user can swipe between them (e.g., the two are sequentially stored in the database or photo repository). Digitally linking digital photographs as described herein offers several advantages. For example, the two digital photographs can be stored in different library or albums and yet need only find and select one of the digital photographs, and once that digital photograph is displayed, the user can digitally flip it to view the linked photograph. The systems and methods described herein improve the speed, accuracy, and usability of a database containing a plurality of digital photographs.

Figure 10:
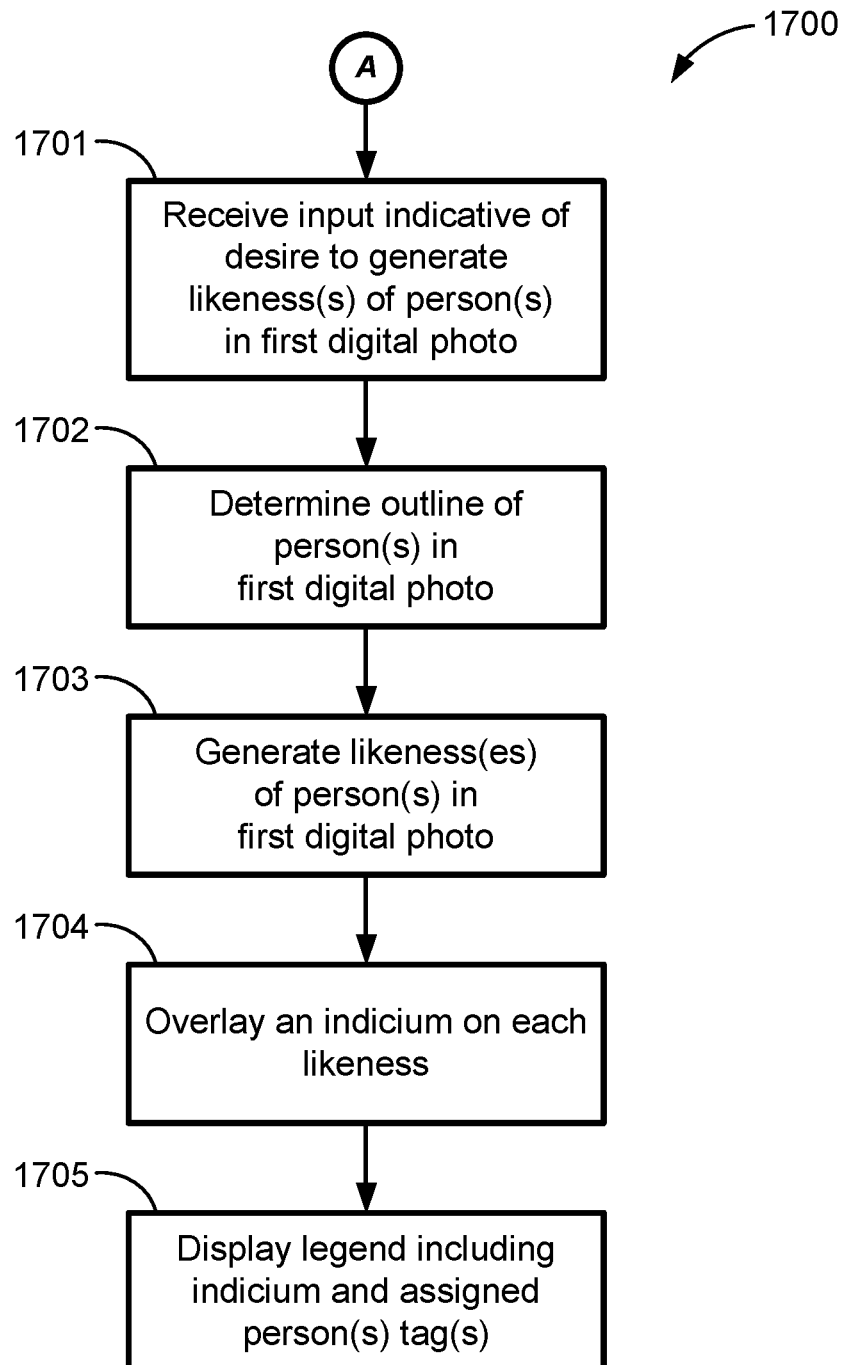
FIG. 10 is a process flow diagram for a method for generating a second photograph including a likeness of a first person in a first photograph according to some implementations of the present disclosure.

Referring to FIG. 10, a method 1700 for generating the second digital image 1460 (FIG. 7F) from the first digital photograph 1410 (FIG. 7A) is described. The method 1700 can be implemented, for example, using the system 1000 (FIG. 4) described herein. More specifically, the flowchart can be implemented as a computer algorithm that instructs or causes the processor 1102 of the user device 1100 to perform the following functions according to non-transitory, machine-readable instructions stored in the memory device 1104. Alternatively, the flowchart can be implemented as a computer algorithm that instructs or causes the processor 1202 of the remote device 1200 to perform the following functions according to non-transitory, machine-readable instructions stored in the memory device 1204. Alternatively still, the flowchart can be implemented as a computer algorithm that instructs or causes both the processor 1202 of the remote device 1200 to perform the following functions according to non-transitory, machine-readable instructions stored in the memory device 1204 and the processor 1102 of the user device 1100 to perform the following functions according to non-transitory, machine-readable instructions stored in the memory device 1104.

Referring back to FIG. 9, in some implementations, method 1700 is performed following step 1503 of the method 1500. That is, a user can choose to generate the second digital image 1460 instead of linking the first digital photograph 1410 and the second digital photograph 1450 (step 1504 of the method 1500). Step 1701 of the method 1700 (FIG. 10) includes receiving an input indicative of a desire to generate likeness(es) of the person(s) in the first digital photo. As described herein, in some implementations, the first digital photograph is associated with person tags that are generated by a user and assigned to each person in the first digital photograph 1410 by the user. Referring to FIGS. 5A and 5B, as described herein, a user can select the information element 1430 (FIG. 5A), which causes the people tag element 1438 (FIG. 5B) to displayed on the video display device 1110. The user can use the people tag element 1438 (FIG. 5B) to input the first person tag 1422, the second person tag 1424, the third person tag 1426, and the fourth person tag 1428. For example, in some implementations, selecting the people tag element 1438 (FIG. 5B) and inputting a person tag causes the first digital photograph 1410 to be displayed on the video display device 1110 such that a user can select (e.g., click or tap) the associated person in the first digital photograph 1410, thereby associating the person depicted in the first digital photograph 1410 and the inputted person tag.

In other implementations, the person tags are automatically generated and automatically assigned to each person in the first digital photograph 1410. In such implementations, step 1701 includes detecting a face of a person in the first digital photograph 1410 and comparing the detected face of the person to a facial recognition database (e.g., that is stored in the memory device 1101 of the user device 1100 and/or the memory device 1204 of the remote device 1200 shown in FIG. 4) to identify the person. A person tag that is associated with the identified person is then automatically generated and associated with the person in the first digital photograph 1410. For example, the face of the first person 1412 is detected, compared to the facial recognition database to determine that this is the first person 1412, and the first person tag 1422 is automatically generated and automatically assigned to the first person 1412 in the first digital photograph 1410.

Step 1702 of the method 1700 includes determining an outline of each person that is assigned a person tag during step 1701. That is, step 1702 includes analyzing the first digital photograph 1410 and identifying the outline or outer contours of each person that is tagged during step 1701. In some implementations, analyzing the first digital photograph 1410 includes using one or more filters (e.g., a color filter, a shape filter, or the like, or any combination thereof) to identify the outline or outer contours of each person to analyze the first digital photograph 1410.

Step 1703 of the method 1700 includes generating a likeness of each person in the first digital photograph that is assigned a person tag during step 1701. As shown in FIG. 7F, the second digital image 1460 includes the first person likeness 1612, the second person likeness 1614, the third person likeness 1616, and the fourth person likeness 1618, each of which is the outline of the corresponding person in the first digital photograph 1410 (compare FIGS. 6A and 6F). As described above, each likeness is the outline of each person and does not include additional details (e.g., facial features, colors, etc.) for simplicity. Each likeness is displayed in the second digital image 1460 in the same position as the outline of the corresponding person in the first digital photograph 1410. For example, as evidence by a comparison of FIGS. 6A and 6F, the first person likeness 1612 in the second digital image 1460 is in the same position as first person 1412 in the first digital photograph 1410. In other words, if one were to Step 1704 of the method 1700 includes overlaying an indicium on each likeness. As shown in FIG. 7F, the first indicium 1622 is overlaid on the first person likeness 1612, the second person indicium 1624 is overlaid on the second person likeness 1614, the third person indicium 1626 is overlaid on the third person likeness 1616, and the fourth person likeness is overlaid on the fourth person likeness 1618. More specifically, each indicium is overlaid within the boundaries of the corresponding likeness.

Step 1705 of the method 1700 includes displaying the legend 1420 (FIG. 7F) and the second digital image 1460 (e.g., on the video display device 1110). As shown in FIG. 7F, the legend 1420 is displayed below the second digital image 1460, which contains the likenesses 1612-1618 and the indicia 1622-1628. Thus, as described above, a user can intuitively determine who each person is in the first digital photograph 1410 (FIG. 7A) by viewing the second digital image 1460 (e.g., by digitally flipping the first digital photograph 1410, as described herein), viewing the indicium overlaid on the likeness (e.g., the first person indicium 1622 overlaid on the first person likeness 1612), viewing the legend 1420 to determine which person tag corresponds to the indicium (e.g., the first person tag 1422 positioned displayed directly adjacent to the first person indicium 1622), and thus determine that the first person 1412 in the first digital photograph 1410 corresponds to the first person tag 1422.

While the first digital photograph 1410 (FIG. 7A) is shown and described herein as including four people (the first person 1412, the second person 1414, the third person 1416, and the fourth person 1418), in some implementations, the first digital photograph 1410 can more generally include any number of people (e.g., one person, ten people, twenty people, one hundred people, etc.) And while the second digital image 1460 is shown and described herein as including four likenesses (the first person likeness 1612, the second person likeness 1614, the third person likeness 1616, and the fourth person likeness 1618), in some implementations, the second digital image 1460 can include a different number of likenesses than the number of people in the first digital photograph 1410 (e.g., the first digital photograph 1410 includes three people and the second digital image 1460 includes one likeness).

Approximate Date Tagging

As described herein, each digital photograph can include metadata, which includes data indicative of a date (e.g., day, month, year, time, etc.) that the digital photograph was generated (i.e., when the photograph was taken). However, some digital photographs may not include metadata with the date that the digital photograph was generated. For example, if the digital photograph is a scanned copy of a physical photograph, the metadata may contain the date that the digital photograph was scanned from the physical photograph, but does not contain the date that the actual physical photograph was generated.

Figure 11:
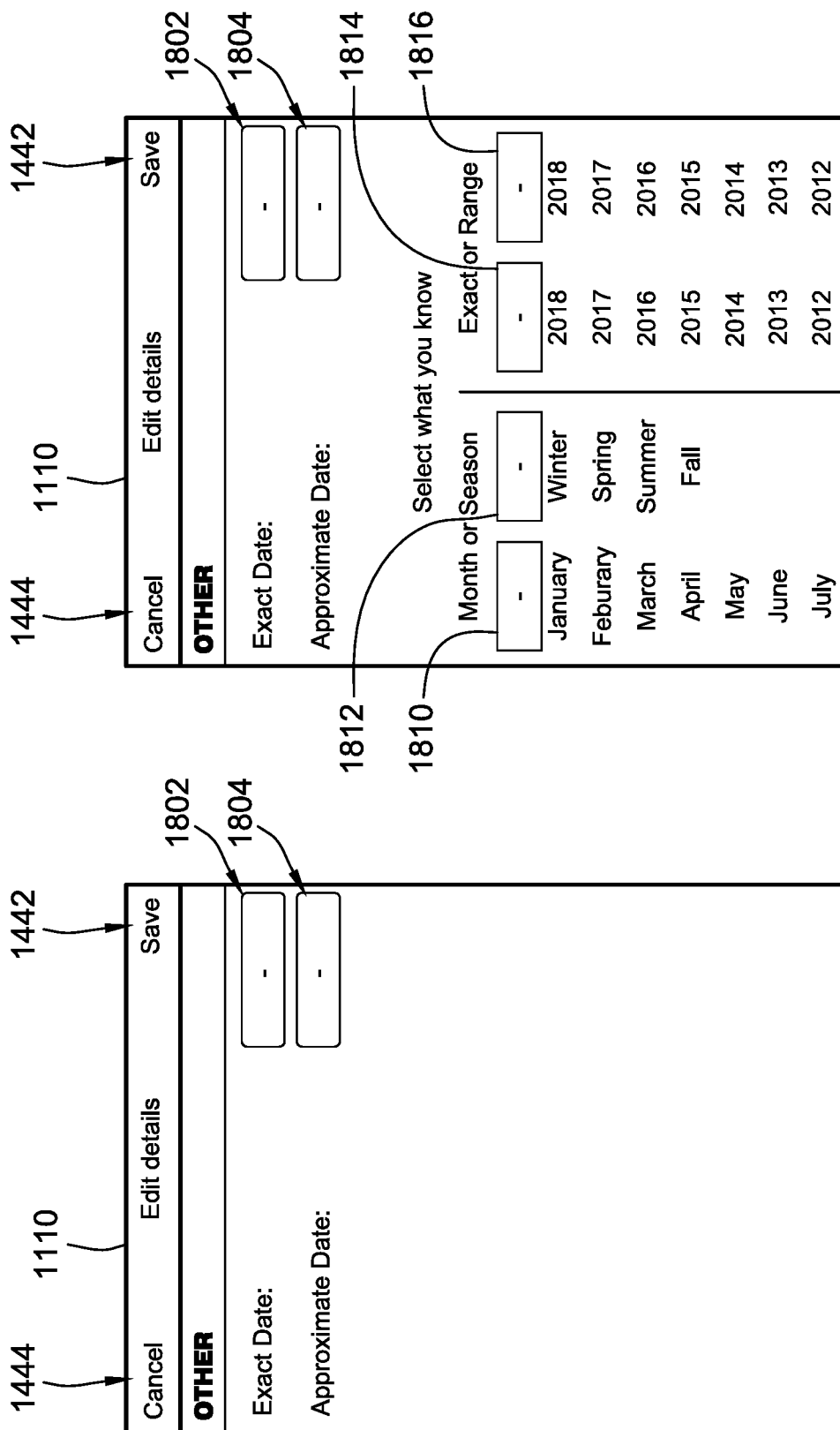
FIG. 11A illustrates an exact date tag element and an approximate date tag element displayed on a video display device according to some implementations of the present disclosure.
FIG. 11B illustrates a month input element, a season input element, a first year input element, and a second year input element according to some implementations of the present disclosure.

Referring to FIG. 5A, the first digital photograph 1410 and the user-selectable information element 1430 are displayed on the video display device 1110. As described herein, a selection (e.g., by clicking or tapping) of the information element 1430 causes the linking element 1433, the location tag element 1434, the likeness generator element 1436, the people tag element 1438, the date tag 1440, the save element 1442, and the cancel element 1444 are displayed on the video display device 1110, as shown in FIG. 5B. Referring to FIG. 11A, in some implementations, a selection (e.g., by clicking or tapping) of the information element 1430 causes an exact date tag element 1802 and an approximate date tag element 1804 to be displayed on the video display device 1110. Displaying the exact date tag element 1802 and the approximate date tag element 1804 (FIG. 11A) can be in addition to, or in the alternative of, also displaying the linking element 1433, the location tag element 1434, the likeness generator element 1436, the people tag element 1438, and the date tag 1440 (FIG. 5B).

In some implementations, the exact date tag element 1802 is automatically populated with the date that the first digital photograph 1410 was taken based on the metadata of the first digital photograph 1410. However, if the metadata does not contain the date that the first digital photograph 1410 was generated, the exact date tag element 1802 will not be automatically populated. In this case, the exact date tag element 1802 is user-selectable such that responsive to a selection (e.g., by clicking or tapping) of the exact date tag element 1802, the user can input (e.g., via a touchscreen keyboard) the exact date that the digital photograph 1410 was generated. Thus, if the user knows the exact date on which the first digital photograph 1410 was generated, the user can input that information via the exact date tag element 1802, thereby associating the first digital photograph 1410 with the exact date.

However, in some cases, the metadata of the first digital photograph 1410 does not include a date that the photo was generated and/or the user does not know the exact date, the user can select the approximate date tag element 1804. Referring to FIG. 11B, a selection of the user approximate date tag element 1804 causes a month input element 1810, a season input element 1812, a first year input element 1814, and a second year input element 1816 are displayed on the video display device 1110. The user can input known information and/or estimated information regarding the date that the first digital photograph 1410 was generated via the month input element 1810, the season input element 1812, the first year input element 1814, and the second year input element 1816. For example, a user selection of the month input element 1810 allows the user to enter more granular information regarding the date that the first digital photograph 1410 was generated. For example, a user may see Christmas decorations in the first digital photograph 1410 and input "December" using the month input element 1810. A user selection of the season input element 1812 prompts the user to input a season (e.g., winter, spring, summer, fall) during which the first digital photograph 1410 was generated. The season input element 1812 is useful for estimating when the first digital photograph 1410 if the user does not know or cannot estimate the month that the first digital photograph 1410 was generated. For example, the user may not know what month the first digital photograph 1410 was generated, but may see that it is snowing in the first digital photograph 1410 and input "winter" using the season input element 1812.

While the month input element 1810 and/or the season input element 1812 allow the user to input the time of the year that the first digital photograph 1410 was generated, the first year input element 1814 and the second year input element 1816 allow the user to input an exact year that the first digital photograph 1410 was generated, or a range of years during which the first digital photograph 1410. A user selection (e.g., by clicking or tapping) the first year input element 1814 prompts the user to input a year that the first digital photograph 1410 was generated. However, if the user desires to input a range of years, the user can input a first year via the first year input element 1814 and a second year via the second year input element 1816 (e.g., 2010 and 2015). In other words, entering a year into only the first year input element 1814 is an indication of an exact year, whereas entering different years into the first year input element 1814 and the second year input element 1816 is an indication of a range of years.

Once the user has input information via the month input element 1810, the season input element 1812, the first year input element 1814, and the second year input element 1816, this information can be displayed with the first digital photograph 1410 on the video display device 1100. For example, if the user inputs an exact date using the exact date tag element 1802, the exact date can be displayed with the first digital photograph 1410 (e.g., below the first digital photograph 1410). As another example, if the user inputs an approximate date via the approximate date tag element 1804, the approximate date can be displayed with the first digital photograph 1410 (e.g., below the first digital photograph 1410). When an approximate date is displayed, an indicium can also be displayed that provides an indication to the user that the displayed date is an approximate date (and not an exact date). For example, the indicium can be the letter "c," which is an abbreviation for "circa," which indicates that the date is an approximate date, although the indicium ## can more generally include any other indication that the date is an approximate date (e.g., a symbol such as "~").

In some implementations, rather than prompting a user to input known information about the first digital photograph 1410 via the approximate date tag element 1804 (FIG. 11A) and the month input element 1810, the season input element 1812, the first year input element 1814, and the second year input element 1816 (FIG. 11B), the approximate date tag element 1804 (FIG. 11A) can be automatically populated. In such implementations, the approximate date tag element 1804 is automatically populated by analyzing the first digital photograph 1410 to estimate the date that it was generated. For example, the size of the photograph, the type of film used for the photograph, the type of camera used for the photograph, the color or shading of the photograph, or any combination thereof can be analyzed (e.g., by comparing them to a look-up table of values) to estimate a date that it was generated. For example, the color of the photograph can be analyzed to identify fading that may be indicative of an older photograph.

Comparing Facial Features and Displaying the Results

People often desire to compare a person's facial features (e.g., nose, mouth, eyes, etc.) to those of another person and evaluate the resemblance (or lack thereof) between those people. For example, a person may see a child and their parents (e.g., in a photograph) remark that the child has the father's nose and the mother's eyes. Indeed, people may desire to know from which family member (e.g., parents, aunts/uncles, grandparents, etc.) they inherited a given facial feature, or to whom they are most similar (e.g., parent, sibling, cousin, etc.) However, this comparison is typically done by the naked eye, which cannot accurately quantify the similarities (or lack thereof). Moreover, this type of comparison often requires one to simultaneously view either the actual people, or photographs of those people. And, if one desires to compare a first person's facial features to multiple other people, they must either have a photograph with the first person and the other people together, or compile a series of photographs and review them individually. While a photograph can be analyzed with facial recognition software, facial recognition processes generally involve identifying a face in a photograph and comparing the face to known faces (e.g., in a database) to identify the person. Thus, it would be advantageous to quickly and efficiently compare one or more facial features of a first person to corresponding facial features of multiple other people (e.g., ten, fifty, one-hundred, one-thousand), quantify the similarities (or lack thereof), and intuitively display the results.

Figure 12:
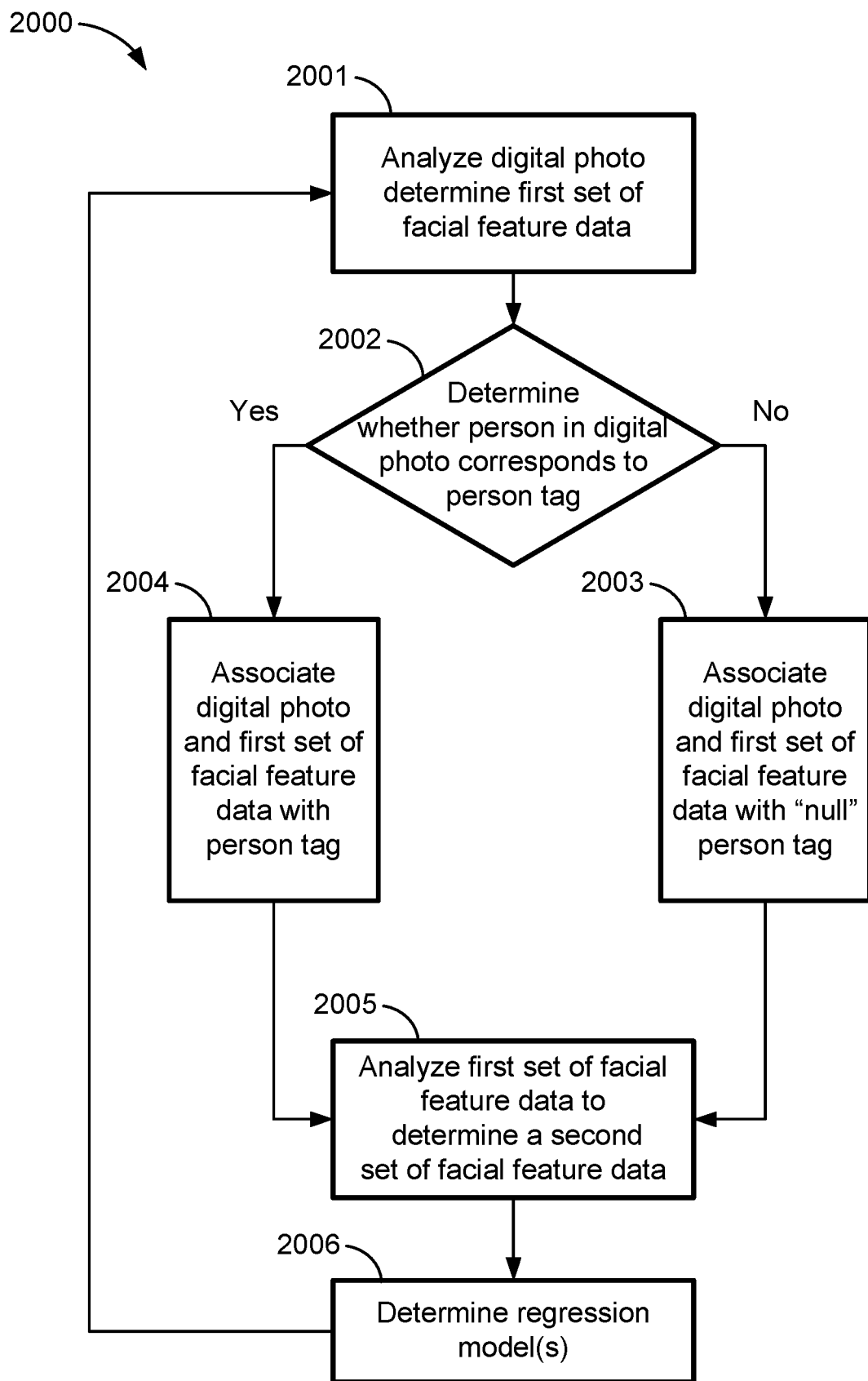
FIG. 12 is a process flow diagram for a method comparing one or more facial features of a first person to one or more corresponding facial features of one or more other persons according to some implementations of the present disclosure.

Referring to FIG. 12, a method 2000 for comparing one or more facial features of a first person to one or more corresponding facial features of one or more other persons is described. The method 2000 can be implemented, for example, using a system that is the same as, or similar to, the system 1 (FIG. 1) and/or the system 1000 (FIG. 4) described herein.

Step 2001 of the method 2000 includes analyzing a digital photograph to determine a first set of facial feature data for a face of a person in the digital photograph. More specifically, step 2001 includes analyzing a digital photograph to identify a face of a person, identify one or more facial features of the face of the person (e.g., nose, mouth, eyes, eye brows, jawline, ears, forehead, hairline, etc.), and identify one or more landmarks (e.g., coordinates) of the identified one or more facial features. The first set of facial feature data includes landmarks for each the of the identified facial features, a pose (e.g., a yaw angle, a pitch angle, and a roll angle, where 0 degrees for all three angles means that the face is looking directly at the camera) of the identified face, a confidence value indicative of a percentage likelihood that the identified face is an actual face, a face image quality (e.g., brightness, sharpness, etc.), or any combination thereof. In some implementations, the first set of facial feature data can further include facial condition information, where the facial condition information can be indicative of an open mouth, a closed mouth, an open eye, a closed eye, a squinted eye, the presence of eyewear (e.g., glasses or sunglasses), a smile, an emotion (e.g., happy, angry, calm, confused, sad, etc.), yawning, nostril flaring, the presence of facial hair (e.g., a beard, mustache, etc.) or any combination thereof.

Figure 13:
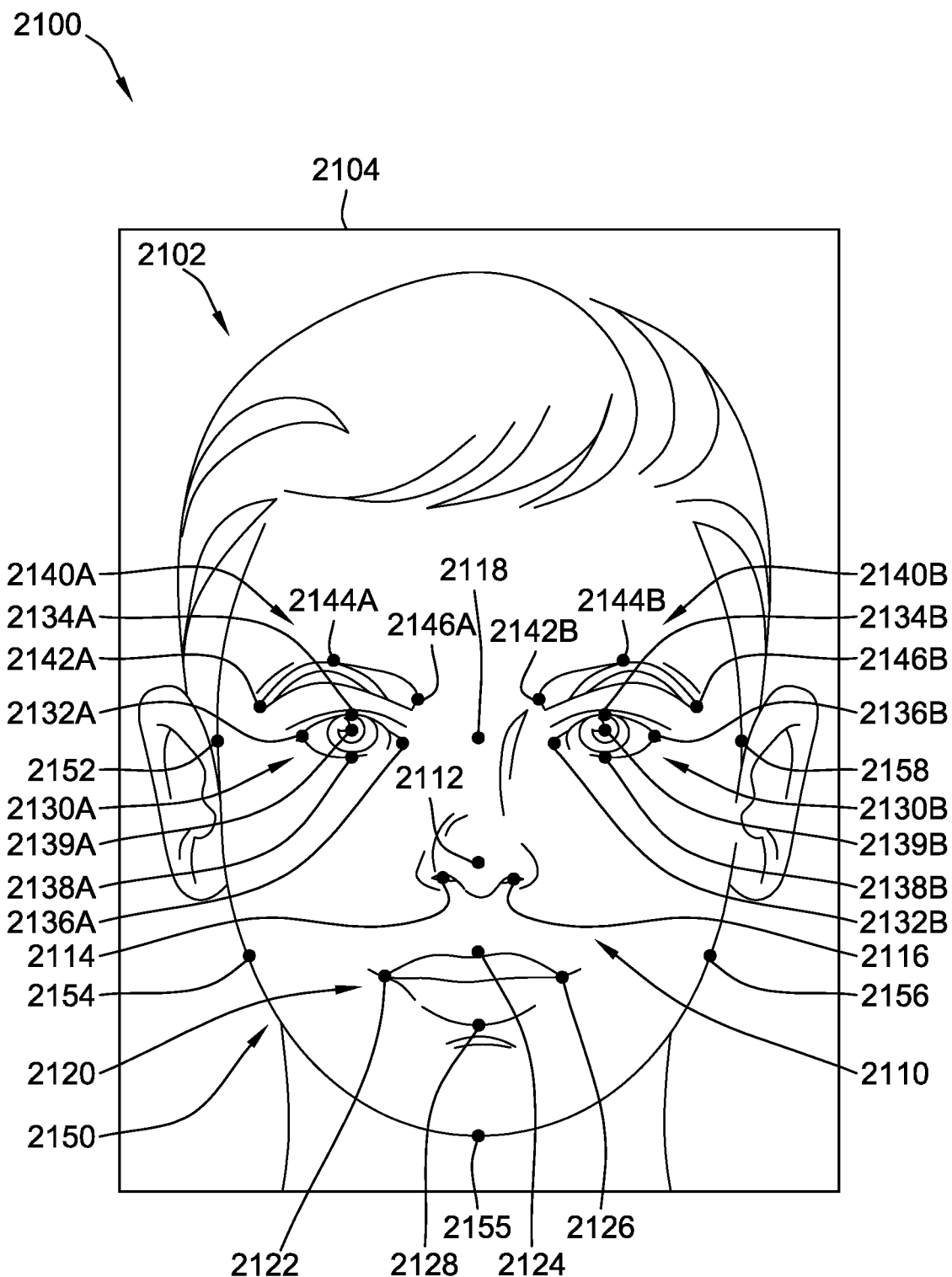
FIG. 13 illustrates landmarks for facial feature of a face of a first person in a digital photograph according to some implementations of the present disclosure.

Referring to FIG. 13, a first digital photograph 2100 of a first person is illustrated. Using first digital photograph 2100 of FIG. 13 as an example, during step 2001, the first digital photograph 2100 is analyzed to identify a face 2102 of a person. As shown, the location of the face 2102 within the first digital photograph 2100 is identified by a bounding box 2104. The bounding box 2104 is defined by a height expressed as a ratio of the overall height of the first digital photograph 2100 and a width expressed as a ratio of the overall width of the first digital photograph 2100. For example, if the digital photograph 2100 is 500 pixels by 500 pixels and the bounding box starts at 75 pixels from the left edge of the digital photograph and 75 pixels from the top edge of the digital photograph, the bounding box 2104 is located at coordinates 0.15, 0.15. If the bounding box 2104 is 100 pixels in width and 200 pixels in height, this means that the bounding box 2104 is 20% of the width of the digital photograph (i.e., 500 pixels/100 pixels) and the relative area of the bounding box 2104 is 40% of the height of the digital photograph (i.e., 500 pixels/200 pixels).

During step 2001, the face 2102 contained within the bounding box 2104 is analyzed to identify one or more facial features, including a nose 2110, a mouth 2120, a left eye 2130A, a right eye 2130B, a left eyebrow 2140A, a right eyebrow 2140B, and a jawline 2150. Each of the various landmarks described herein includes coordinates (e.g., x and y coordinates in terms of pixels) to define the position of the corresponding facial feature. That is, if a landmark is located 100 pixels from the left edge of the photograph (which is 500 pixels by 500 pixels) and 150 pixels from the top edge of the photograph, the x-coordinate for the landmark is 0.2 and the y-coordinate for the landmark is 0.3. The various landmarks for the various facial features described herein can be expressed in the same or similar manner (e.g., as a value between 0 and 1).

As shown, the relative position of the nose 2110 is defined by a nose tip landmark 2112, a left nostril landmark 2114, a right nostril landmark 2116, and a nose bridge landmark 2118. The nose tip landmark 2112 is located at approximately the tip of the nose (e.g., the forward-most protruding point of the nose 2110), the left nostril landmark 2114 is located at approximately the center of the left nostril, the right nostril landmark 2116 is located at approximately the center of the right nostril, and the nose bridge landmark 2118 is located at approximately the bridge of the nose 2110. The relative position of the mouth 2120 is defined by a left mouth landmark 2122, an upper mouth landmark 2124, a right mouth landmark 2126, and a lower mouth landmark 2128. As shown, the left mouth landmark 2122 and the right mouth landmark 2126 are located approximately at the corners of mouth 2120 where the upper and lower lips intersect. The upper mouth landmark 2124 and the lower mouth landmark 2128 are located approximately at the upper and lower edges of the upper and lower lips of the mouth 2120, respectively. The relative position of the left eye 2130A is defined by a left eye landmark 2132A, an upper eye landmark 2134A, a right eye landmark 2136A, a lower eye landmark 2138A, and a left pupil landmark 2139A. As shown, the left eye landmark 2132A and the right eye landmark 2136A are located approximately at the corners of the left eye 2130A where the upper and lower eyelids intersect, and the upper eye landmark 2134A and the lower eye landmark 2138A are located approximate at the upper and lower edges of the upper and lower eye lids of the left eye 2130A, respectively. The left pupil landmark 2139A is located approximately at the center of the left pupil of the left eye 2130A. The location of the right eye 2130B is defined by a left eye landmark 2132B, an upper eye landmark 2134B, a right eye landmark 2136B, a lower eye landmark 2138B, and a right pupil landmark 2139B that are the same as, or similar to, the corresponding landmarks for the left eye 2130A. The relative position of the left eyebrow 2140A is defined by a left eyebrow landmark 2142A, an upper eyebrow landmark 2144A, and a right eyebrow landmark 2146A. As shown, the left eyebrow landmark 2142A and the right eyebrow landmark 2146A are located approximately at the corners of the left eyebrow 2140A, and the upper eyebrow landmark 2144A is located approximate at the upper edge of the left eyebrow 2140A. The position of the right eyebrow 2140B is defined by a left eyebrow landmark 2142B, an upper eyebrow landmark 2144B, and a right eyebrow landmark 2146B. As shown, the left eyebrow landmark 2142B and the right eyebrow landmark 2146B are located approximately at the corners of the right eyebrow 2140B, and the upper eyebrow landmark 2144B is located approximate at the upper edge of the right eyebrow 2140B. The relative position of the jawline 2150 is defined by an upper left jawline landmark 2152, a lower left jawline landmark 2154, a chin landmark 2155, a lower right jawline landmark 2156, and an upper right jawline landmark 2158.

Referring back to FIG. 12, step 2002 of the method 2000 includes determining whether the face of the person in the digital photograph (identified during step 2001) corresponds to a person tag. As described herein, digital photographs can be associated with a person tag (e.g., manually or automatically) for a given person and stored in a photo repository. A person tag for a given person can be associated with one or more digital photographs of that person and facial feature data (that is the same as, or similar to, the first set of facial feature data obtained during step 2001) for that person. Thus, during step 2002, the first set of facial feature data obtained during step 2001 from the digital photograph is compared to facial feature data associated with various person tags to identify a match (e.g., exceeding a predetermined confidence interval). For example, as described in further detail herein, each person tag can be associated with a trained regression model. The first set of facial feature data can be inputted into trained regression models for each person tag to determine a match (e.g., if the output of a regression model is greater than 0.8, greater than 0.9, greater than 0.95, etc.)

If it is determined that the person in the first digital photograph does not correspond to a previously generated/assigned person tag during step 2002, the method 2000 proceeds to step 2003, which includes associating the digital photograph and the first set of facial features determined during step 2001 with a "null" person tag. The digital photograph, the first set of facial features, and the "null" person tag are then stored in the photo repository. This allows the digital photograph and the first set of facial feature data to be associated with a person tag in the future (e.g., a user can manually assign a new person tag to this digital photograph). If it is determined that the person in the first digital photograph corresponds to a previously generated/assigned person tag during step 2002, step 2004 of the method 2000 includes associating the digital photograph and the first set of facial features determined during step 2001 with the person tag identified during step 2002. The digital photograph, the first set of facial features, and the person tag are then stored in the photo repository.

Step 2005 of the method 2000 includes analyzing the first set of facial feature data (obtained during step 2001) to determine a second set of facial feature data. The second set of facial feature data can include, for example, one or more relative dimensions of one or more identified facial features of the person in the digital photograph. That is, the second set of facial feature data (step 2005) is calculated based at least in part on the first set of facial feature data (step 2001). As described in further detail herein, the second set of facial feature data determined during step 2005, along the with the first set of facial feature data determining during step 2001, are used to determine a regression model for each of the facial features. The second set of facial feature data obtained during step 2005 aids in generating a more accurate regression model than using the first set of facial feature data alone to generate a regression model.

Figure 14:
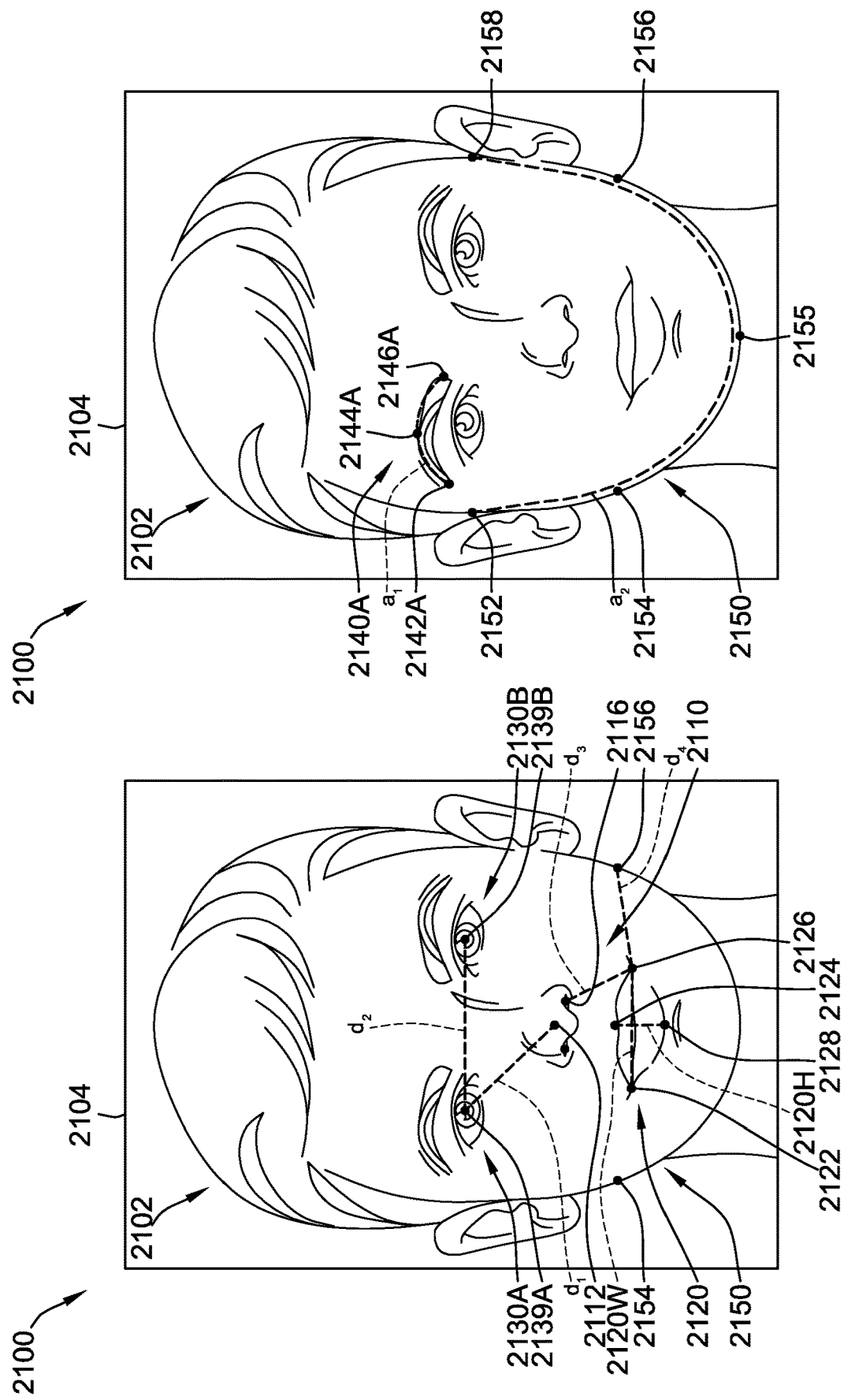
FIG. 14A illustrates relative distances between a plurality of facial features of the face of FIG. 13 according to some implementations of the present disclosure.
FIG. 14B illustrates arcs of a plurality of facial features of the face of FIG. 13 according to some implementations of the present disclosure.

Referring to FIGS. 14A and 14B, the second set of facial feature data can include one or more relative dimensions for one or more facial features. For example, the second set of facial feature data can include a height and/or a width of the nose 2110, the mouth 2120, the left eye 2130A, the right eye 2130B, the left eyebrow 2140A, the right eyebrow 2140B, the jawline 2150, or any combination thereof. The height and/or width of the facial features can be expressed relative to the total area of the face 2102 (e.g., relative to the area of the bounding box 2104) and/or the pose (e.g., pitch, roll, yaw) of the face 2102. For example, as shown in FIG. 14A, a width 2120W of the mouth 2120 can be obtained by determining the distance between the left mouth landmark 2122 and the right mouth landmark 2126. The width 2120W can be expressed as a portion of the overall width of the face 2102 (e.g., if the width 2120W is 100 pixels and the width of the bounding box 2104 is 1000 pixels, the width 2120W of the mouth 2120 can be expressed as 0.1). A height 2120H of the mouth 2120 can be obtained by determining the distance between the upper mouth landmark 2124 and the lower mouth landmark 2128. The height 2120H can be expressed in the same or similar manner as the width 2120W. Likewise, a height and/or a width of each of the nose 2110, the left eye 2130A, the right eye 2130B, the left eyebrow 2140A, the right eyebrow 2140B, the jawline 2150, or any combination thereof, can be determined in the same or similar manner as the width 2120W and/or the height 2120H of the mouth 2120.

As another example, the second set of facial feature data can include one or more relative dimensions between various facial features. For example, as shown in FIG. 14A, a first relative distance $d_1$ between the left eye 2130A and the nose 2110 can be obtained by determining a distance between the nose tip landmark 2112 and the left pupil landmark 2139A. Alternatively, the relative distance $d_1$ between the left eye 2130A and the nose 2110 can be obtained by determining a distance between any combination of the landmarks for the nose 2110 and the landmarks for the left eye 2130A (e.g., a distance between the left upper eye landmark 2134A and the left nostril landmark 2114 (FIG. 13), etc.) As another example, a second relative distance $d_2$ between the left eye 2130A and the right eye 2130B can be obtained by determining a distance between the left pupil landmark 2139A and the right pupil landmark 2139B. As yet another example, the second set of facial feature data can include a relative dimension between more than two facial features such a third relative distance $d_1$ between the nose 2110, the mouth 2120, and the jawline 2150, which can be obtained by determining a distance between the left nostril landmark 2114, the right mouth landmark 2126, and the lower right jawline landmark 2156. In this manner, relative distances can be calculated between any combination of facial features using any combination of the various landmarks for each of the facial features.

Referring to FIG. 14B, in some implementations, in addition to determining a height and/or width of individual facial features, the second set of facial feature data can include an arc that defines a facial feature. For example, a first arc $a_1$ for the left eyebrow 2140A can be determined by defining an arc through the right eyebrow landmark 2142A, the upper eyebrow landmark 2144A, and the left eyebrow landmark 2146A. Similarly, a second arc $a_2$ for the jawline 2150 can be determined by defining an arc through the upper left jawline landmark 2152, the lower left jawline landmark 2154, the chin landmark 2155, the lower right jawline landmark 2156, the upper right jawline landmark 2158, or any combination thereof. In this manner, various arcs can be determined for any combination of landmarks for any one of the facial features. In other implementations, the second set of facial feature data can include a shape (e.g., curved, straight, square, round, triangular, etc.), an area (e.g., expressed as a portion of the total area of the face 2102), a color (e.g., skin tone, eye color, etc.), of any one of the various facial features.

In some implementations, step 2005 of the method 2000 includes determining a bounding box for one or both of the eyes of the person. For example, the bounding box for the left eye 2130A (FIG. 13) can be determined based on the left eye landmark 2132A, the upper eye landmark 2134A, the right eye landmark 2136A, and the lower eye landmark 2138A. The bounding box for the right eye 2130B can be determined in the same or similar manner. Once the bounding box(es) are determined, the color of the eye(s) can be determined using a histogram processor that extracts the color palette from the bytes of the photograph within the bounding box to determine the color and/or calculate color variations. The determined color(s) can be used to determine whether the person has two different colored eyes (e.g., heterochromia) or multi-color irises (e.g., central heterochroma), which tend to be inherited from ancestors. Similarly, in such implementations, step 2005 can determine based on the pupil landmark 2139A for the left eye 2130A and the pupil landmark 2139B for the right eye 2130B whether the person has strabismus (lazy eye) or amblyopia (crossed eyes), which tend to be inherited from ancestors, based on a relative distance between the pupil landmark 2139A and the pupil landmark 2139B (e.g., which can be indicative of strabismus), or a relative distance between the pupil landmark 2139A or the pupil landmark 2139B the various other landmarks of the corresponding eye (e.g., which can be indicative of amblyopia).

Table 1 below includes exemplary calculations that can be included in the second set of facial feature data calculated during step 2005.

| | Distance | Color | Shape, arcs, angles |
|---|---|---|---|
| Eyes | Distance between eyes, size of eyeballs, size of first eye compared to second eye | Actual colors, differing eye colors | Longer, wider, eyelid coverage, shape of eye lids, deep set eye, mongoloid, hooded eyelids, protruding eyes, upturned eyes, close set eyes, wide set eyes, bug eyes, reset eyes, distance one eye is set back from the other |
| Nose | Nostrils size, bridge size, distances from points of nose to other parts (e.g., eyes, mouth), crookedness to one side or another | | Shape of nostrils, shape of nose bridge, side view shape, bump in nose (side/profile view) bridge, fleshy nose, nose types (e.g., turned-up nose, Roman nose, bumpy nose, snub nose, hawk nose, Greek nose, nubian nose) |
| Mouth | Overall height of top and bottom lips, width | Lip color | Naturally full lips, thin top and bottom lips, lips that are plumper in the center, lips with a peaked cupid's bow, lips with a rounded cupid's bow, lips with an undefined cupid's bow, Goldilocks lips |
| Chin/Jaw | Width, height | | Short, long, double, rounded, fleshy, protruding, jutting, pointed, square, receding, dimpled |
| Ears | One ear higher than another, one ear bigger than another | | Side view shape of ears, differences in ear curvature, ears "sticking out" (prominent ear), cupped ear (cryptotia), small, stub-like ear (microtia), an absence of any ear at all (anotia), Stahl's ear (where the top part of the ear has an extra crus, which is a fold in the ear that causes the top portion of the ear to appear pointy), prominent ear happens (when there a fold missing at the edge of the ear in addition to an over-abundance at the bowl of the ear). |
| Eyebrow | Length of eyebrows, one bigger than another, one thicker than another, one higher/lower than another | Eyebrow color | Structured brow with angled arches and longer ends for round face, well-balanced and contoured brows for oval face, soft, rounded arch for heart shaped face, brows with angled peak for square face, shorter brows for oblong face, linear brow shape for diamond-shaped face |
| Forehead | Size on the divisions of the forehead for upper section, middle section, lower section. | | Divisions of the forehead for upper section, middle section, lower section (brow ridge), broad vs. narrow, curved, sloped, lines on forehead |
| Face | Facial points to aid in determining overall height or width | Face color | Oval, square, heart shape, round, rectangular, triangle |
| Hairline | | | High and broad, low and narrow, straight and square, rounded hairline, M-shaped hairline, widow's peak hairline, uneven or zigzag hairline, receding, bald |

Step 2006 of the method 2000 includes determining a regression model for each of the facial features based on the first set of facial feature data (step 2001) and the second set of facial feature data (step 2005). More specifically, during step 2006, a regression model is generated for each of the facial features (e.g., nose, mouth, eyes, jawline, etc.) based on a portion of the first set of facial feature data and a portion of the second set of facial feature data associated with that facial feature. The regression model includes a plurality of independent variables, where data points from the first set of facial feature data and data points from the second set of facial feature data are the independent variables. The regression model can be a logistic regression, a deep learning regression, a neural network regression, or any combination thereof.

As shown by the arrow in FIG. 12, steps 2001-2006 can be repeated one or more times to train each regression model. That is, steps 2001-2005 can be repeated for a second photograph of the same person to update the regression model. The more times that the steps of the method 2000 are repeated, the more accurate the resulting regression model in step 2006 will be. In the case of a neural network regression, there are a plurality of inputs that define a net input function, where each of the plurality of inputs are weighted (e.g., with a value between −1 and 1). Repeating the method 2000 for a series of photographs of the person updates the weights of the plurality of inputs so as to increase the accuracy of the regression model. For example, if it is determined that there is a small variance between a certain data point (e.g., a relative distance between facial features) in the first or second set of facial feature data between a series of photographs of the person, that input will be accorded a greater weight in the neural network model. Conversely, if it is determined that there is a large variance between a certain data point in the first or second set of facial feature data between a series of photographs of the person, that input will be accorded a lesser weight in the neural network model. In this manner, the regression model can be trained to minimize errors.

In addition to determining a regression model for each of the individual facial features, step 2006 also includes determining a regression model for a person feature. As used herein, a person feature refers to a combination of a plurality of facial features (e.g., two or more of the nose, the mouth, the left eye, the right eye, the left eyebrow, the right eyebrow, the jawline, etc.). That is, the person feature is an aggregate of all or some of the regression models of the facial features together into a single value indicative of the overall appearance/likeness of the face of the person. For example, the regression model for the person feature can be an average of the outputs all of the regression models for each of the individual facial features. Alternatively, the regression model for the person feature can be a weighted average of all or some of the regression models for the individual facial features (e.g., each regression for each individual facial feature is assigned a weight between 0.1% and 99.9%).

Figure 15:
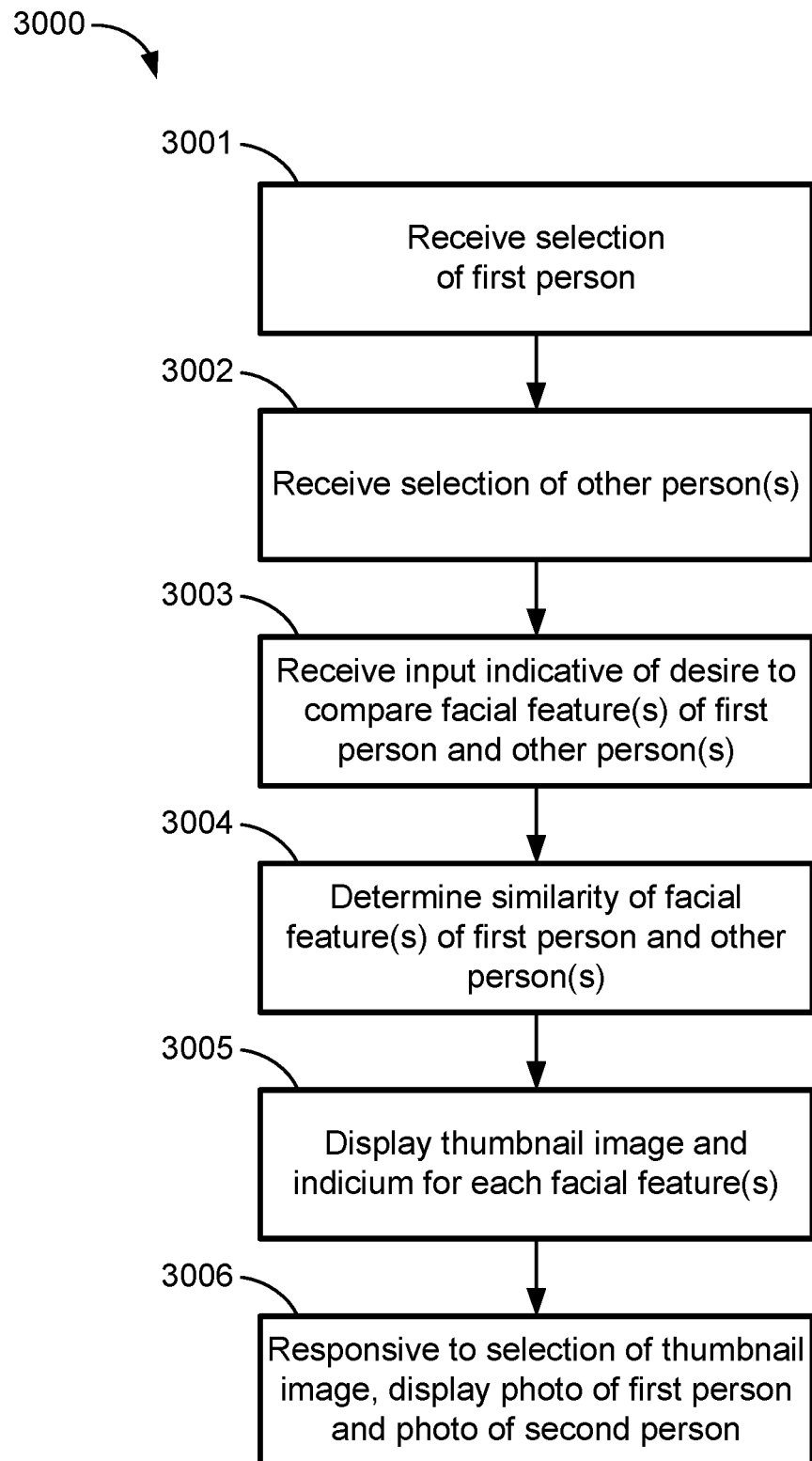
FIG. 15 is a process flow diagram for a method for comparing facial features of one or more persons and displaying the results according to some implementations of the present disclosure.

Referring to FIG. 15, a method 3000 for comparing facial features of one or more persons and displaying the results is described. The method 3000 can be implemented, for example, using a system that is the same as, or similar to, the system 1 (FIG. 1) and/or the system 1000 (FIG. 4) described herein.

Step 3001 of the method 3000 includes receiving (e.g., via a user input device) a selection of a first person whose facial feature(s) are to be compared to those of at least one other person. As described herein, a photo repository can include a library containing photographs and associated information for a plurality of people (e.g., 10 people, 100 people, 1,000 people, 10,000 people, etc.) Step 3001 includes selecting a first one of these people stored in the library that will then be compared to at least one different person stored in the library.

Figure 16:
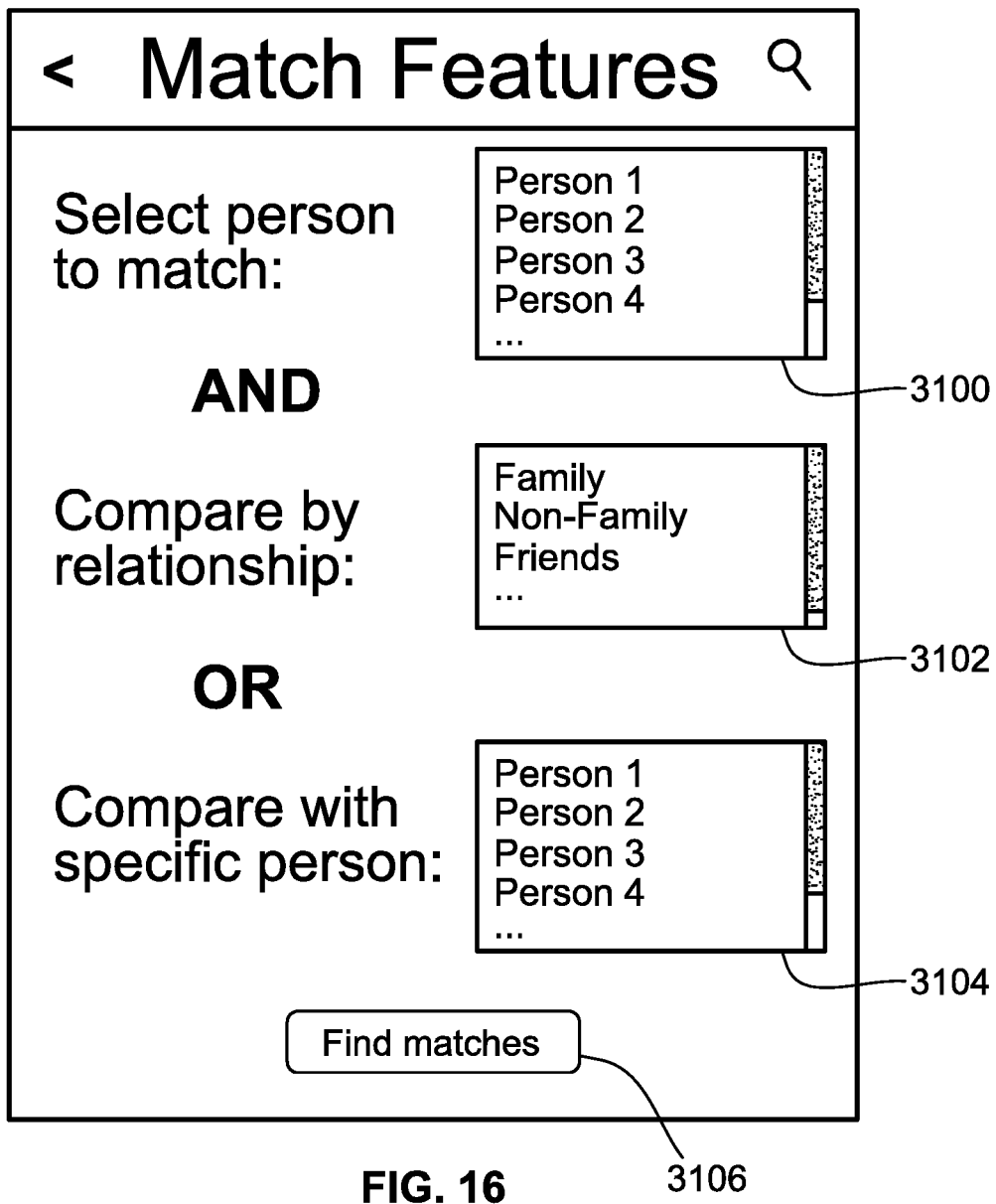
FIG. 16 illustrates a plurality of selection elements displayed on a video display device according to some implementations of the present disclosure.

Referring to FIG. 16, a first selection element 3100 is displayed on a video display device (e.g., that is the same as or similar to the video display device 1110 described herein). The first selection element 3100 permits the system to receive a selection of the first person during step 3001. In this example, the first selection element 3100 is a dropdown menu configured to allow a user to select (e.g., by clicking or tapping) a first person, a second person, a third person, or a fourth person whose facial feature(s) will be compared to those of at least one other person during subsequent steps of the method 3000.

Step 3002 includes receiving a selection of at least one other person to be compared to the first person selected during step 3001. Referring to FIG. 16, a second selection element 3102 and a third selection element 3104 are displayed on the video display device. The second selection element 3102 permits the system to receive a selection of a plurality of persons to be compared to the first person, where each of the plurality of persons have been previously associated with the first person by a relationship. That is, the second selection element 3102 permits a user to select a plurality of persons based on their relationship to the first person, rather than having to individually select each of the plurality of persons (e.g., in a dropdown menu). The relationship can be, for example, a family relationship, a non-family relationship, or friend relationship, or any other relationship that can be customized by the user. In this example, the second selection element 3102 is a dropdown menu in which a user can select (e.g., by clicking or tapping) a family relationship (e.g., immediate family, extended family, etc.), a non-family relationship, or a friend relationship. The third selection element 3104 is similar to the first selection element 3100 in that it permits the system to receive a selection of a second person to be compared to the first person selected during step 3001 via the first selection element 3100. That is, the third selection element 3104 allows a user to selection a single person to be compared to the first person selected during step 3001. Alternatively, in some implementations, the third selection element 3104 can allow a user to select a plurality of individual persons (e.g., two, three, five, etc.) to be compared to the first person, rather than an entire group of persons (e.g., as would be the case when using the second selection element 3102).

Step 3003 (FIG. 15) of the method 3000 includes receiving an input from a user indicative of a desire to compare one or more facial features of the first person (step 3001) and the other person(s) (step 3002). Referring to FIG. 16, a matching element 3106 is displayed on the video display device along with the first selection element 3100, the second selection element 3102, and the third selection element 3104. In this example, the user can indicate a desire to match the selected first person (step 3001) and the selected other person(s) (step 3002) by selecting (e.g., by clicking or tapping) the displayed matching element 3106.

Step 3004 (FIG. 15) of the method 3000 includes determining and quantifying the similarity of facial features of the first person (step 3001) and the other person(s) (step 3002). For example, the similarity of facial features of the first person and other person(s) can be determined using the method 2000 (FIG. 12) described herein. As an example, during step 3004, it can be determined that a person feature of the first person is 17% similar to a second person, 11% similar to a third person, and 4% similar to a fourth person; a nose feature of the first person is 54% similar to the third person, 11% similar to the second person, and 7% similar to the fourth person; and an eye feature of the first person is 86% similar to a fifth person, 24% similar to the third person, and 7% similar to the second person.

Figure 18:
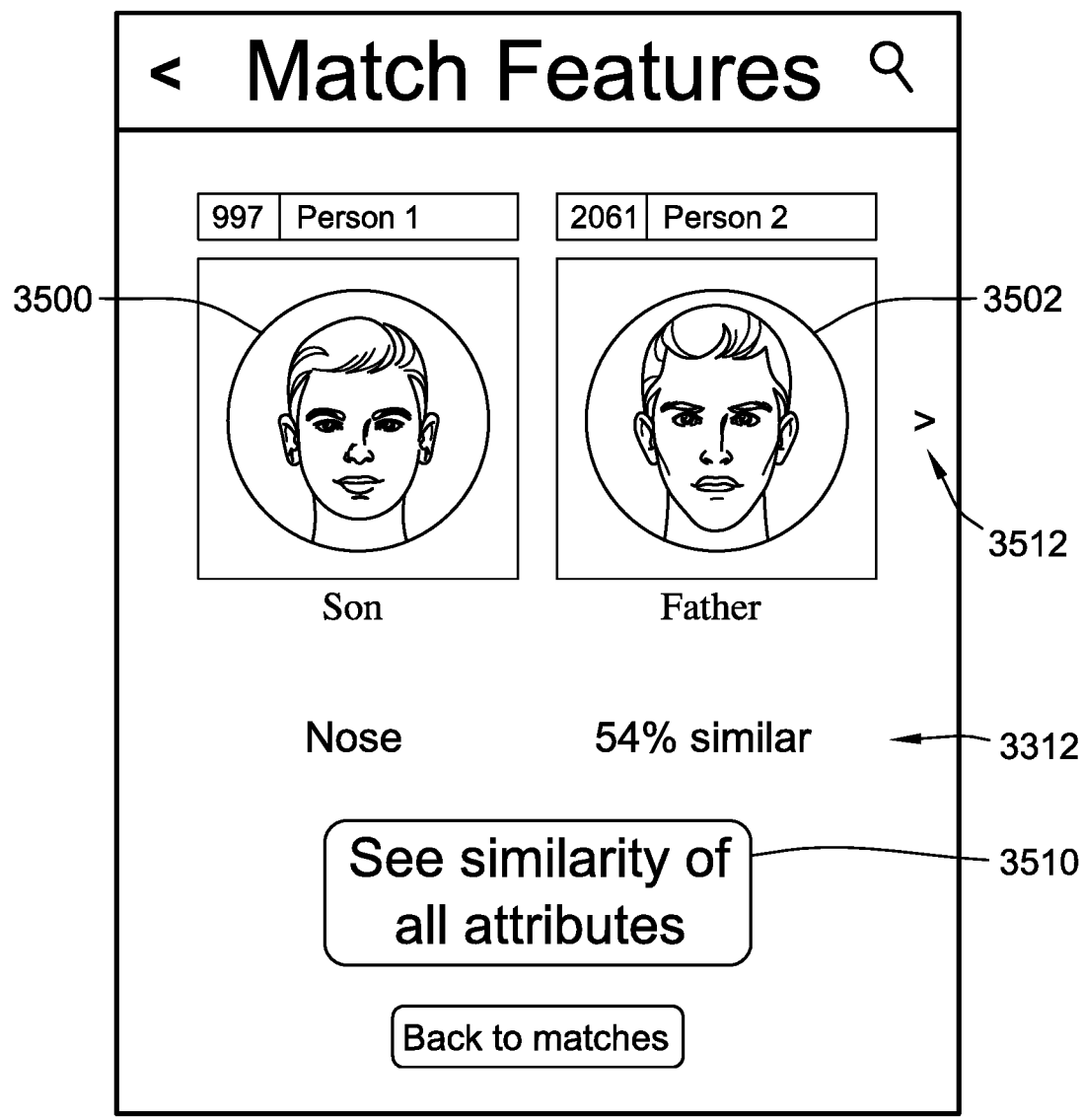
FIG. 18 illustrates a photographs of a plurality of matched persons and an indicium indicative of the similarity of a feature between those matched persons according to some implementations of the present disclosure.

Step 3005 (FIG. 15) of the method 3000 includes displaying the results of step 3004, and more specifically, displaying a thumbnail image and an indicium for a plurality of facial features. Referring to FIG. 18, using the example above, person feature results 3200, nose feature results 3300, and eye feature results 3400 are displayed on the video display device. The person feature results 3200 include a first thumbnail image 3202, a second thumbnail image 3204, a third thumbnail image 3206, a first indicium 3212, a second indicium 3214, and a third indicium 3216. As described above, in this example, it was determined during step 3004 that the person feature of the first person is 17% similar to a second person, 11% similar to a third person, and 4% similar to a fourth person. The first thumbnail image 3202 includes a portion of a photograph of the second person (e.g., the face of the second person) and the first indicium 3212 includes alphanumeric text indicative of the percentage similarity (in this example, 17%). Similarly, second thumbnail image 3204 includes a portion of a photograph of the third person (e.g., the face of the third person) and the second indicium 3214 includes alphanumeric text indicative of the percentage similarity (11%), and the third thumbnail image 3206 includes a portion of a photograph of the fourth person (e.g., the face of the fourth person) and the third indicium 3216 includes alphanumeric text indicative of the percentage similarity (4%). As shown, the thumbnail images and indicia are displayed left to right in a predetermined sequence according to the percentage similarity.

As described above, in this example, it was determined during step 3004 that the nose feature of the first person is 54% similar to the third person, 11% similar to the second person, and 7% similar to the fourth person. Thus, within the nose feature results 3300, the first thumbnail image 3302 includes a portion of a photograph of the third person (e.g., the face of the third person) and the first indicium 3312 includes alphanumeric text indicative of the percentage similarity (54%). Similarly, second thumbnail image 3304 includes a portion of a photograph of the second person (e.g., the face of the second person) and the second indicium 3314 includes alphanumeric text indicative of the percentage similarity (11%), and the third thumbnail image 3306 includes a portion of a photograph of the fourth person (e.g., the face of the fourth person) and the third indicium 3316 includes alphanumeric text indicative of the percentage similarity (7%). It was also determined during step 3004 in this example that the eye feature of the first person is 86% similar to a fifth person, 24% similar to the third person, and 7% similar to the second person. Thus, within the eye feature results 3400, the first thumbnail image 3402 includes a portion of a photograph of the fifth person (e.g., the face of the fifth person) and the first indicium 3412 includes alphanumeric text indicative of the percentage similarity (86%). Similarly, the second thumbnail image 3404 includes a portion of a photograph of the third person (e.g., the face of the third person) and the second indicium 3414 includes alphanumeric text indicative of the percentage similarity (24%), and the third thumbnail image 3406 includes a portion of a photograph of the second person (e.g., the face of the second person) and the third indicium 3416 includes alphanumeric text indicative of the percentage similarity (7%).

Figure 17:
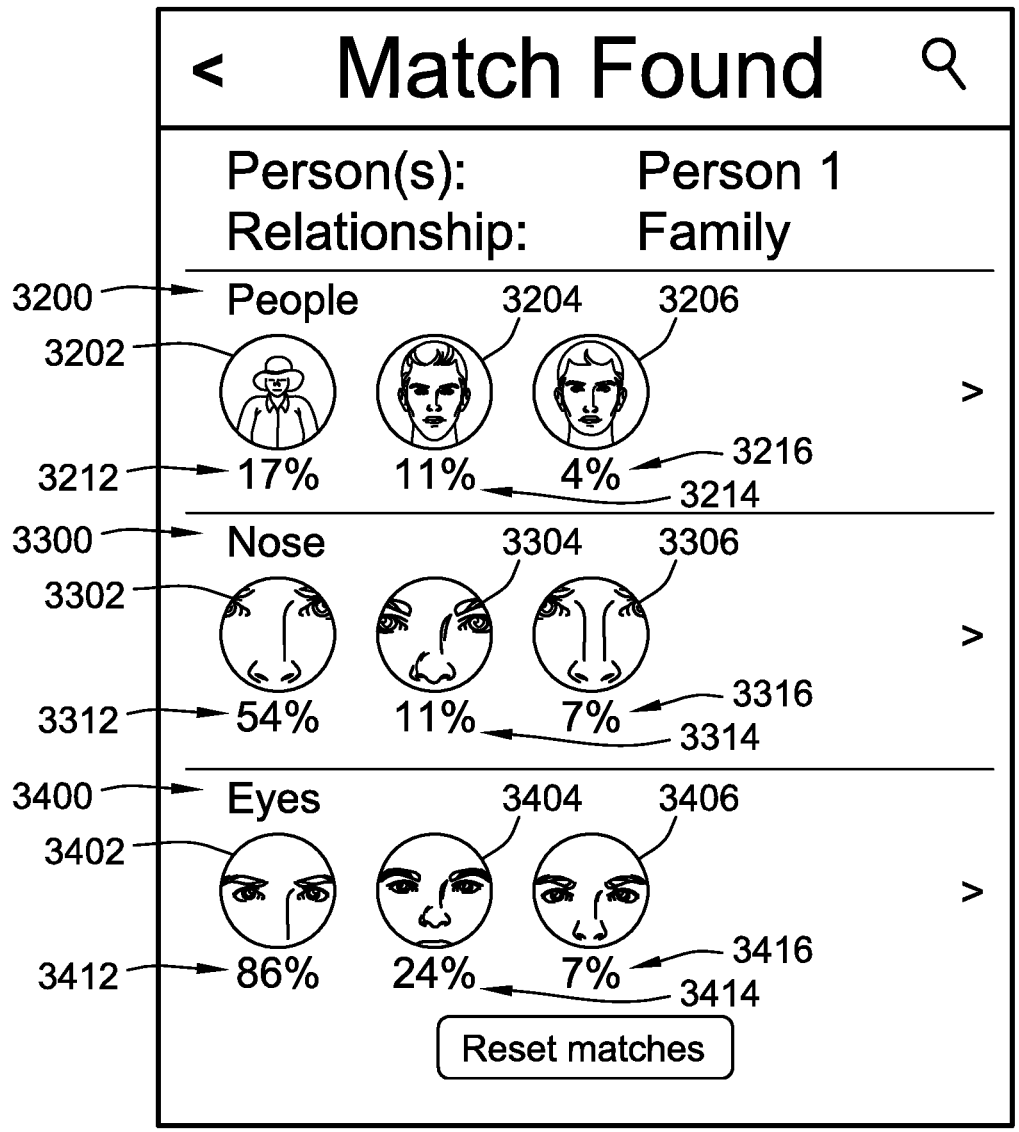
FIG. 17 illustrates people feature results, nose feature results, and eye features results displayed on a video display device according to some implementations of the present disclosure.

While only three results are shown in each of the person feature results 3200, the nose feature results 3300, and the eye feature results 3400 in the example of FIG. 17, more generally, the person feature results 3200, the nose feature results 3300, and the eye feature results 3400 can include any suitable number of results. For example, in some implementations, the person feature results 3200, the nose feature results 3300, and the eye feature results 3400 only display results if the output of the regression model is greater than a predetermined threshold (e.g., greater than 0.05, greater than 0.1, greater than 0.3, greater than 0.5, greater than 0.8, etc.) Alternatively, the person feature results 3200, the nose feature results 3300, and the eye feature results 3400 can be configured to display a predetermined number of the closest matches (e.g., the two most similar people for each feature, the four most similar people for each feature, etc.) Further, any combination of feature results can be displayed in addition to, or in the alternative of, the person feature results 3200, the nose feature results 3300, and the eye feature results 3400 (e.g., eyebrow feature results, jawline feature results, mouth feature results, etc.)

Figure 19:
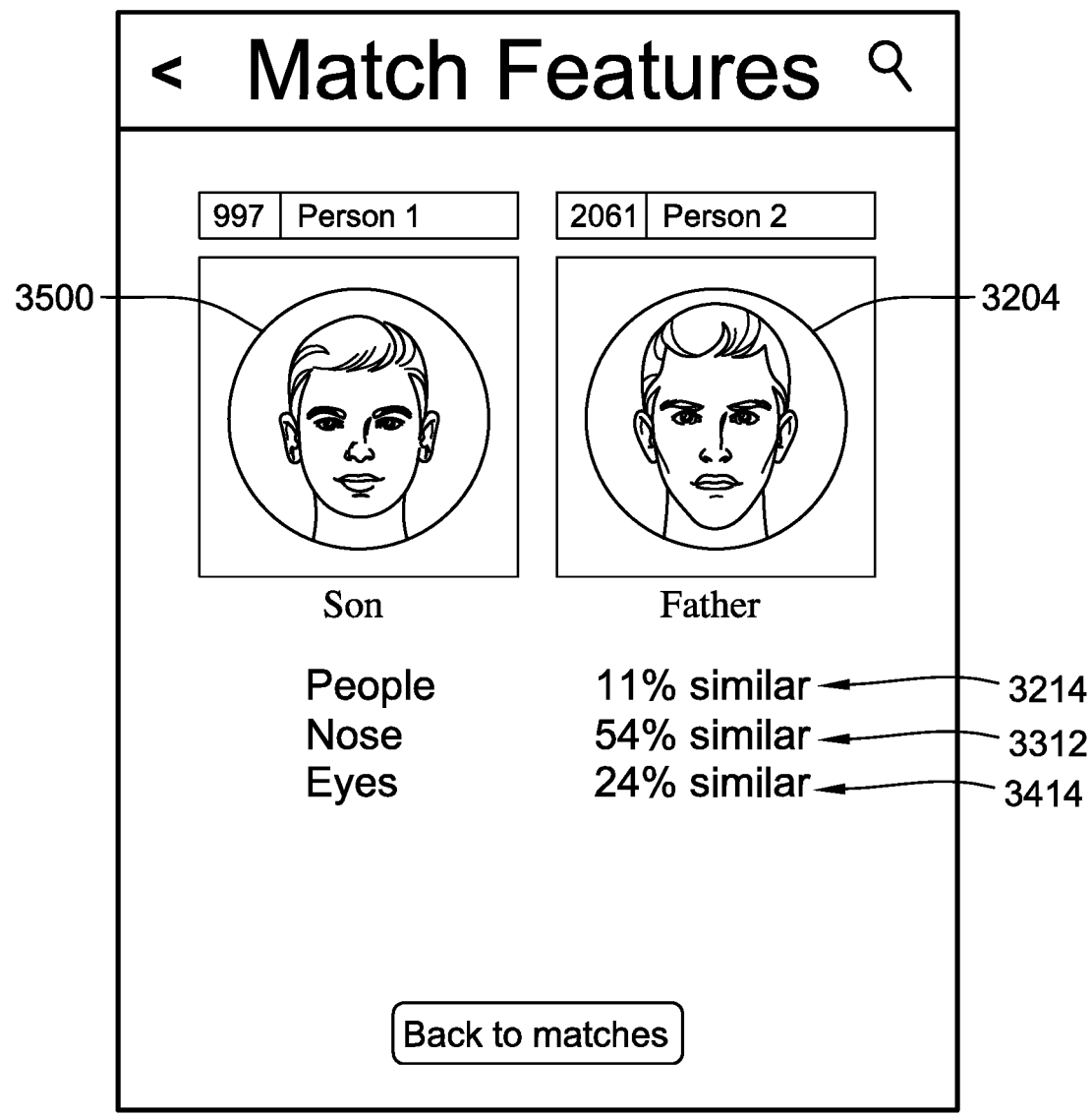
FIG. 19 illustrates indicia indicative of the similarity of a plurality of features between two people according to some implementations of the present disclosure.

Referring back to FIG. 15, step 3005 of the method 3000 includes displaying a photo of the first person and a photograph of another person responsive to receiving a selection of a thumbnail image. Each of the various thumbnail images displayed on the video display device in FIG. 17 are user-selectable (e.g., by clicking or tapping). Responsive to a selection of the first thumbnail image 3302 (FIG. 17), for example, a photograph of the first person 3500, a photograph of the third person 3502, and the first indicium 3312 are displayed on the video display device, as shown in FIG. 18. The photograph of the first person 3500 and the photograph of the third person 3502 each include a face of the first person and the third person, respectively. A first user-selectable navigation element 3510 and a second user-selectable navigation element 3512 are also displayed on the video display device. Selecting the first user-selectable navigation element 3510 causes all of the indicia associated with the third person displayed in FIG. 17 to be displayed simultaneously on the display with the photograph of the first person 3500 and the photograph of the third person 3502, as shown in FIG. 19. This allows a user to view all of the determined similarities between the first person and the third person. Selecting the second user-selectable navigation element 3512 the next result in the nose feature results 3300 (FIG. 17) to be displayed in the same or similar manner as if the user had selected the third thumbnail image 3306. This allows a user to navigation between each of the people within the results for a particular feature.

In some implementations, the method 3000 includes importing a plurality of digital photographs from an external system (e.g., a website or database), where each of the plurality of digital photographs have been previously linked or associated together by a predetermined relationship, such as, for example, a familial relationship. The photographs can be linked or associated by the predetermined relationship using, for example, user inputs (e.g., a user inputs a family tree including people that are related) or DNA testing results (e.g., each of the people in the photos have submitted a DNA sample for analysis and the people are linked together based on the results). After these digital photographs are imported, they may be selected during step 3002 (e.g., using the second selection element 3102 of FIG. 16) and the method 3000 proceeds as described herein to compare those people with the selected first person.

In other implementations, an alternative method that is similar to the method 3000 includes receiving a selection of a first person (e.g., in the same or similar manner as step 3001). The alternative method differs from method 3000 in that the alternative method includes importing a digital photograph of the selected first person from an external system (e.g., uploading the photograph to a website). For example, the photograph of the selected first person can be uploaded to a website (e.g., an ancestry website such as ancestry.com, My Heritage, FamilySearch, etc.) and then compared to photographs of one or more other persons in the same or similar manner as method 3000. For example, a previously trained regression model(s) for facial feature(s) of the first person can be imported from the external system along with the first digital photograph. Alternatively, a series of photographs of the first person can be imported from the external and a regression model can be trained subsequent to the importing in the same or similar manner as described herein. Facial feature data for a plurality of other persons having a predetermined relationship (e.g., familial) with the first person are then passed through a regression model for each facial feature of the first person to determine the similarity between the first person and each of those people.

Alternative Implementations

Alternative Implementation 1.

A computer-implemented method for organizing digital videos, each of the digital videos having content data and metadata, the content data being reproducible as an initial video frame, a final video frame, and a plurality of video frames therebetween includes analyzing the content data of a first digital video to associate at least a first portion of a first one of the plurality of video frames of the first digital video with a first automatically-generated content tag, the first video frame of the first digital video being associated with a first time $t_1$ of the first digital video; automatically generating a first thumbnail image associated with the first digital video, the first thumbnail image including at least a second portion of the first video frame of the first digital video; displaying, on a video display device, the first thumbnail image associated with the first digital video; and responsive to receiving a selection of the first thumbnail image associated with the first digital video via a user interface, causing the first digital video to be played on the video display device starting at the first time $t_1$.

Alternative Implementation 2.

The method according to alternative implementation 1, further comprising analyzing the metadata of the first digital video to associate the first digital video with an automatically-generated location tag and an automatically-generated date tag, the metadata including (i) location data associated with a geographic location where the first digital video was generated and (ii) date and time data associated with the date and time when the first digital video was generated.

Alternative Implementation 3.

The method according to alternative implementation 1, further comprising automatically generating a second thumbnail image associated with the first digital video, the second thumbnail image including at least a portion of the initial video frame associated with an initial time $t_0$ of the first digital video; displaying, on the video display device, the second thumbnail image associated with the first digital video; and responsive to receiving a selection of the second thumbnail image via the user interface of the video display device, causing the first digital video to be played on the video display device starting at the initial time $t_0$ of the first digital video.

Alternative Implementation 4.

The method according to alternative implementation 1, wherein the first automatically-generated content tag is a person tag or an object tag.

Alternative Implementation 5.

The method according to alternative implementation 1, wherein the analyzing the content data includes detecting a face of a person in the first video frame of the first digital video, comparing the detected face of the person to a facial recognition database to identify a name of the person, and wherein the first automatically-generated content tag is a person tag associated with the identified name of the person.

Alternative Implementation 6.

The method according to alternative implementation 1, further comprising analyzing the content data of a second digital video to associate at least a first portion of a first one of the plurality of video frames of the second digital video with a second automatically-generated content tag, the first video frame of the second digital video being associated with a first time $t_1$ of the second digital video; automatically generating a second thumbnail image associated with the second digital video, the second-video thumbnail image including at least a second portion of the second video frame; displaying, on the video display device, the second thumbnail image associated with the second digital video; and responsive to receiving a selection of the second thumbnail image associated with the second digital video via the user interface of the video display device, playing the second digital video on the video display device starting at the first time $t_1$ of the second digital video.

Alternative Implementation 7.

The method according to alternative implementation 6, wherein the first automatically-generated content tag associated with the first video frame of the first digital video is different than the second automatically-generated content tag associated with the first video frame of the second digital video.

Alternative Implementation 8.

The method according to alternative implementation 7, wherein responsive to a selection of the first automatically-generated content tag, causing the first thumbnail image associated with the first digital video to be displayed on the video display device and causing the second thumbnail image associated with the second digital video not to be displayed on the video display device.

Alternative Implementation 9.

The method according to alternative implementation 1, wherein the analyzing the content data of the first digital video includes associating at least a first portion of a second one of the plurality of video frames of the first digital video with the first automatically-generated content tag, the second video frame of the first digital video being associated with a second time $t_2$ of the first digital video that is subsequent to the first time $t_1$ of the first digital video, and responsive to receiving a selection of the first thumbnail image via the user interface of the video display device, playing a clip of first digital video defined by the first time $t_1$ and the second time $t_2$ on the video display device.

Alternative Implementation 10.

The method according to alternative implementation 1, further comprising analyzing the content data of the first digital video to associate at least a first portion of a second one of the plurality of video frames with a second automatically-generated content tag, the second video frame of the first digital video being associated with a second time $t_2$ of the first digital video that is different than the first time $t_1$ of the first digital video; automatically generating a second thumbnail image associated with the first digital video, the second thumbnail image including at least a second portion of the second video frame of the first digital video; displaying, on the video display device, the second thumbnail image associated with the first digital video; and responsive to receiving a selection of the second thumbnail image via a user interface, causing the first digital video to be played on the video display device starting at the second time $t_2$.

Alternative Implementation 11.

The method according to alternative implementation 1, wherein the first portion of the first video frame of the first digital video that is associated with the first automatically-generated content tag is the same as the second portion of the first video frame of the first digital video included in the first thumbnail image.

Alternative Implementation 12.

The method according to alternative implementation 1, wherein the first portion the first portion of the first video frame of the first digital video that is associated with the first automatically-generated content tag is different than the second portion of the first video frame of the first digital video included in the first thumbnail image.

Alternative Implementation 13.

A computer-implemented method for organizing digital videos, the digital videos having content data and metadata, the content data including an initial video frame, a final video frame, and a plurality of video frames therebetween includes: while a first digital video is playing on a video display device, causing the first digital video to be paused at a first time $t_1$ such that a first one of the plurality of video frames of the first digital video is displayed; receiving, via a user interface, a user-generated content tag; associating the user-generated content tag with the first video frame of the first digital video; generating a first thumbnail image associated with the first digital video, the first thumbnail image including at least a portion of the first video frame of the first digital video; displaying, on the video display device, the first thumbnail image that is associated with the first digital video; and responsive to receiving a selection of the first thumbnail image, causing the first digital video to be played on the video display device starting at the first time $t_1$.

Alternative Implementation 14.

The method according to alternative implementation 13, wherein the user-generated tag is a person tag, an object tag, an event tag, a location tag, or a date tag.

Alternative Implementation 15.

The method according to alternative implementation 14, wherein the user-generated tag is the event tag, the event tag being indicative of a milestone, a holiday, a vacation, a sporting event, a performance event, or any combination thereof Alternative Implementation 16.

The method according to alternative implementation 13, wherein the generating the first thumbnail image includes receiving, via the user interface, a selection of a region of interest within the first video frame of the first digital video, and the portion of the first video frame included in the first thumbnail image is the selected region of interest.

Alternative Implementation 17.

The method according to alternative implementation 16, wherein the selected region of interest of the first video frame includes at least a face of a person in the first video frame of the first digital video.

Alternative Implementation 18.

The method according to alternative implementation 13, wherein the metadata of the first digital video includes location data indicative of a geographic location where the first digital video was generated, the user-generated content tag is a user-generated location tag, and wherein the associating includes associating the user-generated location tag with the location data indicative of where the first digital video was generated.

Alternative Implementation 19.

The method according to alternative implementation 18, further comprising comparing location data indicative of a geographic location where a second digital video was generated to the location data indicative of the geographic location where the first digital video was generated; and responsive to determining that the geographic location where the second digital video was generated is the same as the geographic location where the first digital video was generated, automatically associating the user-generated location tag with the second digital video.

Alternative Implementation 20.

The method according to alternative implementation 13, further comprising: subsequent to receiving the user-generated content tag, causing the first digital video to resume playing on the video display device; responsive to an input received via the user interface, causing the first digital video to be paused at a second time $t_2$ such that a second one of the plurality of video frames of the first digital video is displayed; receiving, via the user interface, a second user-generated content tag; associating the second video frame of the first digital video with the second user-generated content tag; generating a second thumbnail image associated with the first digital video, the second thumbnail image including at least a portion of the second video frame of the first digital video; displaying the second thumbnail image on the video display device; and responsive to receiving a selection of the second thumbnail image of the first digital video via the user interface, causing the first digital video to be played on the video display device starting at the second time $t_2$.

Alternative Implementation 21.

The method according to alternative implementation 20, wherein responsive to a selection of the second user-generated content tag via the user interface, the second thumbnail image associated with the first digital video is displayed on the video display device and the first thumbnail image associated with the first digital video is not displayed on the video display device.

Alternative Implementation 22.

The method according to alternative implementation 20, wherein (i) the first user-generated content tag is a first date tag and the second user-generated content tag is a second date tag, wherein the first date tag is associated with a first date that is different than a second date that is associated with the second date tag or (ii) the first user-generated content tag is a first location tag and the second user-generated content tag is a second location tag, wherein the first location tag is associated with a first location that is different than a second location that is associated with the second location tag.

Alternative Implementation 23.

The method according to alternative implementation 13, wherein the receiving includes receiving a selection of a face of a person within the first video frame, and the user-generated tag is a person tag associated with the person.

Alternative Implementation 24.

The method according to alternative implementation 23, further comprising: analyzing the content data of a second digital video to identify the face of the person one of the video frames of the second digital video; responsive to identifying the face of the person in one of the video frames of the second digital video, automatically associating the one of the video frames including the face of the person with the person tag; generating a second thumbnail image associated with the second digital video, the second thumbnail image including at least the face of the person in the one of the video frames; and responsive to a selection of the second thumbnail image associated with the second digital video, causing the second digital video to be played on the video display device starting at the one of the video frames including the face of the person.

Alternative Implementation 25.

The method according to alternative implementation 13, further comprising: generating a second thumbnail image associated with the first digital video, the second thumbnail image including at least a first portion of the initial video frame of the first digital video, the initial video frame being associated with an initial time $t_0$ of the first digital video; displaying the second thumbnail image associated with the first digital video on the video display device; and responsive to receiving a selection of the second thumbnail image via the user interface, causing the first digital video to be played on the video display device starting the initial time $t_0$.

Alternative Implementation 26.

The method according to alternative implementation 13, wherein the first digital video is paused at the first time $t_1$ responsive to an input received via a user interface.

Alternative Implementation 27.

The method according to alternative implementation 13, wherein the first time $t_1$ associated with the first video frame of the first digital video is subsequent to an initial time $t_0$ associated with the initial video frame of the first digital video.

Alternative Implementation 28.

A computer-implemented method for organizing a plurality of digital videos, each of the plurality of digital videos having content data and metadata, the content data including a plurality of video frames, the method comprising: analyzing the content data of a first one of the plurality of digital videos to associate at least a first portion of a first one of the plurality of video frames of the first digital video with a first automatically-generated content tag, the first video frame of the first digital video being associated with a first time $t_1$ of the first digital video; automatically generating a first thumbnail image associated with the first digital video, the first thumbnail image including at least a second portion of the first video frame of the first digital video; analyzing the content data of a second one of the plurality of digital videos to associate at least a first portion of a first one of the plurality of video frames of the second digital video with a second automatically-generated content tag, the first video frame of the second digital video being associated with a first time $t_1$ of the second digital video; automatically generating a second thumbnail image associated with the second digital video, the second thumbnail image including at least a second portion of the first video frame of the second digital video; displaying the first thumbnail image associated with the first digital video, the second thumbnail image associated with the second digital video, or both, on the video display device; responsive to a selection of the first thumbnail image associated with the first digital video, causing the first digital video to be played on the video display device starting at the first time $t_1$ of the first digital video; and responsive to a selection of the second thumbnail image associated with the second digital video, causing the second digital video to be played on the video display device starting at the first time $t_1$ of the second digital video.

Alternative Implementation 29.

The method according to alternative implementation 28, wherein the first digital video is paused at the first time $t_1$ responsive to an input received via a user interface.

Alternative Implementation 30.

The method according to alternative implementation 28, wherein the first time $t_1$ associated with the first video frame of the first digital video is subsequent to an initial time $t_0$ associated with the initial video frame of the first digital video.

Alternative Implementation 31.

A computer-implemented method for organizing a plurality of digital videos, each of the plurality of digital videos having content data and metadata, the content data including a plurality of video frames, the method comprising: analyzing the content data of a first one of the plurality of digital videos to associate at least a first portion of a first one of the plurality of video frames of the first digital video with a first automatically-generated content tag, the first video frame of the first digital video being associated with a first time $t_1$ of the first digital video; automatically generating a first thumbnail image associated with the first digital video, the first thumbnail image including at least a second portion of the first video frame of the first digital video; analyzing the content data of a second one of the plurality of digital videos to associate at least a first portion of a first one of the plurality of video frames of the second digital video with a second automatically-generated content tag, the first video frame of the second digital video being associated with a first time $t_1$ of the second digital video; automatically generating a second thumbnail image associated with the second digital video, the second thumbnail image including at least a second portion of the first video frame of the second digital video; displaying the first thumbnail image associated with the first digital video, the second thumbnail image associated with the second digital video, or both, on the video display device; responsive to a selection of the first thumbnail image associated with the first digital video, causing the first digital video to be played on the video display device starting at the first time $t_1$ of the first digital video; and responsive to a selection of the second thumbnail image associated with the second digital video, causing the second digital video to be played on the video display device starting at the first time $t_1$ of the second digital video.

Alternative Implementation 32.

The method according to alternative implementation 31, wherein the first time $t_1$ associated with the first video frame of the plurality of video frames of the first digital video is subsequent to an initial time $t_0$ associated with an initial video frame of the plurality of video frames of the first digital video.

Alternative Implementation 33.

A computer-implemented method comprising: storing, in a file repository, a plurality of digital photographs; causing a first one of the plurality of digital photograph to be displayed on a video display device; responsive to receiving an indication that a user desires to digitally link the first digital photograph with another one of the plurality of photographs, prompting the user to select one of the plurality of digital photographs to be digitally linked to the first digital photograph; responsive to the user selecting a second one of the plurality of digital photographs, digitally linking the first digital photograph with the second digital photograph; subsequent to the first digital photograph being digitally linked with the second digital photograph, causing the first digital photograph to be displayed on the display device along with an associated user-selectable flipping element; and responsive to receiving a selection of the displayed user-selectable flipping element, causing the first digital photograph to be digitally flipped such that the second digital photograph is displayed on the video display device and the first digital photograph is not displayed on the video display device.

Alternative Implementation 34.

The method according to alternative implementation 33, wherein the receiving the indication that the user desires to digitally link the first digital photograph with another one of the plurality of photographs includes (i) displaying thumbnail images of one or more of the plurality of digital photographs on the video display device.

Alternative Implementation 35.

The method according to alternative implementation 34, wherein the selecting the second digital photograph includes receiving a selection of a thumbnail image of the second digital photograph.

Alternative Implementation 36.

The method according to alternative implementation 33, wherein during a portion of the digital flipping of the first digital photograph, a portion of the first digital photograph and a portion of the second digital photograph are both displayed on the video display device at the same time.

Alternative Implementation 37.

The method according to alternative implementation 33, wherein the first digital photograph and the second digital photograph include metadata.

Alternative Implementation 38.

The method according to alternative implementation 37, further comprising, responsive to causing the first digital photograph to be digitally linked to the second digital photograph, modifying the metadata of the first digital photograph to include information associated with the second digital photograph.

Alternative Implementation 39.

The method according to alternative implementation 38, wherein the information associated with the second digital photograph includes a file name of the second digital photograph.

Alternative Implementation 40.

A computer-implemented method for digitally linking a first digital photograph and a second digital photograph, the method comprising: storing, in a file repository, a plurality of digital photographs, the plurality of digital photographs including the first digital photograph and the second digital photograph; causing the first digital photograph to be displayed on a video display device; responsive to receiving a linking input indicative of a desire to link the first digital photograph and the second digital photograph, causing the first digital photograph to be digitally linked to the second digital photograph; causing a first user-selectable flipping element and the first digital photograph to be displayed on the video display device; and responsive to receiving a selection of the first user-selectable flipping element, digitally flipping, on the display device, the first digital photograph such that subsequent to the digitally flipping, the second digital photograph is displayed on the video display device and the first digital photograph is not displayed on the video display device Alternative Implementation 41.

The method according to alternative implementation 40, wherein the receiving the linking input indicative of the desire to link the first digital photograph and the second digital photograph includes (i) displaying thumbnail images of one or more of the plurality of digital photographs on the video display device, including a thumbnail image of the second digital photograph and (ii) receiving a selection of the thumbnail image of the second digital photograph.

Alternative Implementation 42.

The method according to alternative implementation 40, wherein the digital flipping, on the display device, of the first digital photograph causes a second user-selectable flipping element to be displayed on the video display device with the second digital photograph.

Alternative Implementation 43.

The method according to alternative implementation 42, further comprising responsive to receiving, via the user input device, a selection of the second user-selectable flipping element, digitally flipping, on the display device, the second digital photograph such that the first digital photograph and the first user-selectable flipping element are displayed on the video display device and the second digital photograph is not displayed on the video display device.

Alternative Implementation 44.

The method according to alternative implementation 40, wherein during a portion of the digital flipping of the first digital photograph, a portion of the first digital photograph and a portion of the second digital photograph are both displayed on the video display device at the same time.

Alternative Implementation 45.

The method according to alternative implementation 40, wherein during a portion of the digital flipping of the first digital photograph, a portion of the second digital photograph is visually overlaid on a portion of the first digital photograph.

Alternative Implementation 46.

The method according to alternative implementation 40, wherein the first digital photograph and the second digital photograph include metadata.

Alternative Implementation 47.

The method according to alternative implementation 46, further comprising responsive to causing the first digital photograph to be digitally linked to the second digital photograph, modifying the metadata of the first digital photograph to include information associated with the second digital photograph.

Alternative Implementation 48.

The method according to alternative implementation 47, wherein the information associated with the second digital photograph includes a file name of the second digital photograph.

Alternative Implementation 49.

The method according to alternative implementation 48, further comprising responsive to receiving a request to export the first digital photograph to a remote device, causing the first digital photograph, including the metadata including the file name of the second digital photograph, to be exported to the remote device.

Alternative Implementation 50.

The method according to alternative implementation 40, further comprising responsive to receiving a request to export the first digital photograph to a remote device, causing the first digital photograph and the digitally linked second digital photograph to be exported to the remote device.

Alternative Implementation 51.

The method according to alternative implementation 40, wherein the displaying the first digital photograph includes displaying a location tag associated with a location where the first digital photograph was generated, a date tag associated with the date when the first digital photograph was generated, a person tag associated with a person in the first digital photograph, or any combination thereof Alternative Implementation 52.

The method according to alternative implementation 51, wherein the location tag, the date tag, and the person tag are displayed on the video display device (i) during the digital flipping of the first digital photograph and (ii) subsequent to the digital flipping of the first digital photograph.

Alternative Implementation 53.

The method according to alternative implementation 40, wherein the first digital photograph is a scanned image of a first side of a physical photograph.

Alternative Implementation 54.

The method according to alternative implementation 53, wherein the second digital photograph is a scanned image of a second opposing side of the physical photograph.

Alternative Implementation 55.

The method according to alternative implementation 40, wherein a person is pictured in the first digital photograph and a likeness of the person is pictured in the second digital photograph, wherein the likeness of the person in the second digital photograph is generated from the first digital photograph.

Alternative Implementation 56.

The method according to alternative implementation 55, wherein the likeness of the person in the second digital photograph includes an outline of the person in the first digital photograph.

Alternative Implementation 57.

The method according to alternative implementation 55, wherein a unique identifier associated with a name of the person is at least partially overlaid on the likeness of the person in the second digital photograph.

Alternative Implementation 58.

The method according to alternative implementation 57, wherein a table including the unique identifier and the associated name of the person is displayed on the video display device.

Alternative Implementation 59.

A method for training a regression algorithm for use in comparing one or more facial features of a first person with one or more corresponding facial features of a second person, the method comprising: analyzing a first digital photograph of the first person to determine a first set of facial feature data for a first facial feature of a face of the first person, the first set of facial feature data including a pose of the face in the first digital photograph, an area of the face in the first digital photograph, and one or more landmarks for the first facial feature in the first digital photograph; determining, based at least in part on the first set of facial feature data, a second set of facial feature data for the first facial feature of the face; analyzing a second digital photograph of the first person to determine a third set of facial feature data for the first facial feature of the face of the first person, the third set of facial feature data including a pose of the face in the second digital photograph, an area of the face in the second digital photograph, and one or more landmarks for the first facial feature of the face in the second digital photograph; determining, based at least in part on the third set of facial feature data, a fourth set of facial feature data for the first facial feature of the face; and determining a regression model for the first facial feature of the first person based on the first set of facial feature data, the second set of facial feature data, the third set of facial feature data, and the fourth set of facial feature data, wherein inputting facial feature data associated with a corresponding first facial feature of the second person into the regression model results in an output value that is indicative of a similarity between the first facial feature of the first person and the corresponding first facial feature of the second person.

Alternative Implementation 60.

The method according to alternative implementation 59, wherein the second set of facial feature data includes a relative width of the first facial feature, a relative height of the first facial feature, a relative distance between a first landmark for the first facial feature and a landmark for a second facial feature of the face of the first person, or any combination thereof Alternative Implementation 61.

The method according to alternative implementation 60, wherein the first facial feature of the face of the first person is an eye, the one or more landmarks of the first set of facial feature data includes a left eye landmark, an upper eye landmark, a right eye landmark, and a lower eye landmark.

Alternative Implementation 62.

The method according to alternative implementation 61, wherein the relative height of the first facial feature is a proportion of a distance between the lower eye landmark and the upper eye landmark and a height of a bounding box surrounding the face of the first person.

Alternative Implementation 63.

The method according to alternative implementation 61, wherein the relative width of the first facial feature is a proportion of a distance between the left eye landmark and the right eye landmark and a width of a bounding box surrounding the face of the first person.

Alternative Implementation 64.

The method according to alternative implementation 61, wherein the determining the second set of facial feature data includes determining a bounding box for the eye based the left eye landmark, the upper eye landmark, the right eye landmark, and the lower eye landmark.

Alternative Implementation 65.

The method according to alternative implementation 64, wherein the second set of facial feature data includes a color of the eye.

Alternative Implementation 66.

The method according to alternative implementation 59, wherein the pose of the face includes a yaw angle, a pitch angle, and a roll angle.

Alternative Implementation 67.

The method according to alternative implementation 59, wherein the first facial feature of the face of the first person is a nose, a left eye, a right eye, a mouth, an eyebrow, a jawline, or an ear.

Alternative Implementation 68.

The method according to alternative implementation 59, wherein the regression model is a logistic algorithm regression, a neural network algorithm regression, a deep learning algorithm regression, or any combination thereof Alternative Implementation 69.

The method according to alternative implementation 59, wherein the output value of the regression model is between 0 and 1.

Alternative Implementation 70.

The method according to alternative implementation 59, wherein the first set of facial feature data includes a gender of the first person.

Alternative Implementation 71.

A computer-implemented method for comparing one or more facial features of a plurality of persons and displaying the results, the method comprising: receiving, via a user input device, a selection of a first person, the first person being associated with a regression model stored in a photo repository, the regression model being associated with a first facial feature of the first person; responsive to receiving an input indicative of a desire to compare the first person with a second person, causing facial feature data associated with a corresponding first facial feature of the second person to be inputted into the regression model to obtain an output value from the regression model indicative of a similarity between the first facial feature of the first person and the corresponding first facial feature of the second person; and displaying, on a video display device, (i) a first thumbnail image including at least a portion of a digital photograph of the second person and (ii) an indicium indicative of the similarity between the first facial feature of the first person and the corresponding first facial feature of the second person.

Alternative Implementation 72.

The method according to alternative implementation 71, wherein the portion of the digital photograph of the second person includes the corresponding first facial feature of the second person.

Alternative Implementation 73.

The method according to alternative implementation 71, wherein the first facial feature of the first person and the corresponding first facial feature of the second person is a nose, a mouth, an eye, an eyebrow, a jawline, or an ear.

Alternative Implementation 74.

The method according to alternative implementation 71, wherein the output value of the regression model is between 0 and 1.

Alternative Implementation 75.

The method according to alternative implementation 71, wherein the indicium indicative of the similarity between the first facial feature of the first person and the corresponding first facial feature of the second person is a percentage.

Alternative Implementation 76.

The method according to alternative implementation 71, wherein the displaying includes displaying a second indicium indicative of a relationship between the first person and the second person.

Alternative Implementation 77.

The method according to alternative implementation 76, wherein the relationship between the first person and the second person is a familial relationship.

Alternative Implementation 78.

The method according to alternative implementation 71, wherein the first facial feature of the first person and the corresponding first facial feature of the second person are a person feature, wherein the person feature is a combination of a plurality of facial features.

Alternative Implementation 79.

The method according to alternative implementation 78, wherein the plurality of facial features includes a nose, a mouth, an eye, an eyebrow, a jawline, or any combination thereof.

Alternative Implementation 80.

The method according to alternative implementation 71, further comprising responsive to receiving a selection of the first thumbnail image, displaying, on the video display device, the digital photograph of the second person, a digital photograph of the first person, and the indicium indicative of the similarity between the first facial feature of the first person and the corresponding first facial feature of the second person.

Alternative Implementation 81.

A computer-implemented method for comparing one or more facial features of a plurality of persons and displaying the results, the method comprising: receiving, via a user input device, a selection of a first person, the first person being associated with a first regression model is stored in a photo repository, the first regression model being associated with a first facial feature of the first person; responsive to receiving an input indicative of a desire to compare the first person to a plurality of other persons, causing facial feature data associated with each of the plurality of other persons to be inputted into the first regression model to obtain a first output value indicative of a similarity between the first facial feature of the first person and a corresponding first facial feature of each of the plurality of other persons; and responsive to determining that the first output value for at least one of the plurality of other persons is greater than a predetermined threshold, displaying, on a video display device, a thumbnail image including at least a portion of a digital photograph of the at least one of the plurality of other persons and an indicium indicative of the similarity between the first facial feature of the first person and the corresponding first facial feature of the at least one of the plurality of other persons.

Alternative Implementation 82.

The method according to alternative implementation 80, wherein the first person is associated with a second regression model stored in the photo repository, the second regression model being associated with a first facial feature of the first person.

Alternative Implementation 83.

The method according to alternative implementation 82, further comprising responsive to receiving the input indicative of the desire to compare the first person to the plurality of other persons, causing facial feature data associated with each of the plurality of other persons to be inputted into the second regression model to obtain a second output value indicative of a similarity between the second facial feature of the first person and a corresponding second facial feature of each of the plurality of other persons; and responsive to determining that the second output value for at least one of the plurality of other persons is greater than a predetermined threshold, displaying, on the video display device, a second thumbnail image including at least a portion of a digital photograph of the at least one of the plurality of other persons and a second indicium indicative of the similarity between the second facial feature of the first person and the corresponding second facial feature of the at least one of the plurality of other persons.

Alternative Implementation 84.

The method according to alternative implementation 80, wherein the at least one of the plurality of other persons includes a second person and a third person and the displaying includes displaying a first thumbnail image including at least a portion of a digital photograph of the second person, a first indicium indicative of the similarity between the first facial feature of the first person and the corresponding first facial feature of the second person, a second thumbnail image including at least a portion of a digital photograph of the third person, and a second indicium indicative of the similarity between the first facial feature of the first person and the corresponding first facial feature of the second person.

Alternative Implementation 85.

The method according to alternative implementation 84, further comprising responsive to receiving a selection of the first thumbnail image, displaying a digital photograph of the first person, the digital photograph of the second person, and the first indicium on the video display device.

Alternative Implementation 86.

The method according to alternative implementation 85, further comprising displaying a navigation element along with the digital photograph of the first person, the digital photograph of the second person, and the first indicium on the video display device; and responsive to a selection of the navigation element, displaying the digital photograph of the first person, the digital photograph of the third person, and the second indicium on the video display device.

Alternative Implementation 87.

The method according to alternative implementation 81, wherein the first person and the plurality of other persons are associated with one another in the photo repository by a relationship.

Alternative Implementation 88.

The method according to alternative implementation 87, wherein the relationship is a familial relationship.

Alternative Implementation 89.

A computer-implemented method for comparing one or more facial features of a plurality of persons, the method comprising: receiving, via a user input device, a selection of a first person, the first person being associated with a first regression model is stored in a photo repository, the first regression model being associated with a first facial feature of the first person; responsive to receiving an input indicative of a desire to compare the first person with a plurality of other persons, importing at least one photograph of each of the plurality of other persons from an external system, each of the plurality of other persons being associated with one another by a predetermined relationship; causing facial feature data associated with a corresponding first facial feature of each of the plurality of other persons to be inputted into the regression model to obtain an output value from the regression model indicative of a similarity between the first facial feature of the first person and the corresponding first facial each of the plurality of other persons; and responsive to determining that the first output value for at least one of the plurality of other persons is greater than a predetermined threshold, displaying, on a video display device, a thumbnail image including at least a portion of a digital photograph of the at least one of the plurality of other persons and an indicium indicative of the similarity between the first facial feature of the first person and the corresponding first facial feature of the at least one of the plurality of other persons.

Alternative Implementation 90.

The method according to alternative implementation 89, wherein the predetermined relationship is a familial relationship.

Alternative Implementation 91.

A computer-implemented method for comparing one or more facial features of a plurality of persons, the method comprising: responsive to receiving an input indicative of a desire to compare a first person with a plurality of other persons, importing, from an external system, a first digital photograph of the first person and a first regression model for a first facial feature for the first person; inputting facial feature data associated with a corresponding first facial feature of each of the plurality of other persons into first the regression model to obtain an output value from the regression model indicative of a similarity between the first facial feature of the first person and the corresponding first facial each of the plurality of other persons; and responsive to determining that the output value for at least one of the plurality of other persons is greater than a predetermined threshold, displaying, on a video display device, a thumbnail image including at least a portion of a digital photograph of the at least one of the plurality of other persons and an indicium indicative of the similarity between the first facial feature of the first person and the corresponding first facial feature of the at least one of the plurality of other persons.

One or more elements or aspects or steps, or any portion(s) thereof, from one or more of any of the Alternative Implementations 1-91 above can be combined with one or more elements or aspects or steps, or any portion(s) thereof, from one or more of any of the other Alternative Implementations 1-91, or combinations thereof, to form one or more additional alternative implementations of the present disclosure.

While the present disclosure has been described with reference to one or more particular embodiments or implementations, those skilled in the art will recognize that many changes may be made thereto without departing from the spirit and scope of the present disclosure. Each of these embodiments or implementations and obvious variations thereof is contemplated as falling within the spirit and scope of the present disclosure. It is also contemplated that additional embodiments implementations according to aspects of the present disclosure may combine any number of features from any of the embodiments described herein.

What is claimed is:

1. A computer-implemented method comprising:
   storing, in a file repository, a plurality of digital photographs;
   causing a first one of the plurality of digital photographs to be displayed on a video display device, a person being pictured in the first digital photograph;
   in response to receiving an input from a user, causing a second digital photograph to be generated including a likeness of the person pictured in the first digital photograph, the likeness of the person including an outline of at least a portion of the person in the first digital photograph;
   digitally linking the first digital photograph with the second digital photograph;
   subsequent to the first digital photograph being digitally linked with the second digital photograph, causing the first digital photograph to be displayed on the display device along with an associated user-selectable flipping element; and
   responsive to receiving a selection of the displayed user-selectable flipping element, causing the first digital photograph to be digitally flipped such that the second digital photograph is displayed on the video display device and the first digital photograph is not displayed on the video display device.

2. The method of claim 1, wherein the digitally linking the first digital photograph with the second digital photograph occurs automatically.

3. The method of claim 1, wherein the digitally linking the first digital photograph with the second digital photograph includes receiving a linking input from the user indicative of a desire to link the first digital photograph and the second digital photograph.

4. The method of claim 3, wherein the receiving the linking input indicative of the desire to link the first digital photograph and the second digital photograph includes (i) displaying thumbnail images of one or more of the plurality of digital photographson the video display device, including a thumbnail image of the second digital photograph and (ii) receiving a selection of the thumbnail image of the second digital photograph.

5. The method of claim 1, wherein during a portion of the digital flipping of the first digital photograph, a portion of the first digital photograph and a portion of the second digital photograph are both displayed on the video display device at the same time.

6. The method of claim 1, wherein during a portion of the digital flipping of the first digital photograph, a portion of the second digital photograph is visually overlaid on a portion of the first digital photograph.

7. The method of claim 1, wherein the digital flipping, on the display device, of the first digital photograph causes a second user-selectable flipping element to be displayed on the video display device with the second digital photograph.

8. The method of claim 7, further comprising responsive to receiving a selection of the second user-selectable flipping element, digitally flipping, on the display device, the second digital photograph such that the first digital photograph and the associated user-selectable flipping element are displayed on the video display device and the second digital photograph is not displayed on the video display device.

9. The method of claim 1, further comprising, responsive to causing the first digital photograph to be digitally linked to the second digital photograph, modifying metadata of the first digital photograph to include information associated with the second digital photograph.

10. The method of claim 9, wherein the information associated with the second digital photograph includes a file name of the second digital photograph.

11. The method of claim 1, further comprising responsive to receiving a request to export the first digital photograph to a remote device, causing the first digital photograph and the digitally linked second digital photograph to be exported to the remote device.

12. The method of claim 1, wherein the displaying the first digital photograph includes displaying a location tag associated with a location where the first digital photograph was generated, a date tag associated with the date when the first digital photograph was generated, a person tag associated with the person in the first digital photograph, or any combination thereof.

13. The method of claim 12, wherein the location tag, the date tag, and the person tag are displayed on the video display device (i) during the digital flipping of the first digital photograph and (ii) subsequent to the digital flipping of the first digital photograph.

14. The method of claim 1, wherein the generated second digital photograph further includes a unique identifier associated with a name of the person, the unique identifier being at least partially overlaid on the likeness of the person in the second digital photograph.

15. The method of claim 14, further comprising, subsequent to the first digital photograph being digitally linked with the second digital photograph, causing the first digital photograph to be displayed on the display device along with a table including the unique identifier and the associated name of the person.

16. A system comprising:
a video display device;
a memory storing machine-readable instructions; and
one or more processors configured to execute the machine-readable instructions to:
causing a first one of a plurality of digital photographs that are stored in a file repository to be displayed on the video display device, a person being pictured in the first digital photograph;
in response to receiving an input from a user, cause a second digital photograph to be generated including a likeness of the person pictured in the first digital photograph, the likeness of the person including an outline of at least a portion of the person in the first digital photograph;
digitally link the first digital photograph with the second digital photograph;
subsequent to the first digital photograph being digitally linked with the second digital photograph, cause the first digital photograph to be displayed on the display device along with an associated user-selectable flipping element; and
responsive to receiving a selection of the displayed user-selectable flipping element, cause the first digital photograph to be digitally flipped such that the second digital photograph is displayed on the video display device and the first digital photograph is not displayed on the video display device.

17. The system of claim 16, wherein the digitally linking the first digital photograph with the second digital photograph occurs automatically.

18. The system of claim 16, wherein the digitally linking the first digital photograph with the second digital photograph includes receiving, via the video display device, a linking input from the user indicative of a desire to link the first digital photograph and the second digital photograph.

19. The system of claim 18, wherein the receiving the linking input includes (i) displaying thumbnail images of one or more of the plurality of digital photographs on the video display device, including a thumbnail image of the second digital photograph and (ii) receiving a selection of the thumbnail image of the second digital photograph.

20. The system of claim 16, wherein during a portion of the digital flipping of the first digital photograph, a portion of the first digital photograph and a portion of the second digital photograph are both displayed on the video display device at the same time.

21. The system of claim 16, wherein during a portion of the digital flipping of the first digital photograph, a portion of the second digital photograph is visually overlaid on a portion of the first digital photograph.

22. The system of claim 16, wherein the digital flipping, on the display device, of the first digital photograph causes a second user-selectable flipping element to be displayed on the video display device with the second digital photograph.

23. The system of claim 16, wherein the one or more processors are further configured to, in response to receiving a selection of the second user-selectable flipping element, digitally flip, on the video display device, the second digital photograph such that the first digital photograph and the associated user-selectable flipping element are displayed on the video display device and the second digital photograph is not displayed on the video display device.

24. The system of claim 16, wherein the one or more processors are configured to, in response to digitally linking the first digital photograph with the second digital photograph, modify metadata of the first digital photograph to include information associated with the second digital photograph.

25. The system of claim 24, wherein the information associated with the second digital photograph includes a file name of the second digital photograph.

26. The system of claim 16, wherein the one or more processors are further configured to cause the first digital photograph and the digitally linked second digital photograph to be exported to a remote device responsive to receiving a request, via the video display device, to export the first digital photograph to the remote device.

27. The system of claim 16, wherein the displaying the first digital photograph includes displaying a location tag associated with a location where the first digital photograph was generated, a date tag associated with the date when the first digital photograph was generated, a person tag associated with the person in the first digital photograph, or any combination thereof.

28. The system of claim 27, wherein the location tag, the date tag, and the person tag are displayed on the video display device (i) during the digital flipping of the first digital photograph and (ii) subsequent to the digital flipping of the first digital photograph.

29. The system of claim 16, wherein the generated second digital photograph further includes a unique identifier associated with a name of the person, the unique identifier being at least partially overlaid on the likeness of the person in the second digital photograph.

30. The system of claim 29, wherein the one or more processors are further configured to, subsequent to the first digital photograph being digitally linked with the second digital photograph, cause the first digital photograph to be displayed on the display device along with a table including the unique identifier and the associated name of the person.

* * * * *

UNITED STATES PATENT AND TRADEMARK OFFICE
CERTIFICATE OF CORRECTION

PATENT NO. : 10,936,178 B2
APPLICATION NO. : 16/719798
DATED : March 2, 2021
INVENTOR(S) : Christopher J. Desmond et al.

Page 1 of 1

It is certified that error appears in the above-identified patent and that said Letters Patent is hereby corrected as shown below:

In the Claims

At Column 60, Line 39 (Claim 4, Line 5), please delete "photographson" and insert --photographs on-- therefor.

Signed and Sealed this
Fourth Day of May, 2021

Drew Hirshfeld
*Performing the Functions and Duties of the
Under Secretary of Commerce for Intellectual Property and
Director of the United States Patent and Trademark Office*